(12) United States Patent
Tanimoto et al.

(10) Patent No.: US 6,392,684 B1
(45) Date of Patent: May 21, 2002

(54) IMAGE FORMING APPARATUS AND IMAGE FORMING METHOD

(75) Inventors: Koji Tanimoto; Kenichi Komiya, both of Kawasaki; Jun Sakakibara, Tokyo; Naoaki Ide, Shizuoka; Toshimitsu Ichiyanagi, Zushi, all of (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/606,744

(22) Filed: Jun. 29, 2000

(30) Foreign Application Priority Data

Jun. 29, 1999 (JP) ............................. 11-183546

(51) Int. Cl.[7] .............................. B41J 2/47; B41J 2/435
(52) U.S. Cl. ...................................... 347/234; 347/236
(58) Field of Search .................................. 347/233, 234, 347/235, 236, 237, 243, 246, 248; 359/204; 250/559.29, 578.1

(56) References Cited

U.S. PATENT DOCUMENTS

| 4,404,571 A | | 9/1983 | Kitamura ................. 347/235 |
| 4,878,066 A | * | 10/1989 | Shiraishi ................. 347/235 |
| 5,539,719 A | | 7/1996 | Motoi ..................... 346/107.1 |
| 5,892,533 A | | 4/1999 | Tanimoto et al. .......... 347/257 |
| 5,995,246 A | | 11/1999 | Komiya et al. ............ 358/451 |

FOREIGN PATENT DOCUMENTS

| JP | 1-43294 | | 9/1989 | |
| JP | 3-57453 | | 9/1991 | |
| JP | 3-57542 | | 9/1991 | |
| JP | 5-28503 | * | 2/1993 | ............ G11B/7/00 |
| JP | 5-32824 | | 8/1993 | |
| JP | 7-72399 | | 3/1995 | |
| JP | 7-228000 | | 8/1995 | |
| JP | 9-210849 | | 8/1997 | |
| JP | 9-258125 | | 10/1997 | |
| JP | 9-314901 | | 12/1997 | |
| JP | 10-76704 | | 3/1998 | |

* cited by examiner

Primary Examiner—Hai Pham
(74) Attorney, Agent, or Firm—Foley & Lardner

(57) ABSTRACT

There is provided an image forming apparatus which can implement digital control of a laser beam scan (analog amount) that moves at high speed, without using any high-speed, multi-bit A/D converter. Upon executing a digital process on the basis of analog detection value Vo corresponding to the passage position or light beam power of a light beam with which a photosensitive drum is irradiated, comparator CMP0, comparison reference value (threshold value) Vr of which changes in correspondence with detection value (integration output) Vo, is used. New comparison reference value Vr is supplied to comparator CMP0 on the basis of digital data BMDA corresponding to output CMPOUT of this comparator.

16 Claims, 51 Drawing Sheets

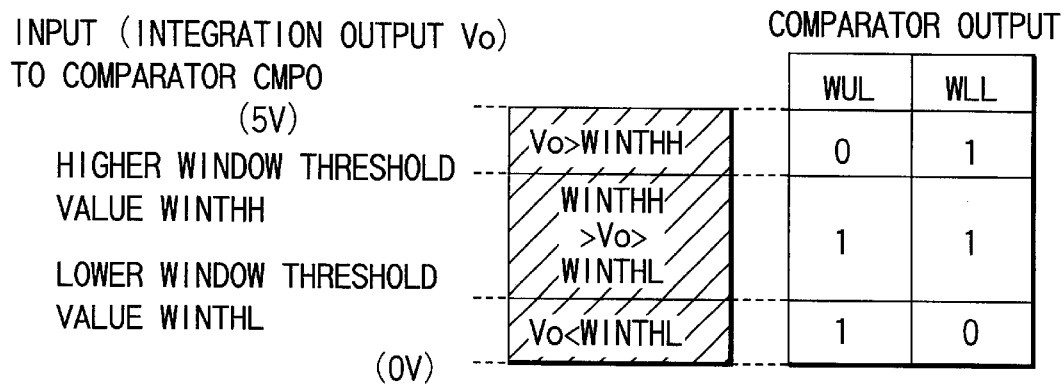
FIG. 36
| DA SELECT SIGNAL | | DA DATA WRITE PULSE | TO BE ACTIVATED |
|---|---|---|---|
| DASC0-0A | DASC1-0A | DAWR-0A | |
| 1 | 0 | ⌐↓_ | HIGHER THRESHOLD VALUE WINTHH |
| 0 | 1 | ⌐↓_ | LOWER THRESHOLD VALUE WINTHL |
| 0 | 0 | ⌐↓_ | SELECT POWER DETECTION RANGE |
FIG. 37
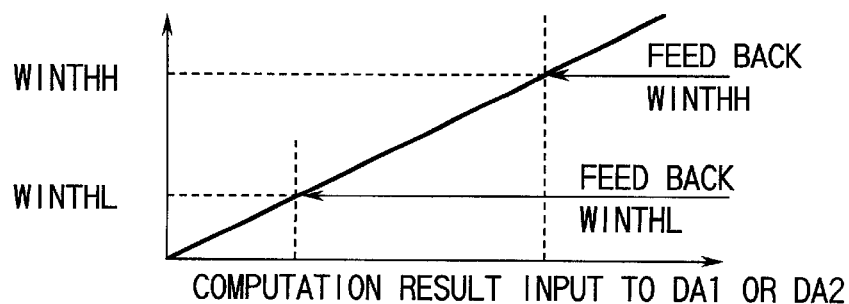
FIG. 38

IMAGE FORMING APPARATUS AND IMAGE FORMING METHOD

CROSS-REFERENCE TO RELATED APPLICATIONS

This application is based upon and claims the benefit of priority from the prior Japanese Patent Application No. 11-183546, filed Jun. 29, 1999, the entire contents of which are incorporated herein by reference.

BACKGROUND OF THE INVENTION

The present invention relates to an image forming apparatus such as a digital copying machine, laser printer, or the like that forms a single electrostatic latent image on a single photosensitive drum by simultaneously exposing/scanning the surface of the photosensitive drum with a plurality of laser beams, and an image forming method used in that apparatus.

Especially, the present invention relates to an improvement in an arrangement used to detect/correct any offset produced in passage position control of laser beams with respect to the photosensitive drum, power control of laser beams, or a circuit section that makes such control in the image forming apparatus or method.

More particularly, the present invention relates to an arrangement that digitally controls the positions or power levels of laser beams using a versatile digital device without using a conventional A/D converter in a high-speed digital copying machine using multi-beams.

In recent years, various digital copying machines that form images by scanning exposure using a laser beam and an electrophotography process have been developed.

Recently, a digital copying machine that uses a multi-beam system, i.e., generates a plurality of laser beams and simultaneously scans in units of a plurality of lines using these laser beams to achieve higher image formation speed has been developed.

Such multi-beam digital copying machine comprises a plurality of semiconductor laser oscillators for generating laser beams, a rotary polygonal mirror such as a polygonal mirror for reflecting the laser beams output from these laser oscillators toward a photosensitive drum and scanning the surface of the photosensitive drum with the laser beams, and an optical system unit mainly constructed by a collimator lens, f-θ lens, and the like.

A beam detector for multi-beams normally has the following arrangement. That is, two sensor outputs responsive to laser beams are amplified, and a differential amplifier detects the output difference between the two sensor outputs. The output difference is integrated by an integrator, and the integration result is converted into digital data by an analog-to-digital converter (to be abbreviated as an A/D converter or ADC hereinafter). The digital integration result (digital data corresponding to the beam detection result) is used in the subsequent digital processes.

The digital copying machine converts the positions and analog power levels (corresponding to the integration result) of multi-laser beams into digital data for digital processes in the passage position control of laser beams with respect to the photosensitive drum or power control of laser beams. In order to implement the digital processes, an A/D converter is used. Generally speaking, the device cost of the A/D converter is inevitably higher than that of a versatile logic IC (comparator, flip-flop, inverter, or the like).

In an actual digital copying machine, 8 to 12 bits are assigned to an image process so as to realize excellent halftoning. For this reason, the digital copying machine uses a high-resolution, multi-bit A/D converter (8 to 12 bits), but such A/D converter is especially expensive. A 16-bit A/D converter is more expensive.

As the processing speed of an optical system and digital processing system (including software processes implemented by a CPU or MPU) increases to meet requirements for high print speed, the operation speed requirements for high print speed, the operation speed (the time required for completing each A/D conversion) of the A/D converter used therein must be increased (shortened). A high-resolution A/D converter that can meet such high-speed requirements is still more expensive. In practice, a high-resolution, high-speed A/D converter is very expensive compared to the total cost of a control circuit system of an image forming apparatus.

BRIEF SUMMARY OF THE INVENTION

It is an object of the present invention to provide an image forming apparatus or method which can implement digital control without using an expensive A/D converter.

In order to achieve the above object, an image forming apparatus according to the present invention that controls the beam passage positions of multi-beams comprises a light source (laser) for producing a plurality of light beams; scan means (galvano mirror, polygonal mirror, polygonal mirror motor, polygonal mirror motor driver) for scanning the plurality of light beams so the light beams pass a predetermined object (photosensitive drum); detection means (beam position detector, beam position detector output processing circuit including integrator, CPU software of main controller) for detecting a passage position of each light beam scanned by the scan means; conversion means for converting an analog amount (integration output Vo) corresponding to each light beam passage position detected by the detection means into a corresponding digital bit on the basis of a predetermined threshold value (Vr in FIG. 9 or WINTHH/WINTHL in FIG. 35); arithmetic means for calculating an amount of change in a path of each of the light beams scanned by the scan means on the basis of the threshold value and the digital bit; light path change means (galvano mirror) for changing the passage position of each of the light beams scanned by the scan means so that the passage position of each of the light beams matches a prescribed position (e.g., an intermediate position between the adjacent or neighboring sensor patterns of SF to SJ shown in FIG. 3); and change means for changing the threshold value (Vr or WINTHH/WINTHL) on the basis of the digital bit.

In order to achieve the above object, an image forming apparatus according to the present invention that controls the beam power levels of multi-beams comprises a light source for producing a plurality of light beams; scan means for scanning the plurality of light beams so the light beams pass a predetermined object; detection means for detecting a light amount of each light beam scanned by the scan means; conversion means for converting an analog amount (integration output Vo) corresponding to each beam light amount detected by the detection means into a corresponding digital bit on the basis of a predetermined threshold value (Vr or WINTHH/WINTHL); light amount change means (laser driver) for changing the light amount of each of the light beams scanned by the scan means so that the light amount of each of the light beams matches a prescribed value; and change means for changing the threshold value (Vr or WINTHH/WINTHL) on the basis of the digital bit.

Note that the conversion means can be formed of a single comparator that makes level comparison of the analog amount (Vo) with the threshold value (Vr) changed by the changing means.

Alternatively, the conversion means can be formed of a window comparator that makes level comparison of the analog amount (Vo) with a pair of threshold values (WINTHH/WINTHL) changed by the changing means.

In order to achieve the above object, an image forming apparatus according to the present invention that controls the beam passage positions and beam power levels of multi-beams comprises a light source for producing a plurality of light beams; scan means for scanning the plurality of light beams so the light beams pass a predetermined object; first detection means for detecting a passage position of each light beam scanned by the scan means; first conversion means for converting an analog amount (integration output Vo) corresponding to each beam passage position detected by the first detection means into a corresponding first digital bit on the basis of a predetermined first threshold value (Vr or WINTHH/WINTHL); arithmetic means for calculating an amount of change in a path of each of the light beams scanned by the scan means on the basis of the first threshold value and the first digital bit; light path change means (galvano mirror) for changing the passage position of each of the light beams scanned by the scan means so that the passage position of each of the light beams matches a prescribed position; first change means for changing the first threshold value (Vr or WINTHH/WINTHL) on the basis of the first digital bit; second detection means for detecting a light amount of each light beam scanned by the scan means; second conversion means for converting an analog amount (integration output Vo) corresponding to each beam light amount detected by the second detection means into a corresponding second digital bit on the basis of a predetermined second threshold value (Vr or WINTHH/WINTHL); light amount change means (laser driver) for changing the light amount of each of the light beams scanned by the scan means so that the light amount of each of the light beams matches a prescribed value; and second change means for changing the second threshold value (Vr or WINTHH/WINTHL) on the basis of the second digital bit.

Note that the first and/or second conversion means can be formed of a single comparator that makes level comparison of the analog amount (Vo) with the threshold value (Vr) changed by the first and/or second changing means.

Alternatively, the first and/or second conversion means can be formed of a window comparator that makes level comparison of the analog amount (Vo) with a pair of threshold values (WINTHH/WINTHL) changed by the first and/or second changing means.

In order to achieve the above object, an image forming apparatus according to the present invention which includes a circuit arrangement that produces an offset upon controlling multi-beams comprises a light source for producing a plurality of light beams; scan means for scanning the plurality of light beams so the light beams pass a predetermined object; detection means for detecting a circuit state (offset voltage generation state; cf. FIG. 7) when a light amount of each light beam scanned by the scan means is substantially zero; offset detection means for detecting an offset amount corresponding to the circuit state detected by the detection means; conversion means for converting an analog amount (integration output Vo) corresponding to the offset amount detected by the offset detection means into a corresponding digital bit on the basis of a predetermined threshold value (WINTHH/WINTHL); and change means for changing the threshold value (WINTHH/WINTHL) on the basis of the digital bit.

Note that a deviation resulting from the detected offset amount can be corrected using the threshold value (WINTHH/WINTHL) which is changed in correspondence with the offset amount.

The conversion means can be formed of a single comparator that makes level comparison of the analog amount (Vo) with the threshold value (Vr) changed by the changing means.

Alternatively, the conversion means can be formed of a window comparator that makes level comparison of the analog amount (Vo) with a pair of threshold values (WINTHH/WINTHL) changed by the changing means.

In order to achieve the above object, an image forming method according to the present invention that controls the beam passage positions of multi-beams comprises the steps of: producing a light beam used in image formation; detecting a passage position of the light beam by scanning the light beam; converting an analog amount (integration output Vo) corresponding to the detected passage position of the light beam into a corresponding digital bit on the basis of a predetermined threshold value (Vr in FIG. 9, or WINTHH/WINTHL in FIG. 35); calculating an amount of change in a path of the light beam on the basis of the threshold value and the digital bit; changing the passage position of the light beam so that the passage position of the light beam matches a prescribed position (e.g., an intermediate position between the adjacent or neighboring sensor patterns of SF to SJ shown in FIG. 3); and changing the threshold value (Vr or WINTHH/WINTHL) on the basis of the digital bit.

In order to achieve the above object, an image forming method according to the present invention that controls the beam power levels of multi-beams comprises the steps of: producing a light beam used in image formation; detecting a light amount of the light beam; converting an analog amount (integration output Vo) corresponding to the detected light amount of the beam into a corresponding digital bit on the basis of a predetermined threshold value (Vr or WINTHH/WINTHL); changing the light amount of the light beam so that the light amount of the light beam matches a prescribed value; and changing the threshold value (Vr or WINTHH/WINTHL) on the basis of the digital bit.

In order to achieve the above object, an image forming method according to the present invention which includes a circuit arrangement that produces an offset upon controlling multi-beams comprises the steps of: producing a light beam used in image formation; detecting a circuit state (offset generation state; cf. FIG. 7) when a light amount of the beam is substantially zero; detecting an offset amount corresponding to the circuit state; converting an analog amount (integration output Vo) corresponding to the detected offset amount into a corresponding digital bit on the basis of a predetermined threshold value (WINTHH/WINTHL); changing the threshold value (WINTHH/WINTHL) on the basis of the digital bit; and recording a final value of the changed threshold value (WINTHH/WINTHL) as data indicating the offset amount.

Note that a deviation resulting from the offset amount can be corrected using the final value of the threshold value recorded as data indicating the offset amount.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 36 is a view for explaining the In/Out relationship of the window comparator shown in FIG. 35;

FIG. 37 explains the operation of a selector shown in FIG. 35;

FIG. 38 is a graph for explaining comparison reference values (threshold values) of the window comparator shown in FIG. 35;

DETAILED DESCRIPTION OF THE INVENTION

An embodiment of the present invention will be described hereinafter with reference to the accompanying drawings.

Figure 1:
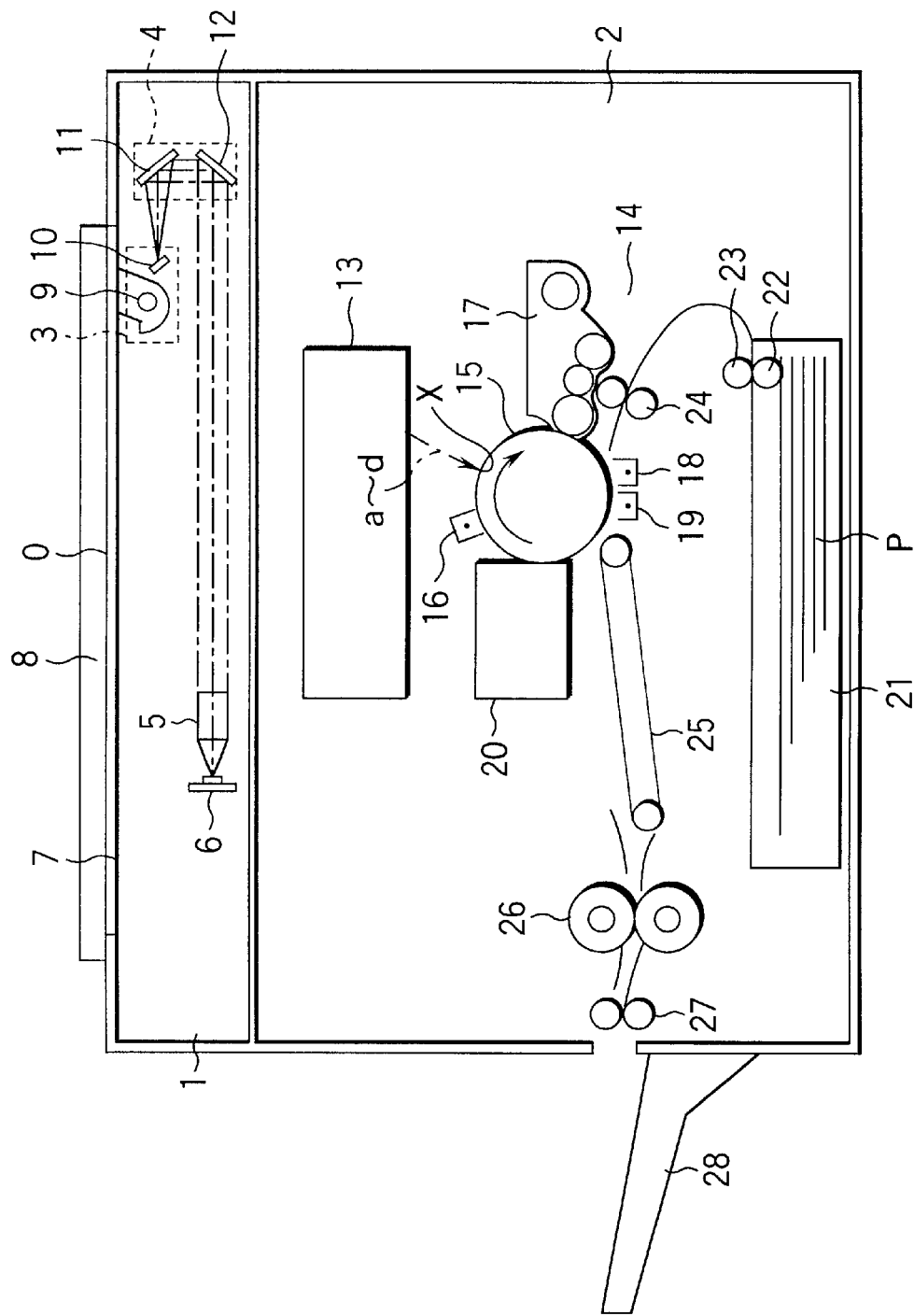
FIG. 1 is a block diagram for explaining the arrangement of a digital copying machine as an image forming apparatus according to an embodiment of the present invention.

FIG. 1 shows the arrangement of a digital copying machine as an image forming apparatus according to an embodiment of the present invention.

More specifically, this digital copying machine is constructed by scanner module 1 serving as an image reading means, and printer module 2 serving as an image forming means. Scanner module 1 is comprised of movable first and second carriages 3 and 4, imaging lens 5, photoelectric conversion element 6, and the like.

Referring to FIG. 1, original O is placed facing down on platen 7 consisting of transparent glass. As a reference upon placing original O, the right side of the widthwise direction of platen 7 viewed from the front side is used as a center reference. Original O is pressed against platen 7 by original fixing cover 8 which is free to open/close.

Original O is illuminated by light source 9, and light reflected by original O is focused on the light-receiving surface of photoelectric conversion element 6 via mirrors 10, 11, and 12, and imaging lens 5. Note that first carriage 3 that carries light source 9 and mirror 10, and second carriage 4 that carries mirrors 11 and 12 move at 2:1 relative speeds to make the optical path length constant. First and second carriages 3 and 4 move from the right to left on the page of FIG. 1 by a carriage drive motor (not shown) in synchronism with a scan timing signal.

In this manner, an image of original O placed on platen 7 is scanned in units of lines by scanner module 1, and the scan output is converted into a digital image signal of 8 to 12 bits which indicates the density of an image by an image processor (not shown) (the number of quantization bits that represent the density of an image is assumed to be 8).

Printer module 2 is constructed by image forming unit 14 that combines optical system unit 13 and an electrophotography system capable of image formation on paper P as an image forming medium.

That is, an image signal scanned from original O by scanner module 1 is processed by the image processor (not shown), and is converted into a laser beam (to be referred to as a beam hereinafter) from a semi-conductor laser oscillator. Note that this embodiment adopts a multi-beam optical system that uses a plurality of (two or more) semi-conductor laser oscillators.

The arrangement of the optical system unit 13 will be described in detail later. A plurality of semi-conductor laser oscillators provided in the optical system unit emit light in accordance with a laser modulation signal output from the image processor (not shown), and a plurality of beams output from these laser oscillators are reflected by a polygonal mirror to be scanned beams. The scanned beams are output outside the optical system unit.

A plurality of beams output from the optical system unit 13 are imaged as scanned beam spots, which have a required resolution at exposure position X on photosensitive drum 15 as an image carrier to scan and expose photosensitive drum 15. As a result, an electrostatic latent image is formed on photosensitive drum 15 in accordance with the image signal.

Charger 16 for charging the surface of photosensitive drum 15, developer 17, transfer charger 18, peeling charger 19, cleaner 20, and the like are disposed around photosensitive drum 15.

Photosensitive drum 15 is rotated by a driving motor (not shown) at a predetermined outer peripheral velocity, and is charged by charger 16 that faces its surface. A plurality of beams (scan light beams) form spots at exposure position X on charged photosensitive drum 15.

An electrostatic latent image formed on photosensitive drum 15 is developed by toner (developing agent) supplied from developer 17. A toner image formed on photosensitive drum 15 by development is transferred at a transfer position onto paper sheet P, which is supplied by a paper feed system at a given timing, by transfer charger 18.

The paper feed system separates and discharges paper sheets P in paper cassette 21 provided at the bottom of the copying machine one by one using feed roller 22 and separation roller 23. Each separated and discharged paper sheet P is conveyed to registration rollers 24, and is fed to the transfer position at a predetermined timing, where the toner image is transferred onto paper sheet P. Paper convey mechanism 25, fixing device 26, and exhaust rollers 27 for exhausting paper sheet P that has undergone image formation are disposed on the downstream side of transfer charger 18. With these means, the toner image transferred onto paper sheet P is fixed by fixing device 26, and paper sheet P is then exhausted onto external exhaust tray 28 via exhaust rollers 27.

The residual toner on the surface of photosensitive drum 15 which has undergone transfer onto paper sheet P is removed by cleaner 20 to recover an initial state, i.e., to wait for the next image formation.

By repeating the aforementioned processes, image formation is successively done.

As described above, original O placed on platen 7 is scanned by scanner module 1, and scanned information undergoes a series of processes in printer module 2 and is then recorded as a toner image on paper sheet P.

Optical system unit 13 will be explained below.

Figure 2:
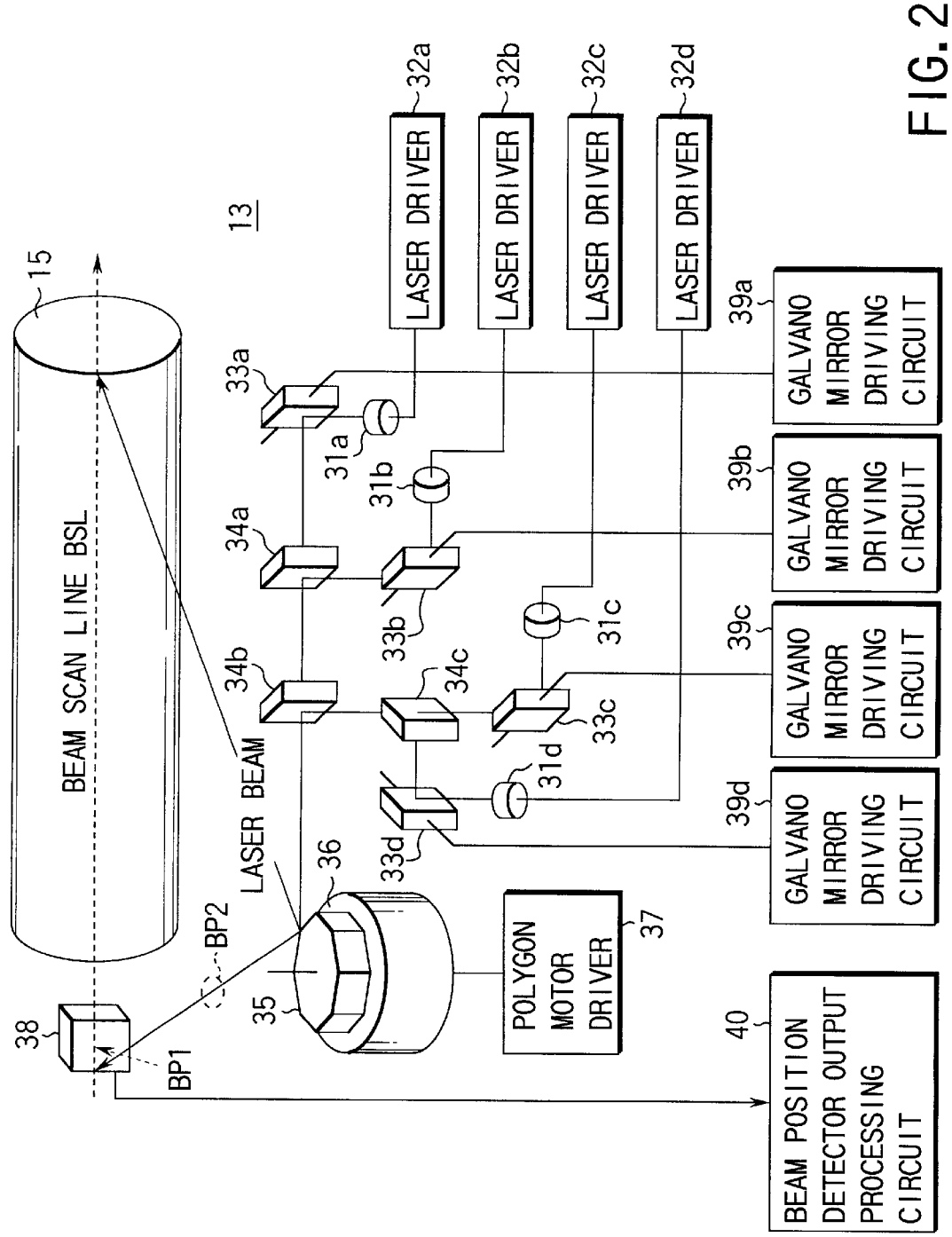
FIG. 2 is a view for explaining the arrangement of an optical system unit and the positional relationship between scanned laser beams and a photosensitive drum.

FIG. 2 shows the arrangement of optical system unit 13 and the positional relationship between these components and photosensitive drum 15. Optical system unit 13 incorporates four semi-conductor laser oscillators 31a, 31b, 31c, and 31d as four beam generation means. When these laser oscillators 31a to 31d simultaneously perform image formation for each scan line in collaboration with each other, high-speed image formation is achieved without extremely increasing the rotational speed of polygonal mirror 35.

That is, laser oscillator 31a is driven by laser driver 32a, and a laser beam output from oscillator 31a enters galvano mirror 33a serving as optical path changing means via a collimator lens (not shown). The beam reflected by galvano mirror 33a passes through half mirrors 34a and 34b, and becomes incident on polygonal mirror 35 as a rotary polygonal mirror.

Polygonal mirror 35 is rotated at a constant velocity by polygonal mirror motor 36 which is driven by polygonal mirror motor driver 37. In this manner, the beam reflected by polygonal mirror 35 scans in a given direction at an angular velocity defined by the rotational speed of polygonal mirror motor 36.

The laser beam which is scanned by polygonal mirror 35 and passes through an f-θ lens (not shown) scans the light-receiving surface of beam position detector 38 as a beam position detection means and the surface of photosensitive drum 15 at a constant velocity due to the f-θ characteristics of the f-θ lens.

Laser oscillator 31b is driven by laser driver 32b, and a laser beam output from oscillator 31b passes through a collimator lens (not shown), is reflected by galvano mirror 33b, and is also reflected by half mirror 34a. The beam reflected by half mirror 34a passes through half mirror 34b, and becomes incident on polygonal mirror 35. The beam route after polygonal mirror 35 is the same as that of the laser beam emitted by laser oscillator 31a mentioned above. That is, the beam passes through an f-θ lens (not shown) and scans the light-receiving surface of beam position detector 38 and the surface of photosensitive drum 15 at constant velocity.

Laser oscillator 31c is driven by laser driver 32c, and a laser beam output from oscillator 31c passes through a collimator lens (not shown), is reflected by galvano mirror 33c, passes through half mirror 34c, is reflected by half mirror 34b, and then strikes polygonal mirror 35. The beam route after polygonal mirror 35 is the same as those of the laser beams emitted by laser oscillators 31a and 31b mentioned above. That is, the beam passes through an f-θ lens (not shown) and scans the light-receiving surface of beam position detector 38 and the surface of photosensitive drum 15 at constant velocity.

Laser oscillator 31d is driven by laser driver 32d, and a laser beam output from oscillator 31d is reflected by galvano mirror 33d, is reflected by half mirror 34c, is reflected by half mirror 34b, and then strikes polygonal mirror 35. The beam route after polygonal mirror 35 is the same as those of the laser beams emitted by laser oscillators 31a, 31b, and 31c mentioned above. That is, the beam passes through an f-θ lens (not shown) and scans the light-receiving surface of beam position detector 38 and the surface of photosensitive drum 15 at constant velocity.

In this manner, laser beams output from independent laser oscillators 31a, 31b, 31c, and 31d are mixed by half mirrors 34a, 34b, and 34c, and the four laser beams travel in the direction of polygonal mirror 35.

Therefore, the four laser beams can simultaneously scan the surface of photosensitive drum 15, and can record an image at a speed four times faster than a single beam when the rotational speed of polygonal mirror 35 remains the same.

Galvano mirrors 33a, 33b, 33c, and 33d adjust (control) the positional relationship among beams in the sub-scan direction (the longitudinal axis direction of photosensitive drum 15), and galvano mirror driving circuits 39a, 39b, 39c, and 39d for respectively driving these mirrors are connected thereto.

Beam position detector 38 detects the passage positions and timings of the four laser beams, and is disposed at position BP1 near the end portion of photosensitive drum 15 so that its light-receiving surface is equivalent to the surface of photosensitive drum 15.

Since the rotational speed of polygonal mirror 35 and the geometric positional relationship among polygonal mirror 35, detector 38, and drum 15 are known in advance, the current spot position of a given laser beam on scan line BSL or the timing at which the laser beam passes a specific position of photosensitive drum 15 can be detected by measuring the time elapsed from the instance at which the laser beam reflected by polygonal mirror 35 was detected by detector 38.

In other words, even when beam position detector 38 is not actually placed at a given position on the beam scan surface of photosensitive drum 15, the current spot position of a given laser beam on scan line BSL can be detected based on the detection result of detector 38 placed at a different position. Such "different position" corresponds to a position "equivalent to" the surface of photosensitive drum 15 mentioned above.

That is, "equivalent to the surface of photosensitive drum 15" indicates a position anywhere on an extended line of beam scan line BSL on photosensitive drum 15 or a line that connects line BSL and the beam reflection surface of polygonal mirror 35 (e.g., position BP1 or BP2 in FIG. 2). As this position, FIG. 2 exemplifies position BP1 as the position of detector 38.

Control of galvano mirrors 33a, 33b, 33c, and 33d corresponding to the individual beams (image forming position control in the sub-scan direction), control of emission power levels (intensities) of laser oscillators 31a, 31b, 31c, and 31d, and control of emission timings (image forming position control in the main scan direction) are done on the basis of the detection signal from beam position detector 38 (details of such control processes will be explained later). In order to generate a signal for these control processes, beam position detector output processing circuit 40 is connected to beam position detector 38.

The digital copying machine shown in FIG. 1 which comprises the multi-beam optical system shown in FIG. 2 has a plurality of lasers, and requires beam control to hold a predetermined relationship among beams. Beam position detector 38 shown in FIG. 2 comprises beam detect sensor 380 with a special arrangement suitable for the beam control of this multi-beam optical system.

Figure 3:
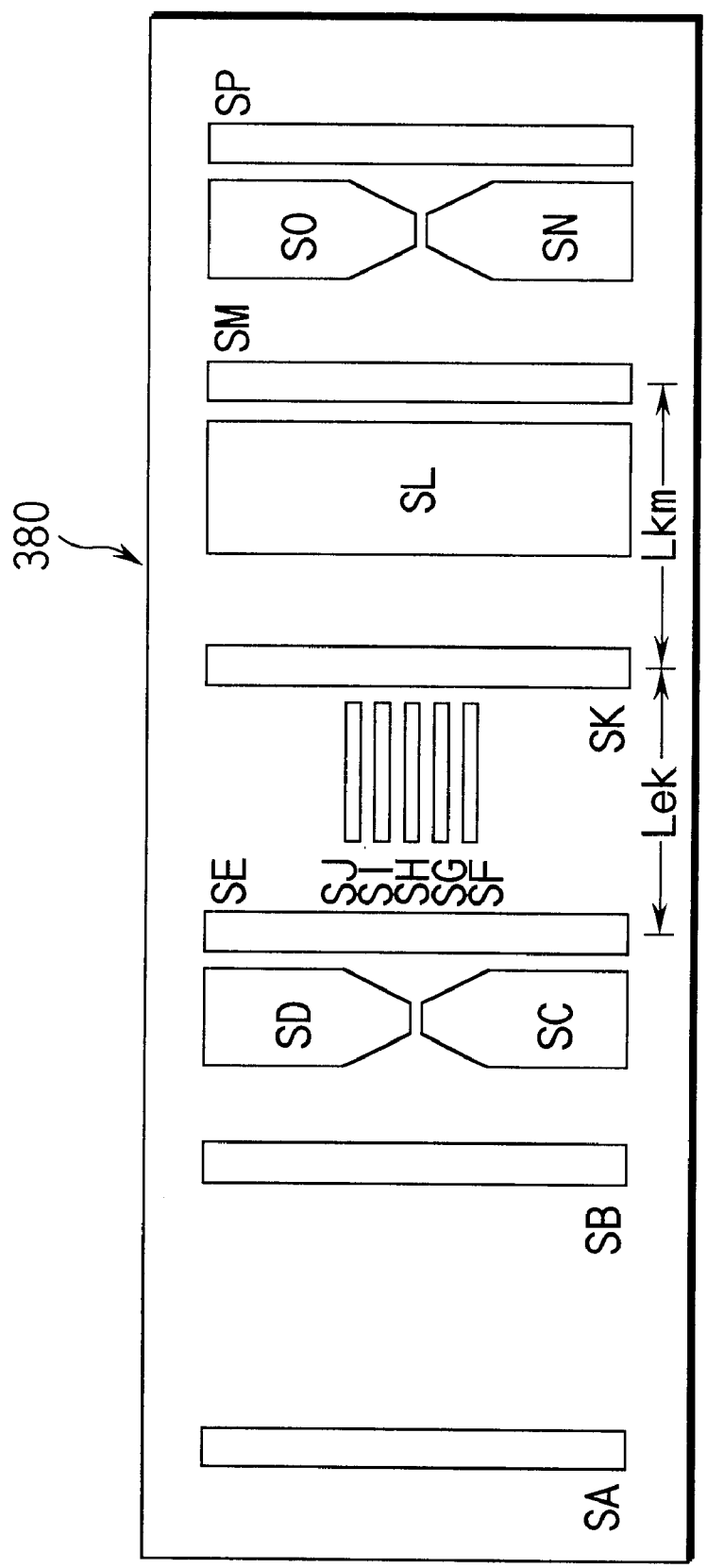
FIG. 3 exemplifies a sensor pattern of a beam detect sensor that forms a beam position detector shown in FIG. 2.

The layout pattern of photosensor light-receiving portions SA to SP that construct beam detector sensor 380 is as shown in, e.g., FIG. 3. Each of these photosensor light-receiving portions SA to SP is composed of a light detection element such as a photodiode. A laser beam reflected by polygonal mirror 35 shown in FIG. 2 scans across the pattern of sensor 380 shown in FIG. 3 from the left (SA side) to the right (SP side).

Incidentally, laser drivers 32a–32s may serve as means for changing the amount of light of the corresponding beams. Galvano mirrors 33a–33d may serve as means for changing the path of light of the corresponding beams.

The pattern shown in FIG. 3 can be used in case of a four-beam arrangement at 600 dpi (dots per inch), and is formed by 16 photosensor light-receiving portions (photodiodes) SA to SP having predetermined shapes and positions. Functions of these light-receiving portions SA to SP will be explained below.

<01> Light-receiving portion SA is used to generate various timing signals by detecting the passage timing of a main scan beam on photosensitive drum 15.

More specifically, a combination of light-receiving portions SA and SB generates an integrator reset signal for tilt detection light-receiving portions SC and SD;

a combination of light-receiving portions SA and SE generates an integrator reset signal for sub-scan beam position detection; p1 a combination of light-receiving portions SA and SK generates an integrator reset signal for beam amount detection;

a combination of light-receiving portions SA and SM generates an integrator reset signal for tilt detection light-receiving portions SN and SO; and a combination of light-receiving portions SA and SB generates a sync signal (HSYNC signal).

<02> Light-receiving portion SB is also used to detect the passage timing of a main scan beam.

More specifically, a combination of light-receiving portions SB and SA generates an integrator reset signal for tilt detection light-receiving portions SC and SD; and a combination of light-receiving portions SB and SA generates a sync signal (HSYNC signal).

<03> Light-receiving portion SC is used to detect the relative tilt between the light-receiving surface of sensor 380 and the incoming laser beam.

More specifically, a combination of light-receiving portions SC and SD makes tilt detection on th e upstream side.

<04> Light-receiving portion SD is also used to detect the relative tilt between the light-receiving surface of sensor 380 and a laser beam that enters this sensor.

More specifically, a combination of light-receiving portions SD and SC makes tilt detection on the upstream side.

<05> Light-receiving portion SE is used to generate various timings.

More specifically, light-receiving portion SE generates a start signal of AID conversion (or an AID process in a broader sense) of the tilt detection result (analog amount) by the combination of light-receiving portions SC and SD; and a combination of light-receiving portions SE and SA generates an integrator reset signal for sub-scan beam position detection.

<06> Light-receiving portion SF is used to detect the beam position (sub-scan beam position) of beam d (if a to d represent the four laser beams) in combination with light-receiving portion SG.

<07> Light-receiving portion SG is used to detect the beam position (sub-scan beam position) of beam d in combination with light-receiving portion SF, and to detect the beam position (sub-scan beam position) of beam c in combination with light-receiving portion SH.

<08> Light-receiving portion SH is used to detect the beam position (sub-scan beam position) of beam c in combination with light-receiving portion SG, and to detect the beam position (sub-scan beam position) of beam b in combination with light-receiving portion SI.

<09> Light-receiving portion SI is used to detect the beam position (sub-scan beam position) of beam b in combination with light-receiving portion SH, and to detect the beam position (sub-scan beam position) of beam a in combination with light-receiving portion SJ.

<10> Light-receiving portion SJ is used to detect the beam position (sub-scan beam position) of beam a in combination with light-receiving portion SI.

<11> Light-receiving portion SK is used to generate various timings.

More specifically, light-receiving portion SK generates a start signal of A/D conversion (A/D process) of the sub-scan beam position detection result (analog amount); and a combination of light-receiving portions SK and SA generates an integrator reset signal for beam amount (power) detection.

<12> Light-receiving portion SL is used to detect the beam amount (power).

<13> Light-receiving portion SM is used to generate various timings.

More specifically, light-receiving portion SM generates a start signal of A/D conversion (A/D process) of the beam amount (power) detection result (analog amount); and a combination of light-receiving portions SM and SA generates an integral result signal for tilt detection by a combination of light-receiving portions SN and SO.

<14> Light-receiving portion SN is used to detect the relative tilt between the light-receiving surface of sensor 380 and a laser beam that enters this sensor.

More specifically, a combination of light-receiving portions SN and SO makes tilt detection on the downstream side.

<15> Light-receiving portion SO is also used to detect the relative tilt between the light-receiving surface of sensor 380 and a laser beam that enters this sensor.

More specifically, a combination of light-receiving portions SO and SN make tilt detection on the downstream side.

<16> Light-receiving portion SP is used to, e.g., detect the passage timing of a main scan beam.

More specifically, light-receiving portion SP detects the passage timing of a main scan beam, and generates a start signal of A/D conversion (A/D process) of the tilt detection result (analog amount) from light-receiving portions SN and SO.

To summarize the aforementioned functions, beam detect sensor 380 shown in FIG. 3 can have (1) a sub-scan beam position detection function, (2) a main scan beam passage timing detection function, (3) a beam amount (power) detection function, and (4) a tilt detection function.

In the arrangement shown in FIG. 3, spacing Lek between photosensor light-receiving portions SE and SK is equal to spacing Lkm between photosensor light-receiving portions SK and SM. Offset detection can be implemented by integrating the sensor outputs from photosensor light-receiving portions SK and SM while photosensor light-receiving portions SF to SJ are not irradiated with any beam.

A control system for the copying machine shown in FIG. 1 will be explained below.

Figure 4:
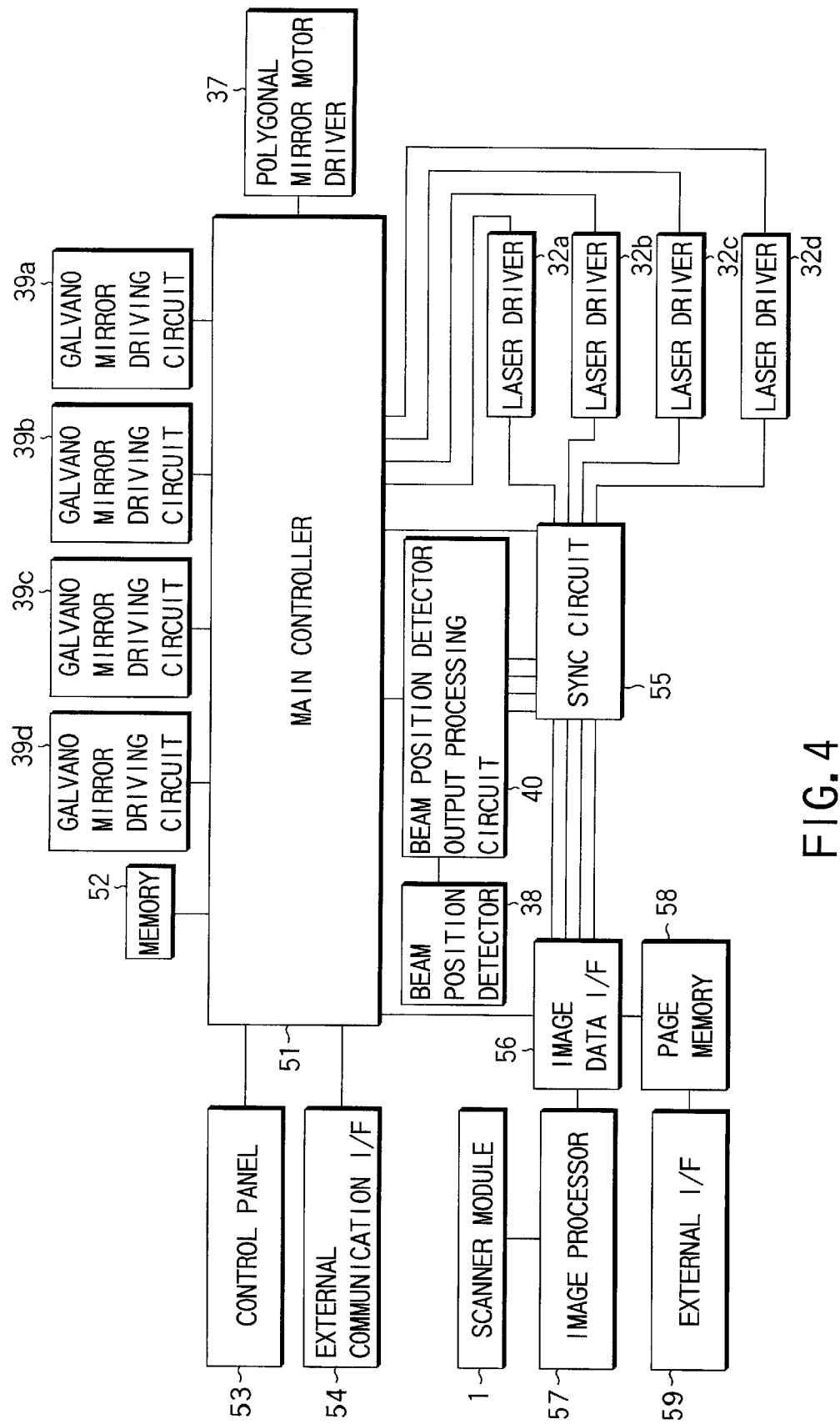
FIG. 4 is a block diagram for explaining a main controller that controls a multi-beam optical system and its peripheral arrangement.

FIG. 4 shows the main control system that mainly controls the multi-beam optical system. More specifically, reference numeral 51 denotes a main controller for controlling the overall system, which is constructed based on a microcomputer MPU or one-chip CPU. To this main controller 51, memory 52, control panel 53, external communication interface (I/F) 54, laser drivers 32a, 32b, 32c, and 32d, polygonal mirror motor driver 37, galvano mirror driving circuits 39a, 39b, 39c, and 39d, beam position detector output processing circuit 40 serving as a signal processing means, sync circuit 55, and image data interface (I/F) 56 are connected.

Image data I/F 56 is connected to sync circuit 55, and image processor 57 and page memory 58 are connected to image data I/F 56. Scanner module 1 is connected to image processor 57, and external interface (I/F) 59 is connected to page memory 58.

The flow of image data upon forming an image will be briefly explained below.

In case of the copying operation, as has been explained previously with reference to FIG. 1, an image of original O set on platen 7 is scanned by scanner module 1, and is sent to image processor 57. Image processor 57 performs known processes such as shading correction, various kinds of filtering, halftoning, gamma correction, and the like for the image signal from scanner module 1.

Image data output from image processor 57 is sent to image data I/F 56. Image data I/F 56 serves to distribute the image data to four laser drivers 32a, 32b, 32c, and 32d.

Sync circuit 55 generates clocks synchronous with the passage timings of the individual laser beams above beam position detector 38. In synchronism with these clocks, image data I/F 56 outputs image data as a laser modulation signal to laser drivers 32a, 32b, 32c, and 32d. By transferring image data in synchronism with scans of the laser beams, image formation which is synchronized in the main scan direction (onto a correct position) is done.

Sync circuit 55 includes a sample timer for forcing laser oscillators 31a to 31d to emit light on a non-image region to control the power levels of the respective laser beams, a logic circuit for making laser oscillators 31a to 31d emit light on beam position detector 38 in the order of beams to take image forming timings of the respective laser beams, and the like.

Control panel 53 is a man-machine interface with which the user starts copying operation, sets a copy count, and so forth.

This digital copying machine can not only form copies but also form and output image data externally input via external I/F 59 connected to page memory 58 (i.e., as a printer). Note that image data input from external I/F 59 is temporarily stored in page memory 58, and is then sent to sync circuit 55 via image data I/F 56.

When this digital copying machine is externally controlled via, e.g., a network, external communication I/F 54 serves as control panel 53.

Galvano mirror driving circuits 39a, 39b, 39c, and 39d respectively drive galvano mirrors 33a, 33b, 33c, and 33d in accordance with an instruction value from main controller 51. Therefore, main controller 51 can freely control the angles of galvano mirrors 33a to 33d via galvano mirror driving circuits 39a to 39d.

Polygonal mirror motor driver 37 drives polygonal mirror motor 36 that rotates polygonal mirror 35, which scans the aforementioned four beams. Main controller 51 can issue rotation start/stop instructions and a rotational speed switch instruction to that polygonal mirror motor driver 37. The rotational speed switch instruction is issued when beam position detector 38 sets a rotational speed lower than a predetermined one as needed upon confirming the passage position of each beam.

Laser drivers 32a to 32d have a function of forcing laser oscillators 31a to 31d to emit light irrespective of image data by a forced emission signal from main controller 51, in addition to a function of making these oscillators emit light in accordance with a laser modulation signal which is output from sync circuit 55 and is synchronous with scans of the beams, as described above.

Main controller 51 sets the power levels upon light emission of laser oscillators 31a to 31d in laser drivers 32a to 32d. The emission power levels to be set are changed in accordance with a change in image forming process condition, the beam passage position detection result, and the like.

Memory 52 stores information required for control. For example, when memory 52 stores information such as the controlled variables of galvano mirrors 33a to 33d, the arrival order of laser beams, and the like, optical system unit 13 can become ready to form an image immediately after power ON.

The passage (scan) position control of laser beams will be explained below.

Figure 5:
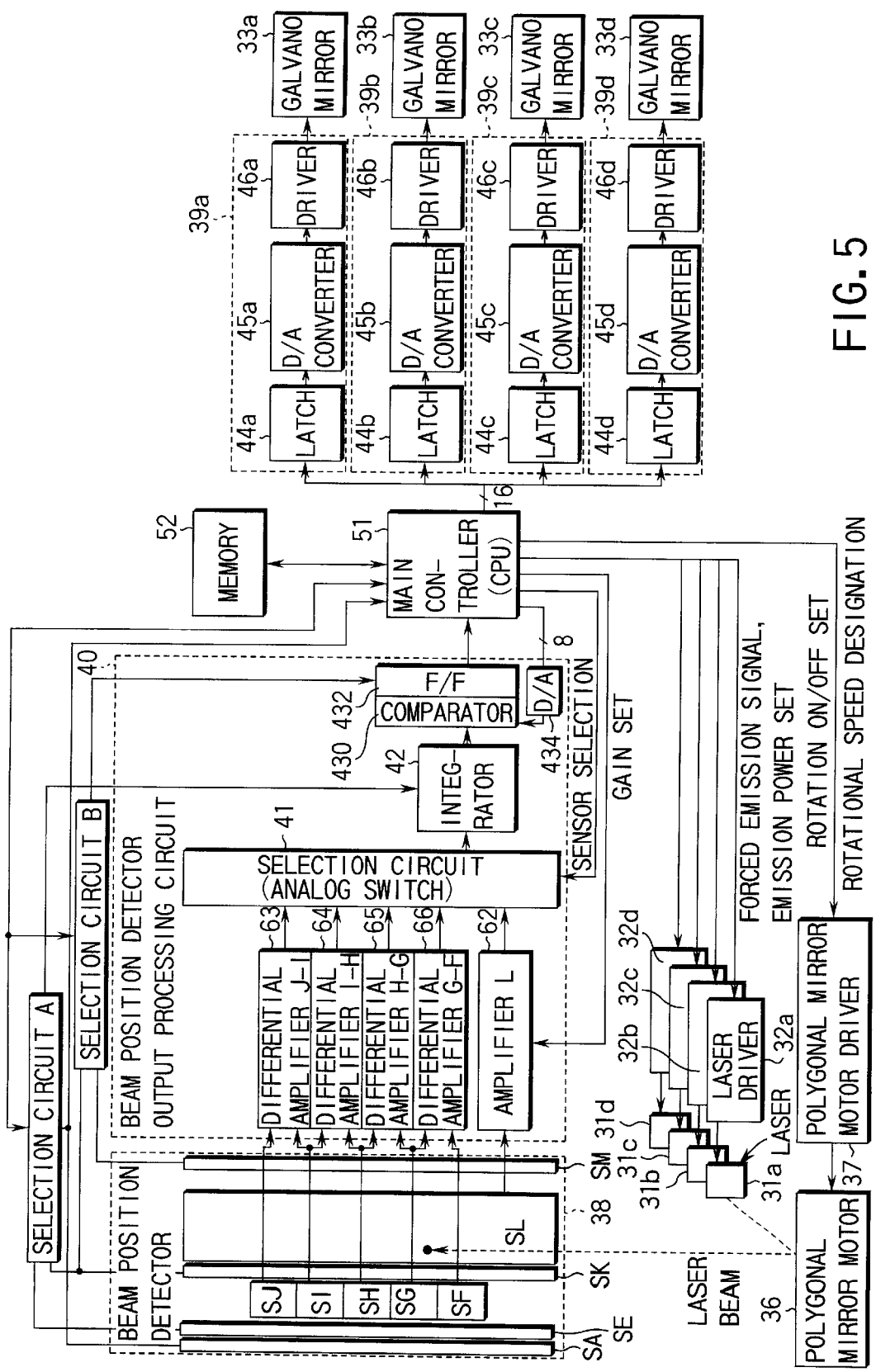
FIG. 5 is a circuit diagram showing details of blocks that pertain to multi-beam control (using a single comparator) in the block diagram shown in FIG. 4.

FIG. 5 is a diagram for explaining the passage position control of laser beams with respect to photosensitive drum 15 shown in FIG. 2, and an offset detection/correction process (to be described later), and showing details of blocks that pertain to beam control in the block diagram shown in FIG. 4.

Sensor patterns (sensor light-receiving portions comprised of photodiodes) SA, SE, SK, and SM of beam detect sensor 380 shown in FIG. 3, which form beam position detector 38, output pulse signals when a laser beam has passed (crossed or traversed) them.

Also, a plurality of sensor patterns (sensor light-receiving portions) SF to SJ output independent signals in accordance with the passage positions of laser beams. For example, when a given laser beam has passed SF, the photodiode of sensor SF outputs a pulse signal. When a laser beam has passed a position near the boundary between SF and SG, the photodiodes of both sensors SF and SG output pulse signals.

Likewise, when a laser beam has passed a position near the boundary between SI and SJ, the photodiodes of both sensors SI and SJ output pulse signals. When a laser beam has passed SJ, the photodiode of sensor SJ outputs a pulse signal.

Furthermore, sensor pattern (sensor light-receiving portion) SL outputs a signal (analog) corresponding to the light amount (power) of each of four laser beams that have passed them.

The signal output from the photodiode of sensor pattern SL is amplified at a predetermined gain by amplifier 62 (amplifier L), and the amplified signal is supplied to selection circuit (analog switch) 41. The gain of amplifier L can be changed in accordance with a command from main controller 51.

The signal output from the photodiode of sensor pattern SJ is supplied to one input of differential amplifier 63 (differential amplifier J-I).

The signal output from the photodiode of sensor pattern SI is supplied to the other input of differential amplifier 63 (differential amplifier J-I), and also to one input of differential amplifier 64 (differential amplifier I-H).

The signal output from the photodiode of sensor pattern SH is supplied to the other input of differential amplifier 64 (differential amplifier I-H), and also to one input of differential amplifier 65 (differential amplifier H-G).

The signal output from the photodiode of sensor pattern SG is supplied to the other input of differential amplifier 65 (differential amplifier H-G), and also to one input of differential amplifier 66 (differential amplifier G-F).

The signal output from the photodiode of sensor pattern SF is supplied to the other input of differential amplifier 66 (differential amplifier G-F).

That is, the output signals from the photodiodes of sensor patterns SF to SJ are respectively input to differential amplifiers 63 to 66, each of which amplifies the difference between the output signals from adjacent or neighboring ones of sensor patterns SF to SJ.

Differential amplifier 63 amplifies the difference between the output signals from sensor patterns SJ and SI, and supplies the amplified signal to selection circuit (analog switch) 41.

Likewise, differential amplifier 64 amplifies the difference between the output signals from sensor patterns SI and SH, and supplies the amplified signal to selection circuit 41. Differential amplifier 65 amplifies the difference between the output signals from sensor patterns SH and SG, and supplies the amplified signal to selection circuit 41. Differential amplifier 66 amplifies the difference between the output signals from sensor patterns SG and SF, and supplies the amplified signal to selection circuit 41.

Selection circuit 41 selects one of the input signals in accordance with a sensor select signal from main controller (CPU) 51, and supplies the selected signal to integrator 42. Integrator 42 integrates the signal selected by selection circuit 41.

The pulse signals respectively output from the photodiodes of sensor patterns SA, SE, and SK are input to selection circuit A. Selection circuit A selects one of the pulse signals from SA, SE, and SK, and supplies the selected signal to integrator 42. Integrator 42 is reset by the supplied pulse signal to start integration of the signal input from selection circuit 41.

That is, integrator 42 starts integration in accordance with the layout of sensor patterns (sensor light-receiving portions composed of photodiodes) SA, SE, and SK of beam detect sensor 380 shown in FIG. 3, and the passage timings of a laser beam which has crossed there.

Note that integrator 42 has a function of removing noise, removing influences of any tilt of beam position detector 38 upon attachment, and the like.

On the other hand, the pulse signals respectively output from the photodiodes of sensor patterns SK and SM are input to selection circuit B. Selection circuit B selects one of the pulse signals from SK and SM in accordance with a command from main controller 51, and supplies the selected signal to flip-flop circuit 432 (to be described later). Flip-flop circuit 432 is clocked by the supplied pulse signal to make predetermined operation.

That is, flip-flop circuit 432 makes flip-flop operation in accordance with the layout of sensor patterns (sensor light-receiving portions comprised of photodiodes) SK and SM of beam detect sensor 380 shown in FIG. 3, and the passage timings of a laser beam that has crossed there at a predetermined speed (as will be described later, this flip-flop operation is associated with A/D conversion of the present invention).

In this manner, integrator 42 is reset by the pulse signal from one of sensor patterns SA, SE, or SK when a laser beam has passed the beam detect sensor 380, thus starting integration. While a laser beam is passing the sensor patterns of beam detect sensor 380, integrator 42 integrates the signal indicating the passage position of the laser beam. During this interval, the integration result of integrator 42 undergoes an A/D process (the circuit arrangement for this A/D process and operations will be described later with reference to other drawings) substantially corresponding to A/D conversion without using any normal A/D conversion device by a circuit operation simplemented by a loop of comparator 430, flip-flop circuit 432, main controller 51, and D/A converter 434.

The A/D process that includes integration can convert the detection signal, which suffers less noise, and from which influences of any tilt of beam position detector 38 upon attachment are removed, into a digital signal.

Note that amplifiers 62 to 66, selection circuit 41, integrator 42, comparator 430, flip-flop circuit 432, and D/A converter 434 construct beam position detector output processing circuit 40.

In this manner, the beam position detection signal from beam position detector 38, which is converted into a digital signal, is input to main controller 51 as beam position information, and is used to check the passage positions, laser light amounts (power levels), and the like of the laser beams.

Based on the beam position detection signal obtained in this way, main controller 51 computes controlled variables of galvano mirrors 33*a* to 33*d*. The computation results are stored in memory 52 as needed. Main controller 51 outputs the computation results to galvano mirror driving circuits 39*a* to 39*d*.

Galvano mirror driving circuits 39*a* to 39*d* respectively have latches 44*a* to 44*d* for holding these computation result data, as shown in FIG. 5. Once data from main controller 51 is written, these latches hold the written value until the next update timing of data.

Data held in latches 44*a* to 44*d* are converted into analog signals (voltages) by D/A converters 45*a* to 45*d*, and these analog signals are input to drivers 46*a* to 46*d* for driving galvano mirrors 33*a* to 33*d*. Drivers 46*a* to 46*d* control driving of galvano mirrors 33*a* to 33*d* in accordance with the analog signals (voltages) input from D/A converters 45*a* to 45*d*.

In this embodiment, since one of the output signals from sensor patterns SF to SJ is selected by selection circuit 41, and the selection signal undergoes integration and the A/D process, these output signals cannot be simultaneously input to main controller 51.

Therefore, while the passage positions of laser beams are unknown, selection circuit 41 must be switched in turn to sequentially input the output signals from all sensor patterns SF to SJ to main controller 51 so as to determine the passage positions of the beams.

However, once the passage positions of the laser beams can be recognized, the prospective passage positions of laser beams can be roughly estimated unless galvano mirrors 33*a* to 33*d* move extremely, and the output signals from all sensor patterns need not always be input to main controller 51.

Detection and correction of an offset value in beam position detector output processing circuit 40 will be explained below.

Figure 6:
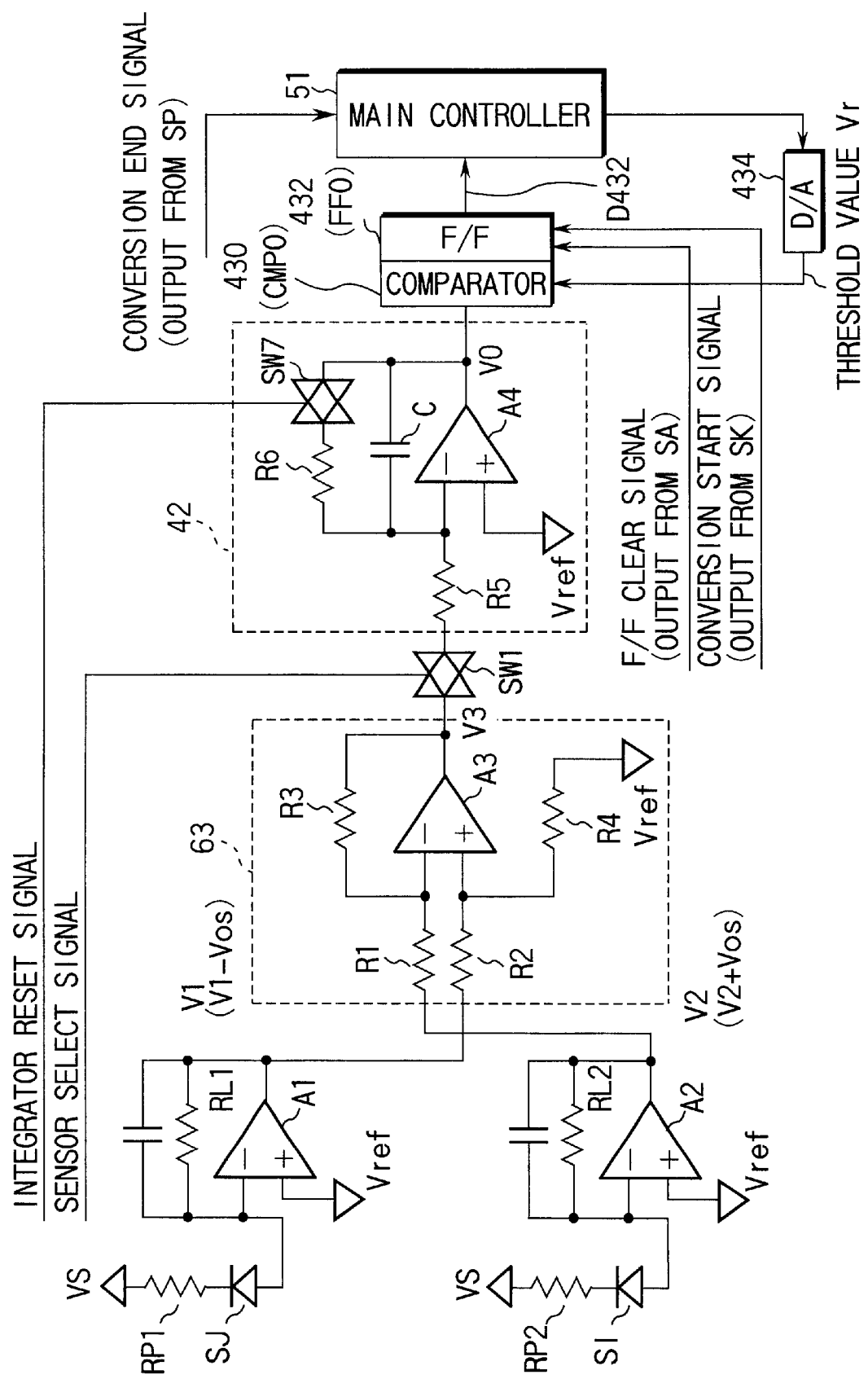
FIG. 6 is a circuit diagram for explaining the circuit arrangement from a sensor pattern for beam position detection to an integrator of the beam detect sensor in a beam position detector output processing circuit shown in FIG. 5.

FIG. 6 shows an example of the circuit arrangement up to integrator 42 for sensor patterns SJ and SI in beam position detector output processing circuit 40.

Referring to FIG. 6, currents that flow through sensor patterns (photodiodes) SJ and SI are respectively amplified by operational amplifiers A1 and A2 as current/voltage conversion circuits, and the amplified currents are sent to differential amplifier 63. Differential amplifier 63 is comprised of resistors R1 to R4, and operational amplifier A3.

The output from differential amplifier 63 is sent to integrator 42 via analog switch SW1 that constructs selection circuit 41. Integrator 42 comprises operational amplifier A4, integration resistor R5, integration capacitor C, integrator reset analog switch SW7, and protection resistor R6.

Integration output Vo from integrator 42 is sent to comparator (window comparator in other embodiments) 430. Comparator 430 compares integration output Vo with threshold value Vr obtained by D/A-converting comparison reference value data (digital), which is supplied from main controller 51, by DAC 434, and sends the comparison result to flip-flop circuit 432.

Flip-flop circuit 432 is set with contents corresponding to the comparison result from comparator 430 a predetermined time after the beginning of integration, and supplies its output (digital bit) D432 to main controller 51.

Main controller 51 corrects comparison reference data based on this output D432, and supplies the corrected data to DAC 434. Then, threshold value Vr of comparator 430 is corrected slightly, and Vo and Vr are compared again.

When a loop of comparison to correction of threshold value Vr repeats itself several times, comparison reference value data (digital) from main controller 51 can have contents corresponding to integration output Vo (analog).

Upon completion of the A/D process of integration output Vo, a conversion end signal is supplied to main controller 51. Upon receiving the conversion end signal, main controller 51 stores integration output Vo (e.g., beam position information) that has been converted into a digital value.

Note that an example of the arrangement up to integrator 42 for sensor patterns SH, SG, and SF is basically the same as that up to integrator 42 for sensor patterns SJ and SI, and a detailed description thereof will be omitted.

An offset voltage (offset value) of an operational amplifier will be briefly explained below using FIGS. 7A and 7B.

Figure 7A:
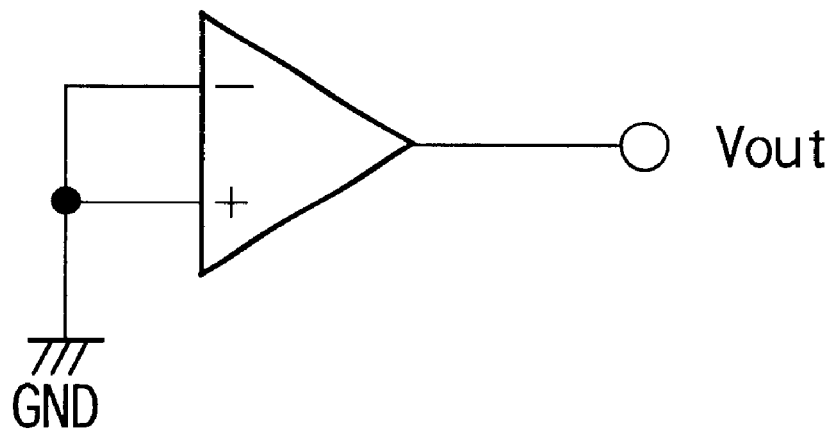
FIGS. 7A and 7B explain an offset of an operational amplifier.

Referring to FIG. 7A, an ideal operational amplifier outputs zero if the voltage difference between its non-inverting input (+) and inverting input (−) is zero. However, in practice, even though the non-inverting and inverting inputs are connected to the ground potential (GND) to set the input voltage difference to be "0", non-zero output voltage Vout appears at the output terminal. Such non-zero output is produced irrespective of zero input difference mainly by variations of characteristics of differential input transistors provided at the initial stage of the operational amplifier.

Figure 7B:
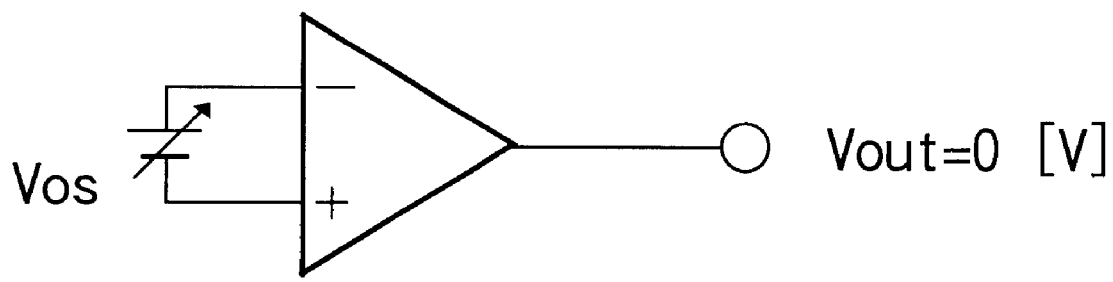

In order to obtain output voltage Vout=0 [V] from the operational amplifier that generates non-zero output in response to zero input difference, certain voltage Vos may be applied across different input terminals as shown by FIG. 7B. This voltage value is called input offset voltage Vos. An input offset voltage of a general operational amplifier is several mV at ordinary temperature, and varies depending on temperature.

The influences of the offset voltage of the operational amplifier on beam passage position detection and problems will be explained below with reference to FIG. 6 again.

Paying attention to a certain one (to be referred to as beam a hereinafter) of the multi-beams (four laser beams in the embodiment shown in FIG. 5), when the passage position of this beam a is located at the middle position between sensor patterns SJ and SI in FIG. 3 or 5, the detection result (voltage V1) of sensor pattern SJ is equal to that (voltage V2) of sensor pattern SI (V1=V2).

A case will be examined below wherein operational amplifiers A1 to A4 that construct beam position detector output processing circuit 40 in FIG. 6 have the following offset voltages.

Offset voltage of operational amplifier A1: −Vos [V]
Offset voltage of operational amplifier A2: +Vos [V]
Offset voltage of operational amplifier A3: +Vos [V]
Offset voltage of operational amplifier A4: +Vos [V]

In consideration of these offset voltages, the outputs from the operational amplifiers are:

Output from operational amplifier A1: V1−Vos [V]
Output from operational amplifier A2: V2+Vos [V]
Output from operational amplifier A3: (2Vos+Vos)×R3/R1=3Vos×R3/R1 [V]
Output from operational amplifier A4:−(3Vos×R3/R1+Vos)/R5/C×t [V]

for
V1=V2
R1=R2, R3=R4
R5: integration resistor, C: integration capacitor
t: integration time Since the outputs from sensor patterns SJ and SI are equal to each other (V=V2), the output from operational amplifier A4 (integrator) ideally becomes 0 [V]. However, the output from operational amplifier A4 does not become "0" due to the influences of the offset voltages of the respective operational amplifiers. That is, even when the passage position of a beam is an ideal one, the output from beam position detector output processing circuit 40 outputs wrong information indicating that the beam position has deviated.

For example, if constants are:
R2/R1=R4/R5=3
R5=220 [Ω]
C=150 [pF]
t=406 [ns]

then the integration output is around 0.615 [V]. When this value is converted into beam position information, it yields around 1.23 μm.

A method of detecting and correcting any information errors of beam passage position detection resulting from offsets of the operational amplifiers will be explained later in the description of another embodiment that uses a window comparator.

Figure 8:
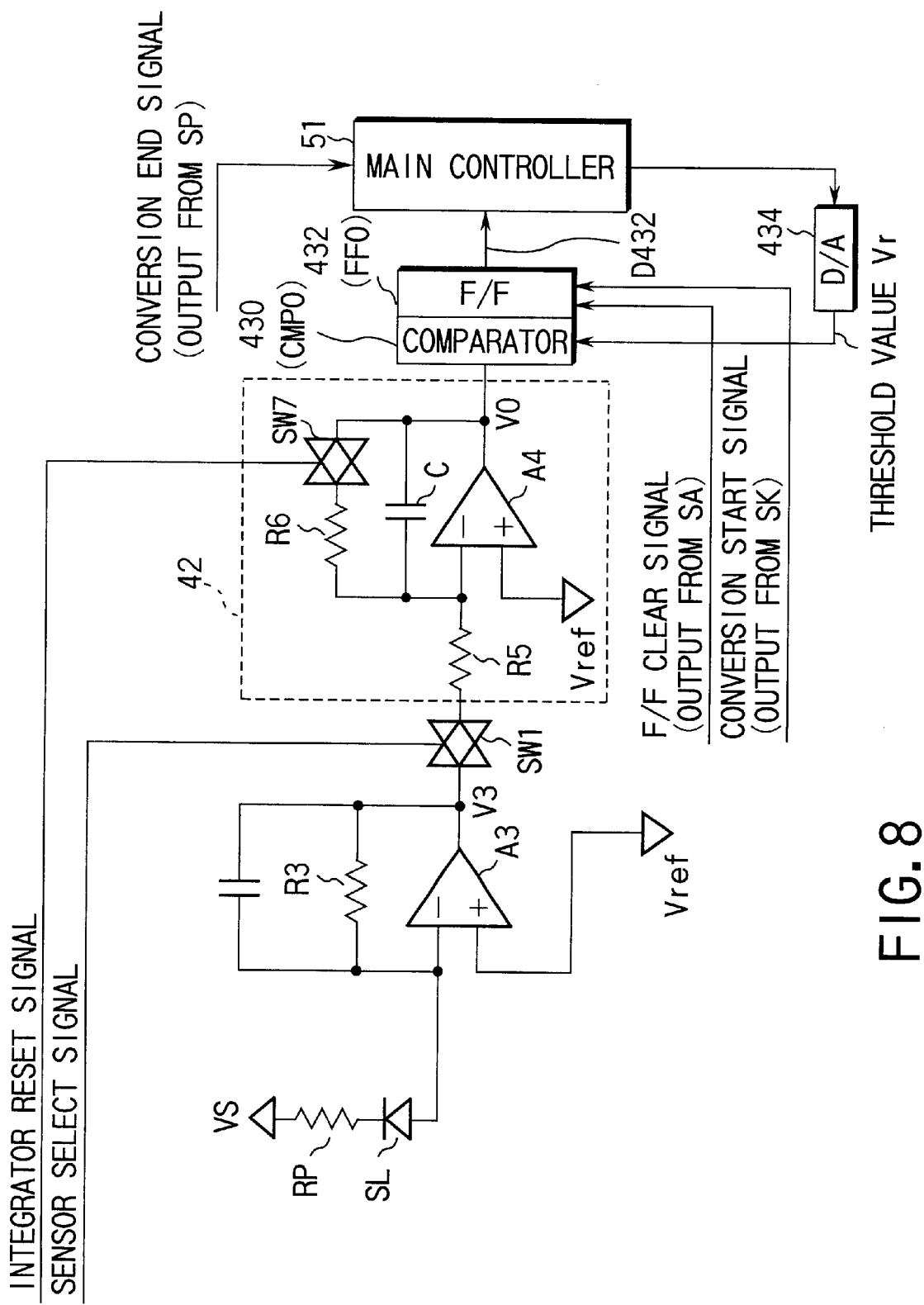
FIG. 8 is a circuit diagram for explaining the circuit arrangement from a sensor pattern for beam amount (power) detection to an integrator of the beam detect sensor in the beam position detector output processing circuit shown in FIG. 5.

FIG. 8 shows an example of the circuit arrangement up to integrator 42 for sensor pattern SL in beam position detector output processing circuit 40.

Referring to FIG. 8, a current that flows through sensor pattern (photodiode) SL is amplified by operational amplifier A3 as a current/voltage conversion circuit, and is sent to integrator 42 via analog switch SW1. Integrator 42 is constructed by operational amplifier A4, integration resistor R5, integration capacitor C, integrator reset analog switch SW7, and protection resistor R6.

Integration output Vo from integrator 42 is sent to comparator 430. Comparator 430 compares integration output Vo with threshold value Vr obtained by D/A-converting comparison reference value data (digital), which is supplied from main controller 51, by DAC 434, and sends the comparison result to flip-flop circuit 432.

Flip-flop circuit 432 is set with contents corresponding to the comparison result from comparator 430 a predetermined time after the beginning of integration, and supplies its output (digital bit) D432 to main controller 51.

Main controller 51 corrects comparison reference data based on this output D432, and supplies the corrected data to DAC 434. Then, threshold value Vr of comparator 430 is corrected slightly, and Vo and Vr are compared again.

When a loop of comparison to correction of threshold value Vr repeats itself several times, comparison reference value data (digital) from main controller 51 can have contents corresponding to integration output Vo (analog).

Upon completion of the A/D process of integration output Vo, a conversion end signal is supplied to main controller 51. Upon receiving the conversion end signal, main controller 51 stores integration output Vo (e.g., beam light amount information) that has been converted into a digital value.

Figure 9:
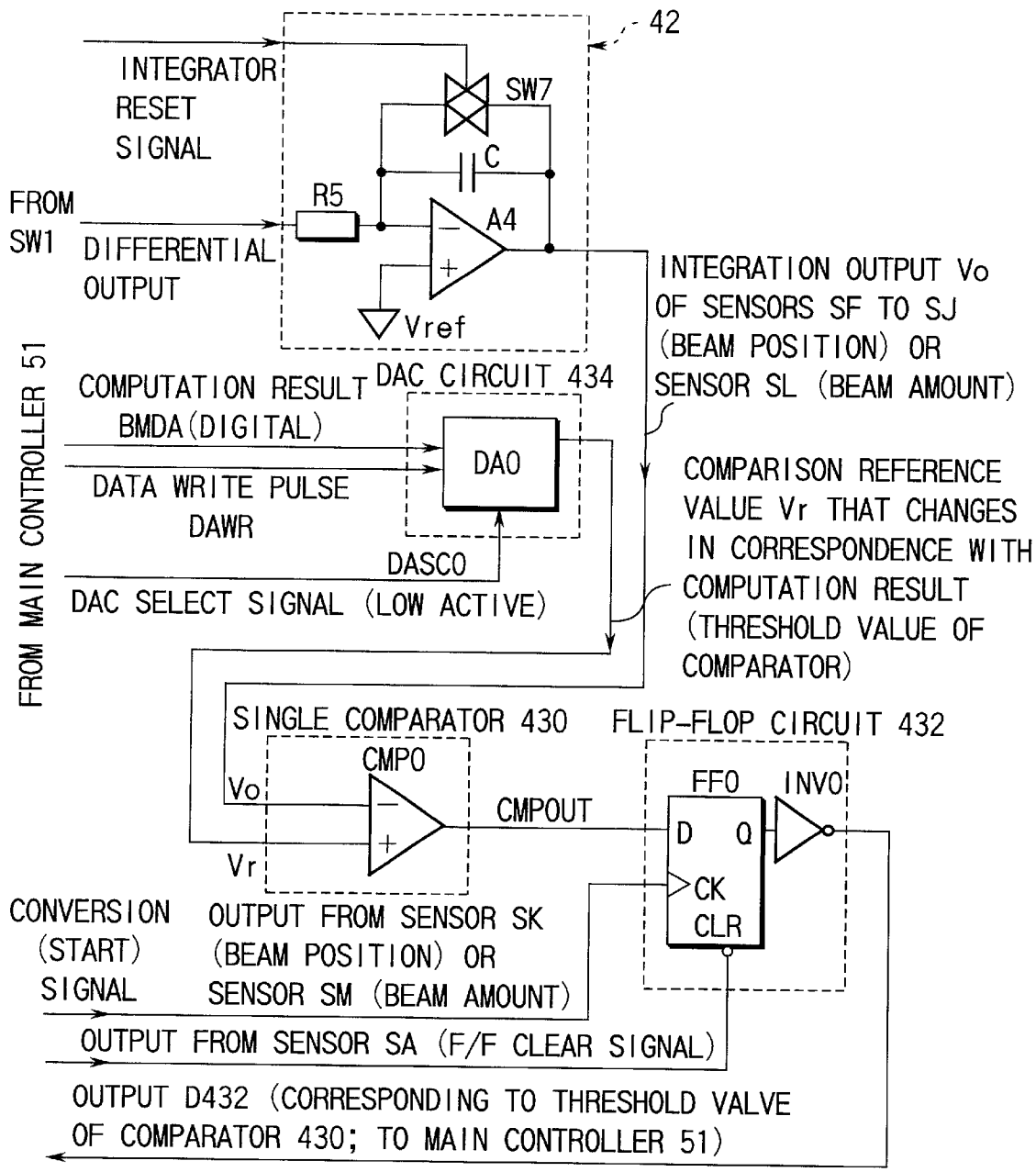
FIG. 9 is a circuit diagram for explaining an analog/digital processor using a single comparator according to an embodiment of the present invention.

FIG. 9 is a circuit diagram showing principal part of the arrangement (430, 432, 51, and 434 in FIGS. 5, 6, or 8) of an analog-to-digital processor (A/D processor) according to the embodiment of the present invention. This A/D processor can provide a function that replaces a conventional A/D converter.

Figure 10:
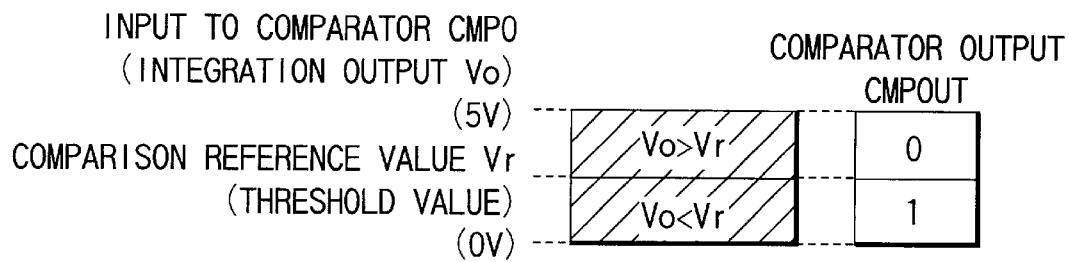
FIG. 10 is a view for explaining the In/Out relationship of the single comparator shown in FIG. 9.
Figure 11:
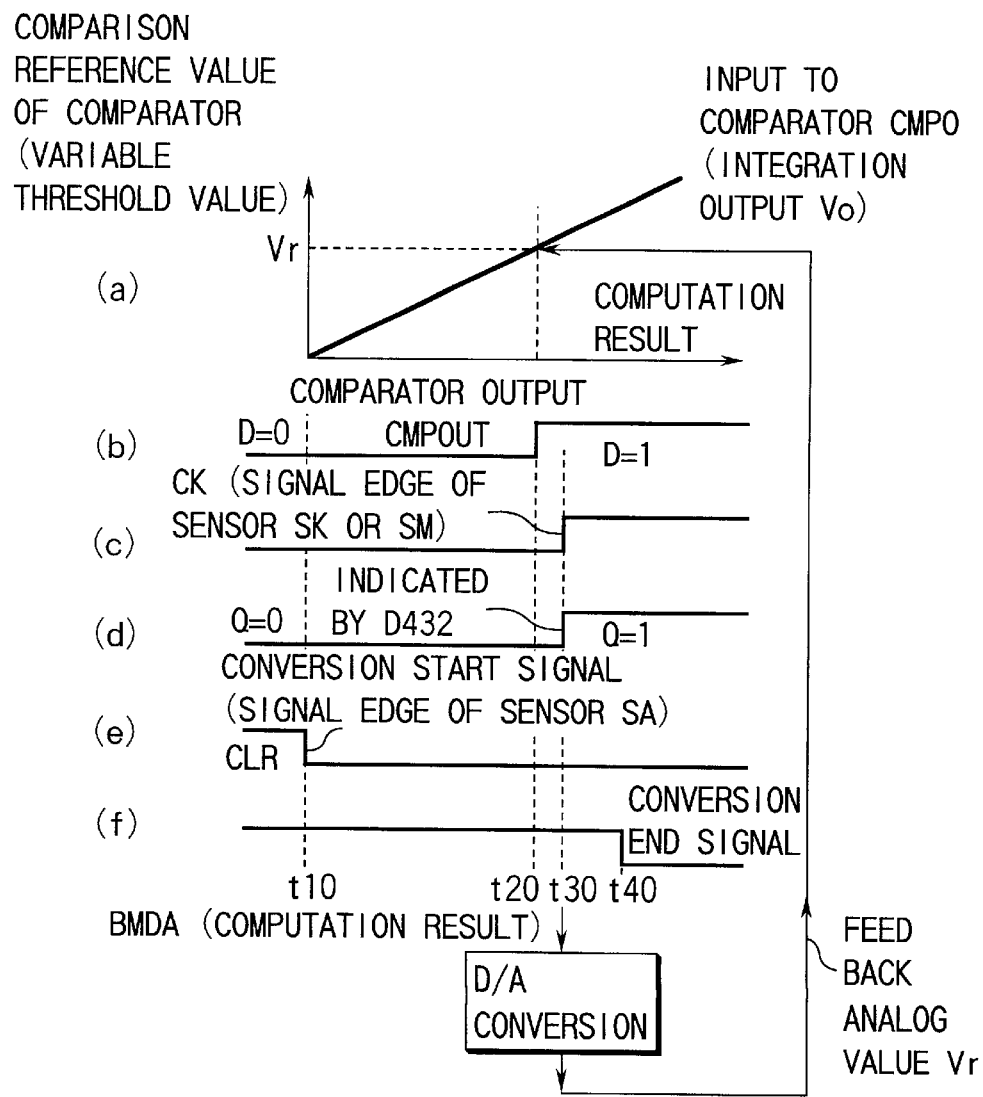
FIG. 11 shows charts for explaining the circuit operation of FIG. 9.

FIG. 10 shows the I/O relationship of comparator CMP0 (corresponding to comparator 430 in FIG. 5) shown in FIG. 9, and FIG. 11 shows signal waveforms of principal part of the A/D processor shown in FIG. 9.

In the circuit arrangement of this embodiment, the potential of integration output Vo of integrator 42 increases toward the + side with increasing received-light amount of a given sensor (or difference between the received-light amounts of two sensors) (the potential of Vo is proportional to the sensor received-light amount).

Referring to FIG. 9, when the signal input to integration circuit 42 is the output from differential amplifier 63 in FIG. 5, the object to be integrated is analog voltages detected by the photodiodes of sensor patterns SJ and SI shown in FIG. 3 or 5.

Likewise, when the signal input to integration circuit 42 is the output from differential amplifier 64, the object to be integrated is analog voltages detected by sensor patterns SI and SH. When the signal input to integration circuit 42 is the output from differential amplifier 65, the object to be integrated is analog voltages detected by sensor patterns SH and SG. Furthermore, when the signal input to integration circuit 42 is the output from differential amplifier 66, the object to be integrated is analog voltages detected by sensor patterns SG and SF.

On the other hand, when the signal input to operational amplifier A4 of integration circuit 42 is the output (not a differential output) from amplifier 62 in FIG. 5 or operational amplifier A3 in FIG. 8, integration output Vo from integration circuit 42 is an analog voltage that represents the laser light amount (power) detected by sensor pattern SL.

In this way, integration output Vo output from integration circuit 42 is an analog voltage corresponding to some (one or two) of the detection results of sensor patterns SF to SJ and SL.

The internal CPU of main controller 51 in FIGS. 5, 6, or 8 has a plurality of threshold value data in memory 52 in FIG. 5 (or its internal memory; not shown). These threshold value data are determined by experimentally computing correlation values between the actual beam positions on beam position detector 38 in FIG. 5 and corresponding integration outputs Vo.

These threshold value data correspond to Vr0 to Vr7 in an example shown in FIGS. 12 and 13 (to be described later), and digital data (e.g., 8-bit hexadecimal values) representing these values. The CPU of main controller 51 is programmed to be able to sequentially read out these threshold value data at predetermined timings during the A/D process.

Integration circuit 42 shown in FIG. 9 corresponding to integrator 42 in FIGS. 5, 6, or 8 is temporarily reset by the integrator reset signal from selection circuit A in FIG. 5, and then integrates a signal input via selection circuit 41 in FIG. 5 or analog switch SW1 in FIG. 6 at a time constant determined by the product of resistor R5 and capacitor C. With this integration, an analog voltage value from which noise pulses or high-frequency noise components are removed can be obtained. Obtained integration output Vo (analog voltage value which is to undergo the A/D process) is supplied to one input (−) of single comparator (CMP0) 430.

The CPU of main controller 51 in FIGS. 5, 6, or 8 initially supplies digital data (BMDA) that tentatively designates predetermined comparison reference value (initial threshold value of comparator CMP0) Vr to D/A converter DA0 of DAC circuit 434. As tentative comparison reference value (initial threshold value) Vr, a value corresponding to Vr0 (lowest threshold value) in, e.g., FIG. 12 may be used.

When D/A converter DAD is selected in response to DAC select signal DASCO from main controller 51, and main controller 51 supplies data write pulse DAWR to this DA0, digital data (BMDA; to be temporarily referred to as a computation result hereinafter) corresponding to tentative comparison reference value Vr (Vr0) is D/A-converted by DA0. Tentative comparison reference value Vr (initial threshold value Vr0) that has been converted into the analog voltage is supplied to the other input (+) of single comparator (CMP0) 430.

As shown in FIG. 10, single comparator (CMP0) 430 generates comparator output CMP0 UT of low level "0" if Vo>Vr; or that of high level "1" if Vo<Vr.

This comparator output CMPOUT (e.g., low level "0" when Vo>Vr) is supplied to the D input of D-flip-flop FF0 that forms flip-flop circuit 432 (t20 at (b) in FIG. 11).

This D-flip-flop FF0 is cleared by the signal from sensor pattern SA (t10 at (e) in FIG. 11), is latched by the signal edge of the detection signal from sensor pattern SK or SM (t30 at (c) in FIG. 11) to fetch the D input level at that time ("1", level if Vo>Vr in the above example) (t30 at (d) in FIG. 11), and stores the fetched logic level until the next clock.

In this case, when the differential output of, e.g., sensor patterns SJ and SI is input to integration circuit 42, D-flip-flop FF0 is latched by the signal edge of sensor pattern SK, and stores the comparison result (D input level that pertains to the beam position) at that time.

When the output from sensor pattern SL is input to integration circuit 42, D-flip-flop FF0 is latched by the signal edge of sensor pattern SM, and stores the comparison result (D input level that pertains to the beam light amount) at that time.

The Q output of the logic level("0" level if Vo>Vr in the above example) stored in D-flip-flop FF0 is inverted by inverter INV0, and the inverted output is returned to main controller 51 as output (digital bit) D432 ("1" level) of flip-flop circuit 432.

Note that main controller 51 fetches the output data (D432) from flip-flop circuit 432 in response to the output from most downstream sensor SP as a trigger.

The CPU of main controller 51 can update comparison reference value Vr (e.g., Vr0→Vr1) as needed in response to returned output D432 ("1" level). The CPU inputs data BMDA (computation result) corresponding to updated comparison reference value Vr (Vr1) to DA0 of DAC circuit 434.

New comparison reference value Vr (Vr1) obtained by D/A-converting this BMDA is different from the initial tentative comparison reference value Vr (Vr0). If Vr becomes larger than integration output Vo input to comparator CMP0 at that time, comparator output CMPOUT changes to high level "1", and data "1" different from the previous one is stored in FF0 in flip-flop circuit 432.

The level of the stored data "1" is inverted by inverter INV0, and the inverted value is returned as output D432 ("0" level) to main controller 51 (feed back to Vr of (a) in FIG. 11).

The CPU of main controller 51 can further update comparison reference value Vr (e.g., Vr1→Vr2) in response to returned output D432 ("0" level). The CPU inputs data BMDA (computation result) corresponding to updated comparison reference value Vr (Vr2) to DA0 of DAC circuit 434.

New comparison reference value Vr (Vr2) obtained by D/A-converting this BMDA is different from previous comparison reference value Vr (Vr1). If integration output Vo input to comparator CMP0 at that time becomes larger than Vr, comparator output CMPOUT changes to low level "0", and data "0" different from the previous one is stored in FF0 in flip-flop circuit 432.

The level of the stored data "0" is inverted by inverter INV0, and the inverted value is returned as output D432 ("1" level) to main controller 51.

In this fashion, the comparison result of Vo and Vr (variable) in comparator CMP0 is repetitively clocked/input to FF0 of flip-flop circuit 432 several times. Value Vr can be made to approach Vo while changing (increasing/decreasing) comparison reference value Vr with respect to analog value Vo which is to undergo the A/D process on the basis of the logic level input to and stored in FF0.

If the difference between comparison reference value Vr obtained as a result of the repetitive operations, and previous comparison reference value Vr falls within a predetermined value range (or if the repetitive operation has been done a predetermined number of times), the A/D process in the arrangement shown in FIG. 9 is completed (t40 at (f) in FIG. 11), and digital data BMDA stored by the CPU of main controller 51 is held without being changed until the next A/D process.

Digital value BMDA (7FH or 80H in FIG. 13) corresponding to comparison reference value (threshold value of comparator CMP0) Vr held in this manner becomes a digital value (i.e., an A/D conversion result) corresponding to analog integration output Vo input to comparator CMP0.

From another point of view, the feature of the circuit operation in FIG. 9 is also "a digital feedback loop that controls data BMDA corresponding to comparison reference value (threshold value) Vr to yield Vo=Vr (or Vo≈Vr) upon receiving analog input Vo".

The convergence target of this feedback loop is an analog value of integration output Vo, and a digital value (BMDA or equivalent) corresponding to threshold value Vr when the loop actually converges to Vo=Vr becomes an A/D process output for analog input Vo.

In laser beam position control or beam amount (power) control (to be described later), comparison result CMPOUT (or output D432) before the digital value that has converged to a value corresponding to integration output Vo is obtained is used, and in such control operation state, the arrangement shown in FIG. 9 cannot be identified with an A/D converter in an ordinary sense in terms of functions.

Since the rotational speed of polygonal mirror 35 shown in FIG. 2, and the geometric positional relationship among polygonal mirror 35, beam position detector 38, and drum 15 are known in advance, the time interval from when a given laser beam passes detector 38 (the signal edge of sensor pattern SA) until that laser beam passes detector 38 again (the next signal edge of sensor pattern SA) is also known in advance.

Therefore, if one A/D process is completed within the interval from when a given laser beam passes tip detector 38 until that laser beam passes detector 38 again, the generation timing of the conversion end signal shown in FIG. 6, FIG. 8, or (f) of FIG. 11 can be determined to complete this process. In this manner, the CPU of main controller 51 can also internally generate the conversion end signal using the signal edge of sensor pattern SA and its internal clock counter (not shown).

When comparator CMP0 in FIG. 9 makes the first comparison, the difference between tentatively set comparison reference value (threshold value) Vr and actual integration output Vo is often large. In such case, the number of times of processing of the Vr feedback loop becomes relatively large until the final A/D process result is obtained.

However, once digital data BMDA of comparison reference value Vr corresponding to integration output Vo is obtained, the CPU of main controller 51 stores that data. Since the difference between integration output Vo that has changed slightly after the first A/D process, and digital data BMDA corresponding to already stored comparison reference value Vr is small from the beginning in the second and subsequent A/D processes, the number of repetition of feedback loop until the second or subsequent A/D process result is obtained finally is expected to reduce. This means that the second and subsequent ones of A/D processes which are repeated can be done at substantially higher speed.

In this connection, the width of beam detect sensor 380 shown in FIG. 3 is as small as 10 mm or less. When high-speed laser beams for a high-quality print process of 60 sheets or more per second pass such sensor 380, the duration (t10 to t30 at (a) to (f) in FIG. 11) from when a given beam passes sensor pattern SA until it passes sensor pattern SK or SM is less than several $\mu$s (on the several hundred nanosecond order in some cases).

One circuit operation that pertains to a predetermined A/D conversion should be completed within such short period (on the several hundred nanosecond order in some cases). In the circuit arrangement shown in FIG. 9, since this circuit operation is done by comparator CMP0, flip-flop FF0, and inverter INV0, and these devices are inexpensive and allow high-speed operations (on the several ten nanosecond order even if they are not higher speed types), the A/D process of the circuit shown in FIG. 9 can sufficiently follow the high-speed print process.

Figure 12:
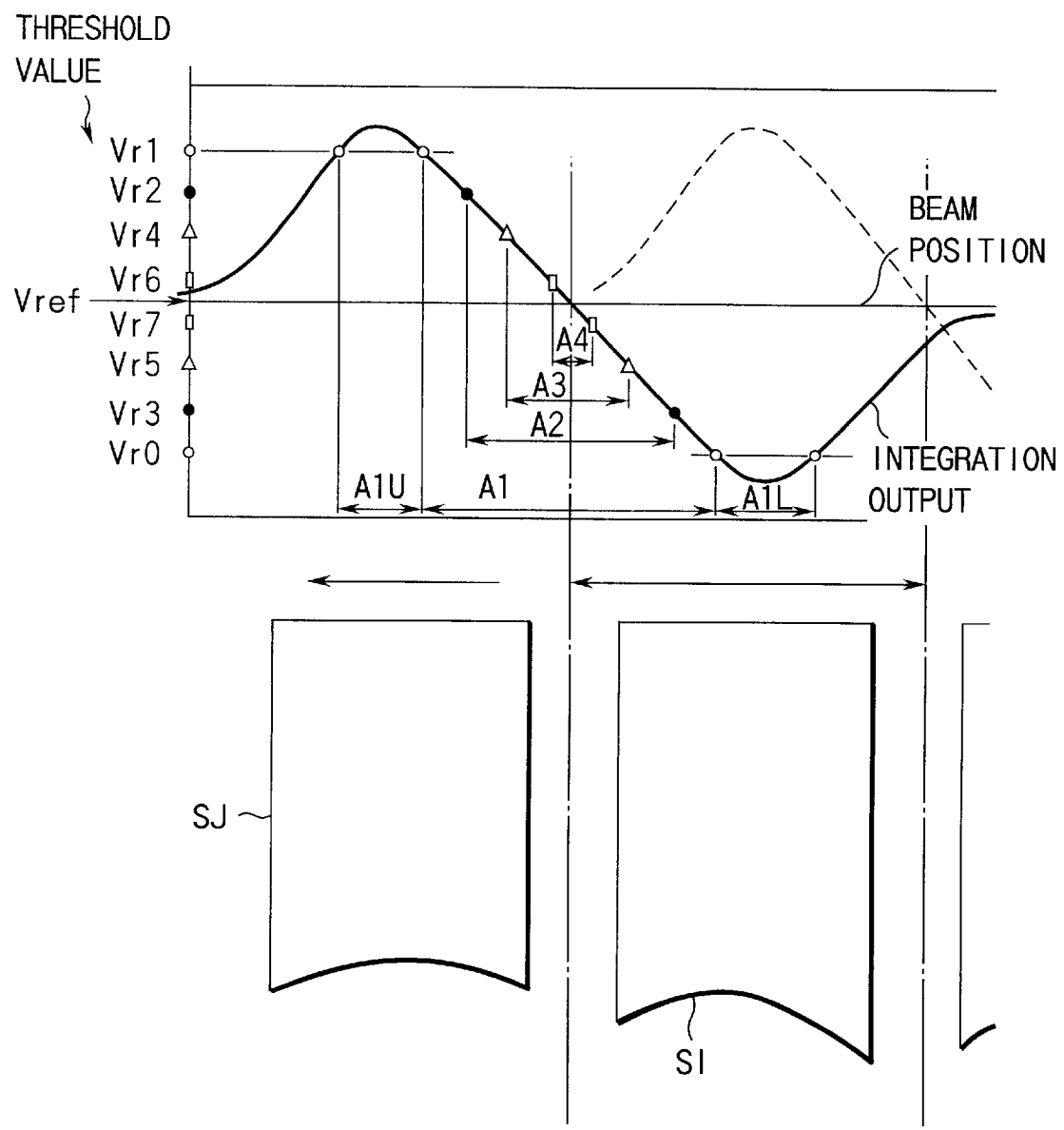
FIG. 12 is a view for explaining the relationship among the position of a laser beam that passes the sensor pattern shown in FIG. 3, the corresponding integration output, and the threshold value of the single comparator shown in FIG. 9.

FIG. 12 illustrates the relationship between the position of a laser beam that passes a position between sensor patterns SJ and SI in FIG. 5, and integration output Vo (analog) corresponding to the difference between the outputs from sensor patterns SJ and SI. In the sensor patterns illustrated at the lower position of FIG. 12, the right-and-left direction agrees with the up-and-down direction (sub-scan direction) of the sensor, and a laser beam passes in the vertical direction on the page of FIG. 12.

Also, in FIG. 12, the abscissa plots the beam position (unit: $\mu$m), and the ordinate plots the integration output (voltage).

When a beam passes exactly the middle position of sensor patterns SJ and SI, integration output Vo corresponding to the difference between the outputs from sensor patterns SJ and SI becomes Vref, as shown in the upper portion of FIG. 12. When the beam passage position relatively deviates from this middle position toward the sensor pattern SI side, integration output Vo changes to decrease; when the beam passage position relatively deviates from the middle position toward the sensor pattern SJ side, integration output Vo changes to increase.

That is, integration output Vo of sensor patterns SJ and SI changes depending on a change in beam position. This change similarly takes place for other pairs of sensor patterns SF to SI. Therefore, when a change in voltage of integration output Vo is detected, a change in beam passage position relative to sensor patterns SF to SJ can be detected.

If this beam passage position is represented by, e.g., eight threshold values Vr0 to Vr7, it can be estimated by one of threshold values Vr0 to Vr7.

For example, in the circuit arrangement shown in FIG. 9, if comparison reference value (threshold value of comparator CMP0) Vr obtained upon completion of the A/D process corresponds to Vr0 in FIG. 12, main controller 51 can detect that a laser beam may have passed near the center of sensor pattern SI. On the other hand, if comparison reference value Vr obtained upon completion of the A/D process corresponds to Vr1 in FIG. 12, main controller 51 can detect that a laser beam may have passed near the center of sensor pattern SJ. Furthermore, if comparison reference value Vr obtained upon completion of the A/D process corresponds to Vr6 or Vr7 in FIG. 12, main controller 51 can detect that a laser beam may have passed the middle position of sensor patterns SI and SJ.

When comparison reference value Vr obtained upon completion of the A/D process corresponds to, e.g., Vr5 in FIG. 12, if laser beam a is to be controlled to pass beam position detector 38 at a position between sensor pattern SI and SJ at the next timing, the CPU of main controller 51 in FIG. 5 can control galvano mirror 33a in FIG. 5 to produce a beam passage route change corresponding to the difference from threshold value Vr6 or Vr7 to Vr5 in FIG. 12.

Likewise, for other beams c to d, the CPU can control galvano mirrors 33b to 33d in FIG. 5 to produce a desired beam passage route change-on the basis of comparison reference value Vr obtained upon completion of the A/D process.

In this embodiment, the beam passage route change control (beam passage position control) starts from the upper sensor pattern position (SJ) side of beam position detector 38, and progresses toward the lower sensor pattern position (SF) in turn.

Figure 13:
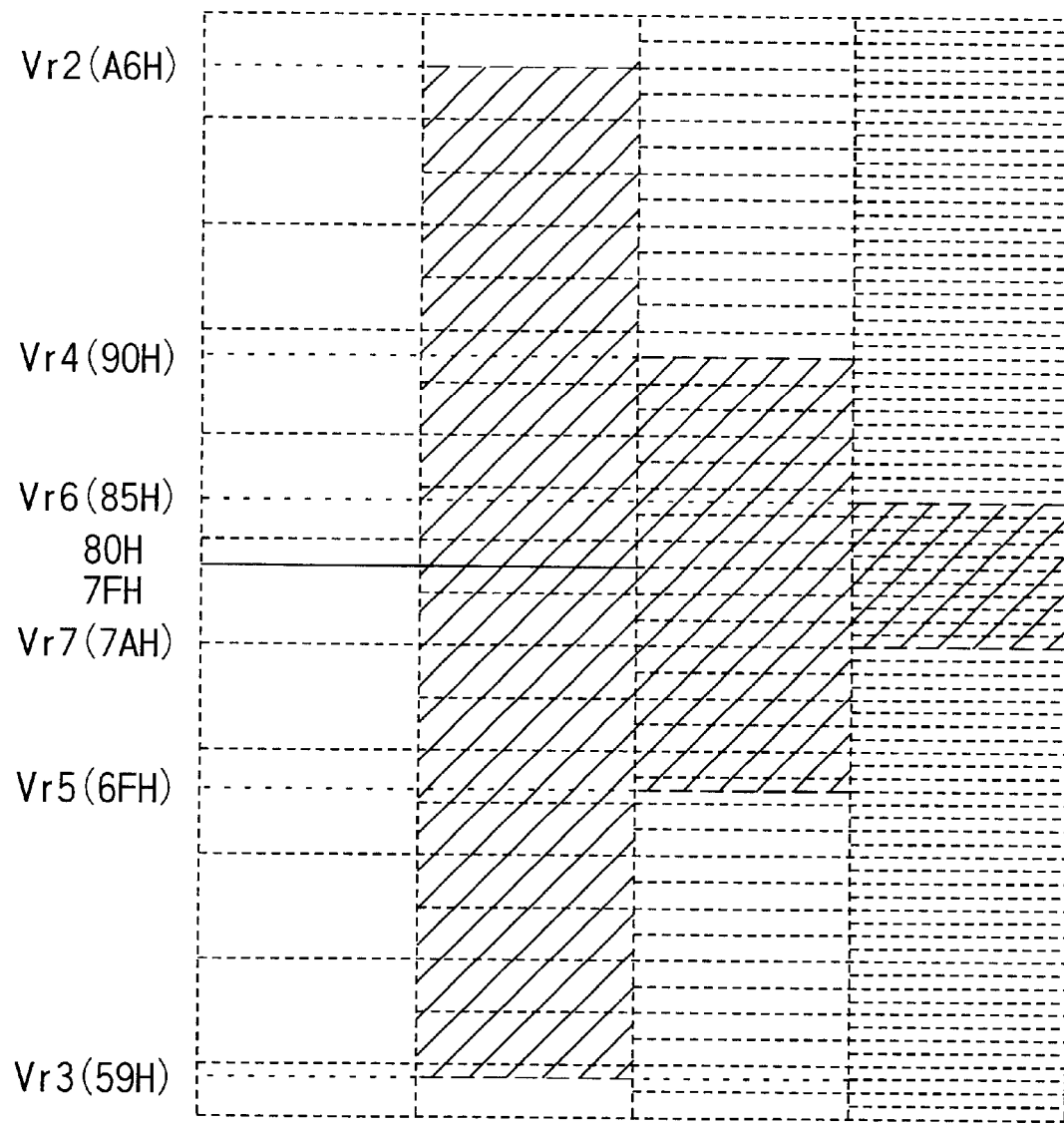
FIG. 13 is a view for explaining changes in various threshold values given to the single comparator shown in FIG. 9.

FIG. 13 exemplifies a change in comparison reference value (threshold value of single comparator CMP0) output from DAC circuit 434 shown in FIG. 9 in correspondence with integration output Vo. (Threshold values Vr2 to Vr7 in FIG. 13 correspond to threshold values Vr2 to Vr7 in FIG. 12. In FIG. 13, threshold values Vr0 and Vr1 are not shown.)

In the correspondence shown in FIG. 13, threshold values Vr (Vr2 and Vr3) with smaller numbers are assigned to the upper end lower ends (high and low voltages) of integration output Vo, and threshold values Vr (Vr6 and Vr7) with larger numbers are assigned to the intermediate range of integration output Vo.

The beam passage position control (beam position control in the sub-scan direction) method using the circuit operation of single comparator 430 in FIG. 9 (corresponding to comparator 430 in FIG. 5) will be explained below with reference to the flow charts shown in FIGS. 14 to 17.

Note that the circuit operation using the comparator of the present invention should not be adhered to the operation concept of conventional A/D conversion, and had better be considered as a part of digital control in a broader sense.

The purpose of the beam passage position control to be described below is to control predetermined laser beam a to finally pass, e.g., area A4 of FIG. 12 (the middle position between sensor patterns SJ and SI of sensor 380 in FIG. 3). In the following description, assume that this beam passage position control starts from the upper side of the sensor (from the side of sensor pattern SJ).

Figure 14:
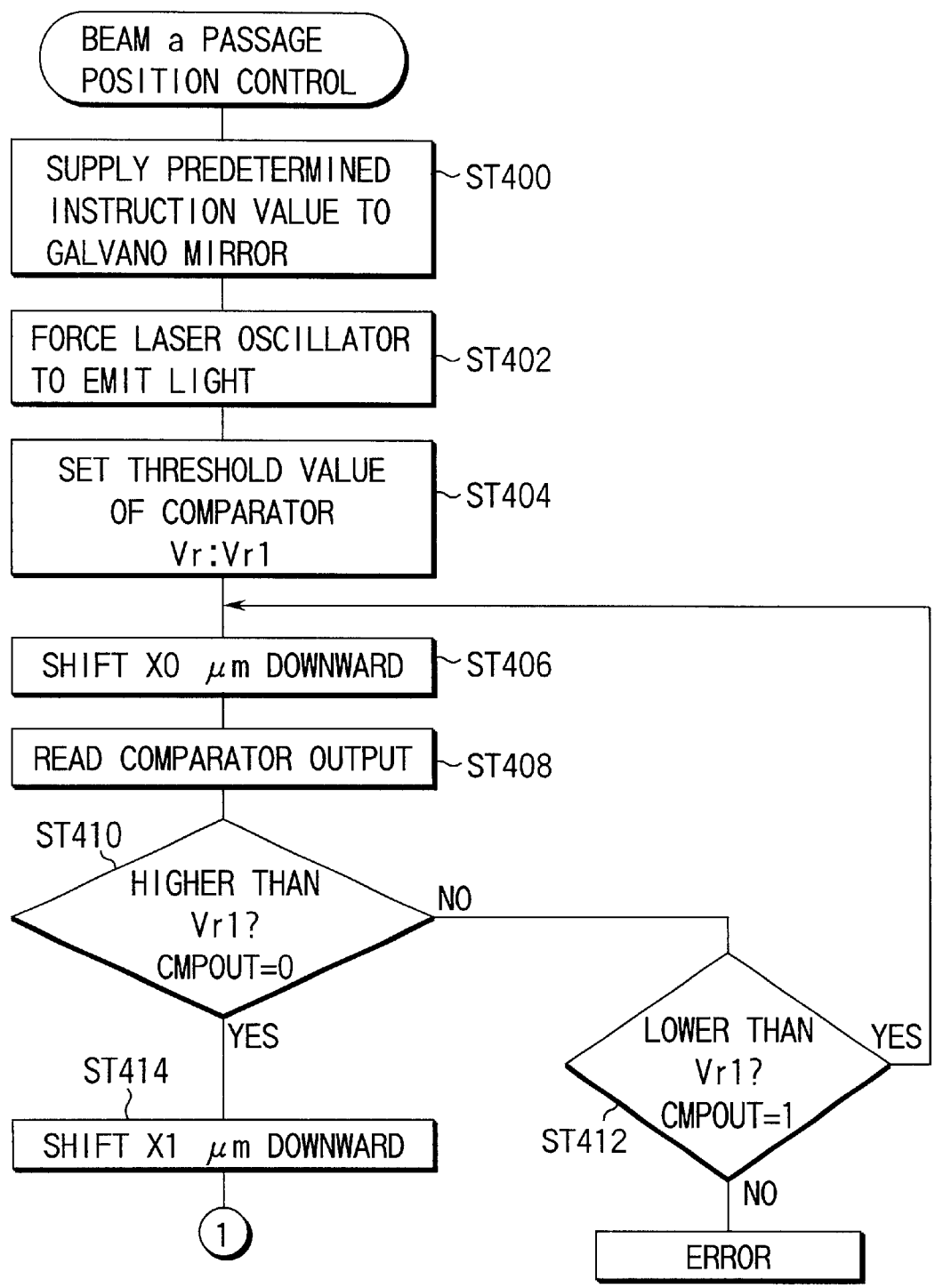
FIG. 14 is a flow chart for explaining a case wherein the passage position control of one (beam a) of multi-beams is implemented using the arrangement shown in FIGS. 5 and 9 (using the single comparator)

Referring to FIG. 14, the internal CPU (to be simply referred to as a CPU hereinafter) of main controller 51 in FIG. 5 instructs galvano mirror driving circuit 39a in FIG. 2 or 5 to control laser beam a to pass the sensor upper side (sensor pattern SJ side) (step ST400).

Then, the CPU issues an instruction to polygonal mirror motor driver 37 in FIG. 2 or 5 to start polygon mirror motor 36, thus rotating polygonal mirror 35 at a predetermined rotational speed.

The CPU instructs laser driver 32a to control laser 31a to forcibly emit light with a predetermined amount (power) (step ST402), thus emitting laser beam a toward the polygonal mirror 35 side. In this manner, laser beam a with predetermined power passes beam position detector 38 and photosensitive drum 15 in FIG. 2 at a predetermined velocity.

Subsequently, the CPU supplies predetermined data BMDA (e.g., B3H (hex)) to DAC circuit 434 in FIG. 9 so as to set comparison reference value (initial threshold value) Vr of comparator CMP0 to be, e.g., Vr1 in FIG. 12 (step ST404).

The CPU then slightly moves galvano mirror 33a so that the passage position of beam a above sensor 380 shifts X0 ($\mu$m) downward (toward sensor pattern SF) (step ST406). This X0 is one step moving amount of galvano mirror 33a, which is set to be a very small amount that does not make mirror 33a jump over area A1U in FIG. 12. More specifically, X0 is set to be a value smaller than the width of A1U, e.g., around 30 $\mu$m.

In this state, comparator CMP0 in FIG. 9 compares integration output Vo obtained from integrator 42 in FIG. 9 with initial threshold value Vr=Vr1. The CPU reads output D432 corresponding to this comparison result CMPOUT (step ST408).

If Vo<Vr1, and that comparison result CMPOUT is "1" (NO in step ST410), D-flip-flop FF0 in FIG. 9 reads this logic level "1", and its Q output changes to "1" level. By detecting D432="0" obtained by inverting this "1" level by inverter INV0 in FIG. 9, the CPU can detect that the beam position of beam a is higher than a position corresponding to Vr1 (on the left side outside the range of A1U in FIG. 12).

Subsequently, the CPU re-checks the comparison result of comparator CMP0, and if that comparison result CMPOUT is "0" (NO in step ST412), FF0 reads this logic level "0", and its Q output changes to "0" level. By detecting D432="1" obtained by inverting this "0" level by inverter INV0 in FIG. 9, the CPU can detect that the beam position of beam a is lower than a position corresponding to Vr1 (within the range of A1U).

However, since this result (NO in step ST412) conflicts with the previous result (NO in step ST410), an error is detected, and the process in FIG. 14 ends (or is interrupted).

Upon re-checking the comparison result, if CMPOUT is "1" (YES in step ST412), FF0 reads this logic level "1", and its Q output changes to "1" level. By detecting D432="0" obtained by inverting this "1" level by inverter INV0 in FIG. 9, the CPU can detect that the beam position of beam a is higher than a position corresponding to Vr1 (outside the range of A1U).

Since this result (YES in step ST412) does not conflict with the previous result (NO in step ST410), the flow returns to the process for shifting the position of beam a downward (step ST406). At this time, the comparison reference value (threshold value) of comparator CMP0 remains at Vr1.

Whether the position of beam a falls within or outside the range of A1U can be determined based on the logic level of comparison result CMPOUT of comparator CMP0.

More specifically, when the position of beam a falls outside the range of A1U (CMPOUT="1"), the CPU slightly moves galvano mirror 33a to shift the passage position of beam a above sensor 380 X0 downward (toward sensor pattern SF) (step ST406).

The aforementioned operations (ST406 to ST412) repeat themselves until beam a passes within the range of A1U.

Upon comparison after the position of beam a is further shifted X0 μm downward in step ST406, if Vo>Vr1 and comparison result CMPOUT is "0" (YES in step ST410), D-flip-flop FF0 reads this logic level "0" and its Q output changes to "0" level. By detecting D432="1" obtained by inverting this "0" level by inverter INV0 in FIG. 9, the CPU can detect that beam a passes a position corresponding to Vr1 (within the range of A1U).

Figure 15:
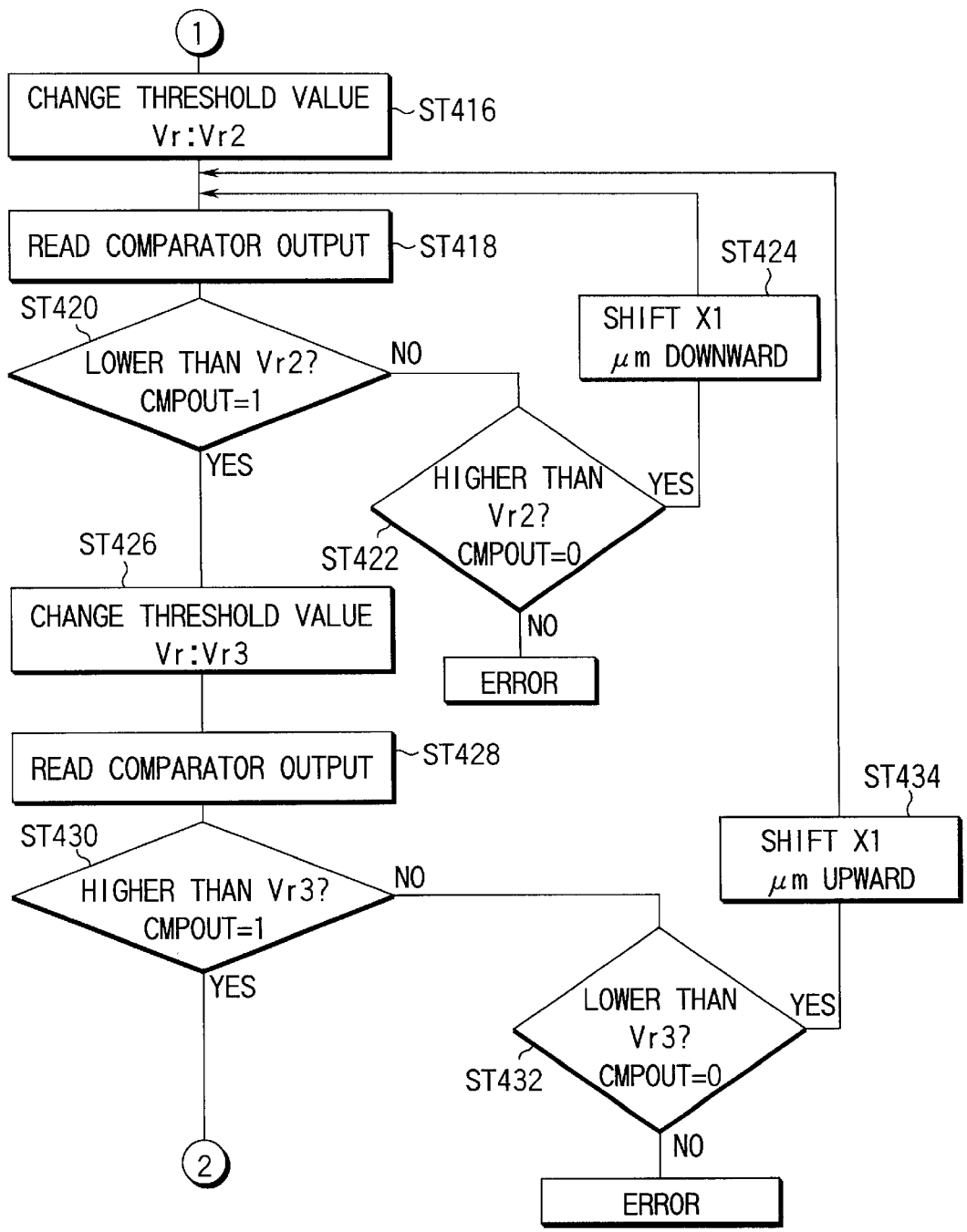
FIG. 15 is a flow chart for explaining the beam passage position control continued from FIG. 14.

In this manner, when beam a passes a position corresponding to Vr1 (within the range of A1U), the CPU slightly moves galvano mirror 33a to shift the passage position of beam a above sensor 380 X1 (μm) downward (toward sensor pattern SF) (step ST414), and enters the process shown in FIG. 15.

Referring to FIG. 15, the CPU supplies new data BMDA (e.g., A6H (hex)) to DAC circuit 434 to set comparison reference value (threshold value) Vr of comparator CMP0 to be Vr2 in FIG. 12 or 13 (step ST416).

In this state, comparator CMP0 compares integration output Vo obtained from integrator 42 with new threshold value Vr=Vr2. The CPU reads output D432 corresponding to the comparison result CMPOUT (step ST418).

If Vo>Vr2 and comparison result CMPOUT is "0" (NO in step ST420), D-flip-flop FF0 reads this logic level "0", and its Q output changes to "0" level. By detecting D432="1" obtained by inverting this "0" level by inverter INV0, the CPU can detect that the beam position of beam a is higher than a position corresponding to Vr2 (outside the range of area A2 in FIG. 12).

Subsequently, the CPU re-checks the comparison result of comparator CMP0, and if that comparison result CMPOUT is "1" (NO in step ST422), FF0 reads this logic level "1", and its Q output changes to "1" level. By detecting D432= "0" obtained by inverting this "1" level by inverter INV0, the CPU can detect that the beam position of beam a is lower than a position corresponding to Vr2 (within the range of A2).

However, since this result (NO in step ST422) conflicts with the previous result (NO in step ST420), an error is detected, and the process in FIG. 15 ends (or is interrupted).

Upon re-checking the comparison result, if CMPOUT is "0" (YES in step ST422), FF0 reads this logic level "0", and its Q output changes to "0" level. By detecting D432="1" obtained by inverting this "0"level by inverter INV0, the CPU can detect that the beam position of beam a is higher than a position corresponding to Vr2 (outside the range of A2).

Since this result (YES in step ST422) does not conflict with the previous result (NO in step ST420), the flow advances to the process for further shifting the position of beam a X1 μm downward (galvano mirror slight moving process) (step ST424). At this time, the comparison reference value (threshold value) of comparator CMP0 remains at Vr2.

The aforementioned operations (ST418 to ST424) repeat themselves until the passage position of beam a falls within the range of A2.

Upon comparison after the position of beam a is further shifted X1 μm downward in step ST424, if Vo<Vr2 and comparison result CMPOUT is "1" (YES in step ST420), D-flip-flop FF0 reads this logic level "1" and its Q output changes to "1" level. By detecting D432="0" obtained by inverting this "1" level by inverter INV0, the CPU can detect that beam a passes a position corresponding to Vr2 (one side within the range of A2).

In this manner, when beam a passes a position corresponding to Vr2 (within the range of A2), the CPU supplies new data BMDA (e.g., 59H (hex)) to DAC circuit 434 to set comparison reference value (threshold value) Vr of comparator CMP0 to be Vr3 in FIG. 12 or 13 (step ST426).

In this state, comparator CMP0 compares integration output Vo obtained from integrator 42 with new threshold value Vr=Vr3. The CPU reads output D432 corresponding to this comparison result CMPOUT (step ST428).

If Vo>Vr3 and comparison result CMPOUT is "0" (NO in step ST430), D-flip-flop FF0 reads this logic level "0", and its Q output changes to "0" level. By detecting D432="1" obtained by inverting this "0" level by inverter INV0, the CPU can detect that the beam position of beam a is lower than a position corresponding to Vr3 (outside the range of area A2).

Subsequently, the CPU re-checks the comparison result of comparator CMP0, and if that comparison result CMPOUT is "1" (NO in step ST432), FF0 reads this logic level "1", and its Q output changes to "1" level. By detecting D432= "0" obtained by inverting this "1" level by inverter INV0, the CPU can detect that the beam position of beam a is higher than a position corresponding to Vr3 (within the range of A2).

However, since this result (NO in step ST432) conflicts with the previous result (NO in step ST430), an error is detected, and the process in FIG. 15 ends (or is interrupted).

Upon re-checking the comparison result, if CMPOUT is "0" (YES in step ST432), FF0 reads this logic level "0", and its Q output changes to "0" level. By detecting D432="1" obtained by inverting this "0" level by inverter INV0, the CPU can detect that the beam position of beam a is lower than a position corresponding to Vr3 (outside the range of A2).

Since this result (YES in step ST432) does not conflict with the previous result (NO in step ST430), the flow advances to the process for shifting the position of beam a X1 μm upward (galvano mirror slight moving process) (step ST434). At this time, the comparison reference value (threshold value) of comparator CMP0 remains at Vr3.

Note that moving amount X1 μm in step ST434 may be different from that in step ST424 in practice.

In the aforementioned operations (ST418 to ST434), "beam passage on one side within the range of A2" is controlled in steps ST418 to ST424, and "beam passage on the other side within the range of A2" is controlled in steps ST428 to ST434.

The aforementioned operations (ST418 to ST434) repeat themselves until the passage position of beam a falls within the range of A2 (on both sides within the range of A2).

Figure 16:
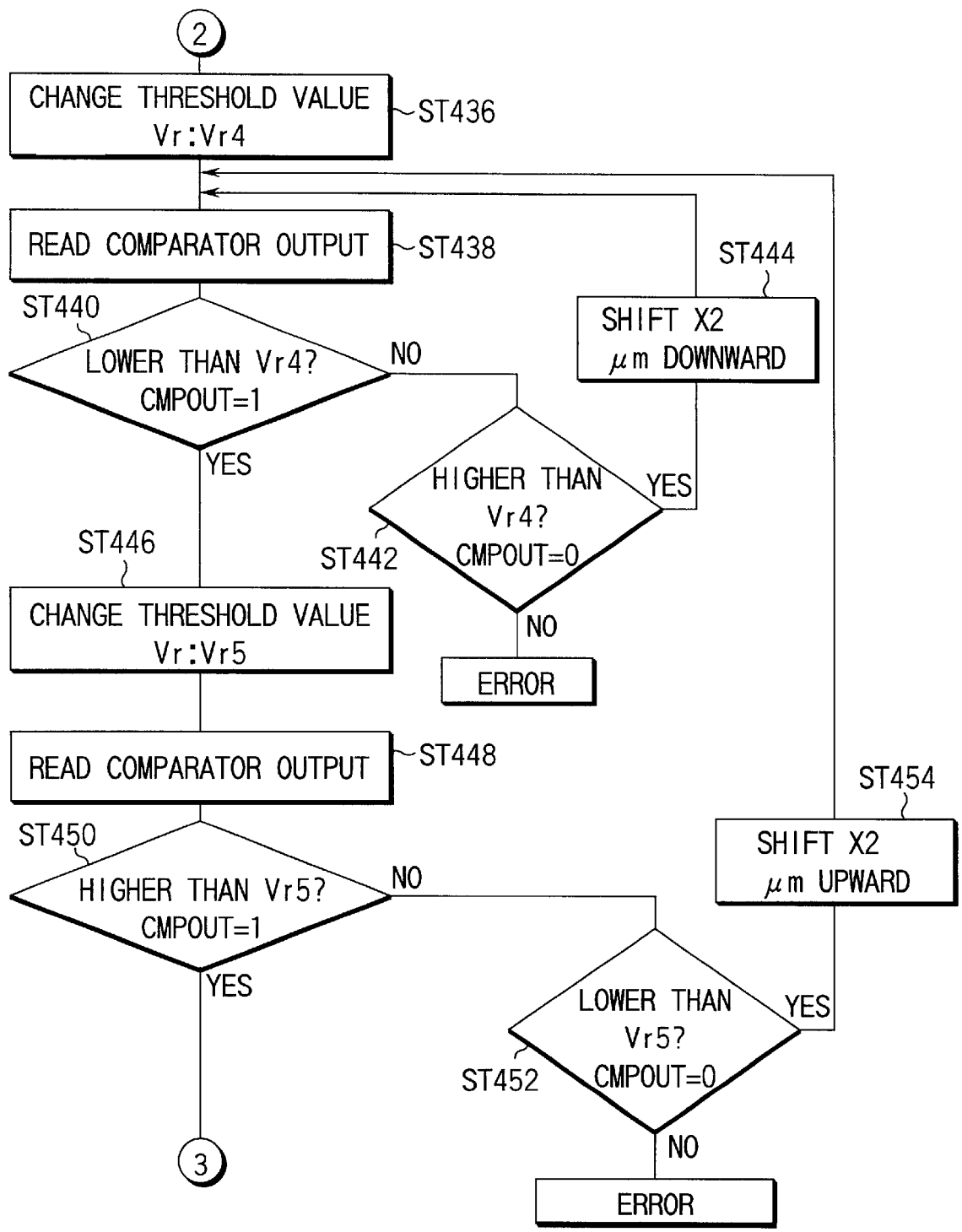
FIG. 16 is a flow chart for explaining the beam passage position control continued from FIG. 15.

In this manner, when beam a can pass a position anywhere within the range corresponding to Vr2 or Vr3 (within the range of area A2 in FIG. 12) (YES in step ST430), the control enters the process in FIG. 16.

Referring to FIG. 16, the CPU supplies new data BMDA (e.g., 90H (hex)) to DAC circuit 434 to set comparison reference value (threshold value) Vr of comparator CMP0 to be Vr4 in FIG. 12 or 13 (step ST436).

In this state, comparator CMP0 compares integration output Vo obtained from integrator 42 with new threshold value Vr=Vr4. The CPU reads output D432 corresponding to the comparison result CMPOUT (step ST438).

If Vo>Vr4 and comparison result CMPOUT is "0" (NO in step ST440), D-flip-flop FF0 reads this logic level "0", and its Q output changes to "0" level. By detecting D432="1" obtained by inverting this "0" level by inverter INV0, the CPU can detect that the beam position of beam a is higher than a position corresponding to Vr4 (outside the range of A3).

Subsequently, the CPU re-checks the comparison result of comparator CMP0, and if that comparison result CMPOUT is "1" (NO in step ST442), FF0 reads this logic level "1", and its Q output changes to "1" level. By detecting D432="0" obtained by inverting this "1" level by inverter INV0, the CPU can detect that the beam position of beam a is lower than a position corresponding to Vr4 (within the range of A3).

However, since this result (NO in step ST442) conflicts with the previous result (NO in step ST440), an error is detected, and the process in FIG. 16 ends (or is interrupted).

Upon re-checking the comparison result, if CMPOUT is "0" (YES in step ST442), FF0 reads this logic level "0", and its Q output changes to "0" level. By detecting D432="1" obtained by inverting this "0" level by inverter INV0, the CPU can detect that the beam position of beam a is higher than a position corresponding to Vr4 (outside the range of A3).

Since this result (YES in step ST442) does not conflict with the previous result (NO in step ST440), the flow advances to the process for further shifting the position of beam a X2 μm downward (galvano mirror slight moving process) (step ST444). At this time, the comparison reference value (threshold value) of comparator CMP0 remains at Vr4.

The aforementioned operations (ST438 to ST444) repeat themselves until the passage position of beam a falls within the range of A3.

Upon comparison after the position of beam a is further shifted X2 μm downward in step ST444, if Vo<Vr4 and comparison result CMPOUT is "1" (YES in step ST440), D-flip-flop FF0 reads this logic level "1" and its Q output changes to "1" level. By detecting D432 "0" obtained by inverting this "1" level by inverter INV0, the CPU can detect that beam a passes a position corresponding to Vr4 (one side within the range of A3).

In this manner, when beam a passes a position corresponding to Vr4 (within the range of A3), the CPU supplies new data BMDA (e.g., 6FH (hex)) to DAC circuit 434 to set comparison reference value (threshold value) Vr of comparator CMP0 to be Vr5 in FIG. 12 or 13 (step ST446).

In this state, comparator CMP0 compares integration output Vo obtained from integrator 42 with new threshold value Vr=Vr5. The CPU reads output D432 corresponding to this comparison result CMPOUT (step ST448).

If Vo>Vr5 and comparison result CMPOUT is "0" (NO in step ST450), D-flip-flop FF0 reads this logic level "0", and its Q output changes to "0" level. By detecting D432="1" obtained by inverting this "0" level by inverter INV0, the CPU can detect that the beam position of beam a is lower than a position corresponding to Vr5 (outside the range of area A3).

Subsequently, the CPU re-checks the comparison result of comparator CMP0, and if that comparison result CMPOUT is "1" (NO in step ST452), FF0 reads this logic level "1", and its Q output changes to "1" level. By detecting D432= "0" obtained by inverting this "1" level by inverter INV0, the CPU can detect that the beam position of beam a is higher than a position corresponding to Vr5 (within the range of A3).

However, since this result (NO in step ST452) conflicts with the previous result (NO in step ST450), an error is detected, and the process in FIG. 16 ends (or is interrupted).

Upon re-checking the comparison result, if CMPOUT is "0" (YES in step ST452), FF0 reads this logic level "0", and its Q output changes to "0" level. By detecting D432="1" obtained by inverting this "0" level by inverter INV0, the CPU can detect that the beam position of beam a is lower than a position corresponding to Vr5 (outside the range of A3).

Since this result (YES in step ST452) does not conflict with the previous result (NO in step ST450), the flow advances to the process for shifting the position of beam a X2 μm upward (galvano mirror slight moving process) (step ST454). At this time, the comparison reference value (threshold value) of comparator CMP0 remains at Vr5.

Note that moving amount X2 μm in step ST454 may be different from that in step ST444 in practice.

In the aforementioned operations (ST438 to ST454), "beam passage on one side within the range of A3" is controlled in steps ST438 to ST444, and "beam passage on the other side within the range of A3" is controlled in steps ST448 to ST454.

The aforementioned operations (ST438 to ST454) repeat themselves until the passage position of beam a falls within the range of A3 (on both sides within the range of A3).

Figure 17:
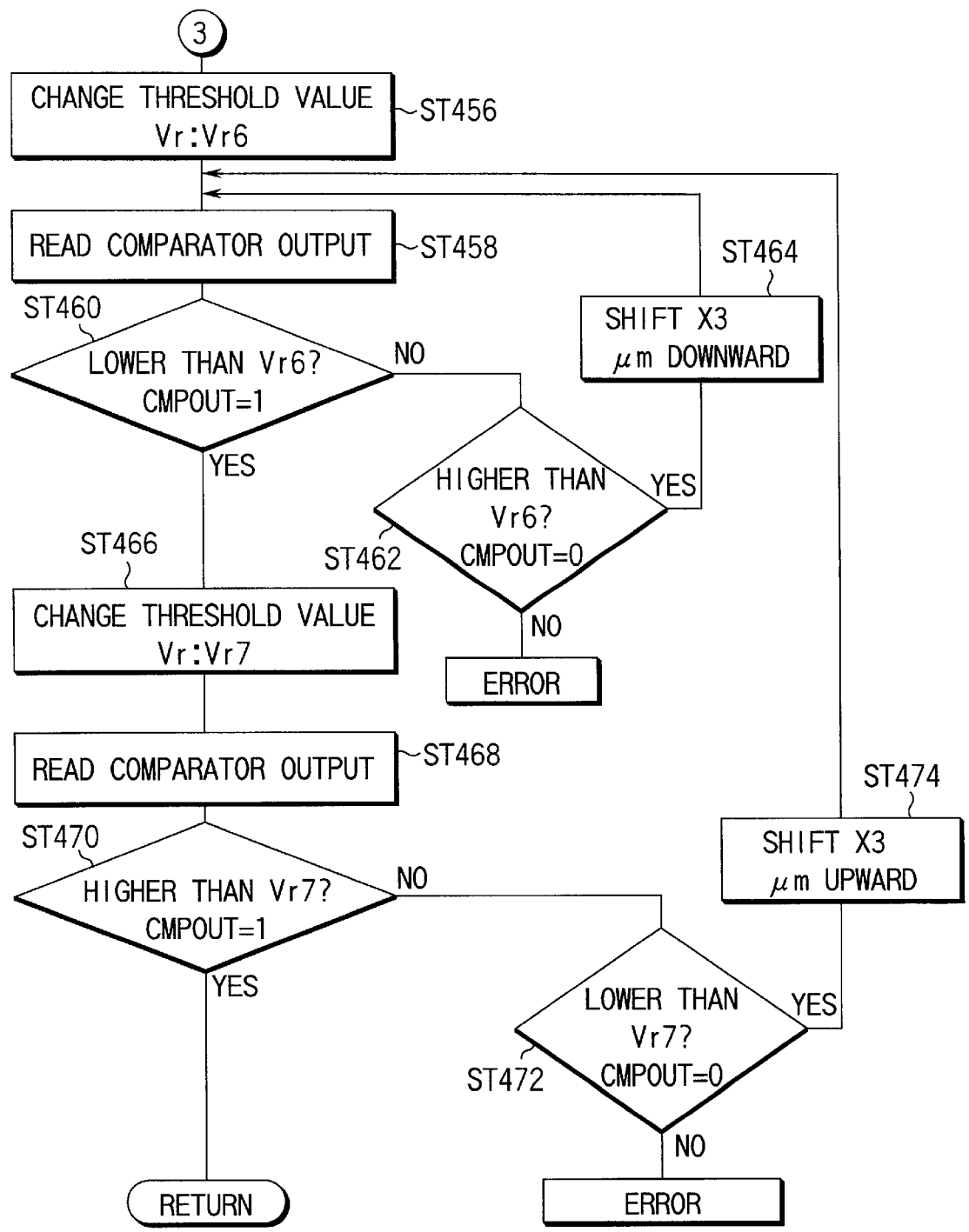
FIG. 17 is a flow chart for explaining the beam passage position control continued from FIG. 16.

In this manner, when beam a can pass a position anywhere within the range corresponding to Vr4 or Vr5 (within the range of A3) (YES in step ST450), the control enters the process in FIG. 17.

Referring to FIG. 17, the CPU supplies new data BMDA (e.g., 85H (hex)) to DAC circuit 434 to set comparison reference value (threshold value) Vr of comparator CMP0 to be Vr6 in FIG. 12 or 13 (step ST456).

In this state, comparator CMP0 compares integration output Vo obtained from integrator 42 with new threshold value Vr=Vr6. The CPU reads output D432 corresponding to this comparison result CMPOUT (step ST458).

If Vo>Vr6 and comparison result CMPOUT is "0" (NO in step ST460), D-flip-flop FF0 reads this logic level "0", and its Q output changes to "0" level. By detecting D432="1" obtained by inverting this "0" level by inverter INV0, the CPU can detect that the beam position of beam a is higher than a position corresponding to Vr6 (outside the range of A4).

Subsequently, the CPU re-checks the comparison result of comparator CMP0, and if that comparison result CMPOUT is "1" (NO in step ST462), FF0 reads this logic level "1", and its Q output changes to "1" level. By detecting D432= "0" obtained by inverting this "1" level by inverter INV0, the CPU can detect that the beam position of beam a is lower than a position corresponding to Vr6 (within the range of A4).

However, since this result (NO in step ST462) conflicts with the previous result (NO in step ST460), an error is detected, and the process in FIG. 17 ends (or is interrupted).

Upon re-checking the comparison result, if CMPOUT is "0" (YES in step ST462), FF0 reads this logic level "0", and its Q output changes to "0" level. By detecting D432="1" obtained by inverting this "0" level by inverter INV0, the CPU can detect that the beam position of beam a is higher than a position corresponding to Vr6 (outside the range of A4).

Since this result (YES in step ST462) does not conflict with the previous result (NO in step ST460), the flow advances to the process for further shifting the position of beam a X3 μm downward (galvano mirror slight moving process) (step ST464). At this time, the comparison reference value (threshold value) of comparator CMP0 remains at Vr6.

The aforementioned operations (ST458 to ST464) repeat themselves until the passage position of beam a falls within the range of A4.

Upon comparison after the position of beam a is further shifted X3 μm downward in step ST464, if Vo<Vr6 and comparison result CMPOUT is "1" (YES in step ST460), D-flip-flop FF0 reads this logic level "1" and its Q output changes to "1" level. By detecting D432="0" obtained by inverting this "1" level by inverter INV0, the CPU can detect that beam a passes a position corresponding to Vr6 (one side within the range of A4).

In this manner, when beam a passes a position corresponding to Vr6 (within the range of A4), the CPU supplies new data BMDA (e.g., 7AH (hex)) to DAC circuit 434 to set comparison reference value (threshold value) Vr of comparator CMP0 to be Vr7 in FIG. 12 or 13 (step ST466).

In this state, comparator CMP0 compares integration output Vo obtained from integrator 42 with new threshold value Vr=Vr7. The CPU reads output D432 corresponding to the comparison result CMPOUT (step ST468).

If Vo>Vr7 and comparison result CMPOUT is "0" (NO in step ST470), D-flip-flop FF0 reads this logic level "0", and its Q output changes to "0" level. By detecting D432="1" obtained by inverting this "0" level by inverter INV0, the CPU can detect that the beam position of beam a is lower than a position corresponding to Vr7 (outside the range of area A4).

Subsequently, the CPU re-checks the comparison result of comparator CMP0, and if that comparison result CMPOUT is "1" (NO in step ST472), FF0 reads this logic level "1", and its Q output changes to "1" level. By detecting D432="0" obtained by inverting this "1" level by inverter INV0, the CPU can detect that the beam position of beam a is higher than a position corresponding to Vr7 (within the range of A4).

However, since this result (NO in step ST472) conflicts with the previous result (NO in step ST470), an error is detected, and the process in FIG. 17 ends (or is interrupted).

Upon re-checking the comparison result, if CMPOUT is "0" (YES in step ST472), FF0 reads this logic level "0", and its Q output changes to "0" level. By detecting D432="1" obtained by inverting this "0" level by inverter INV0, the CPU can detect that the beam position of beam a is lower than a position corresponding to Vr7 (outside the range of A4).

Since this result (YES in step ST472) does not conflict with the previous result (NO in step ST470), the flow advances to the process for shifting the position of beam a X3 μm upward (galvano mirror slight moving process) (step ST474). At this time, the comparison reference value (threshold value) of comparator CMP0 remains at Vr7.

Note that moving amount X3 μm in step ST474 may be different from that in step ST464 in practice.

In the aforementioned operations (ST458 to ST474), "beam passage on one side within the range of A4" is controlled in steps ST458 to ST464, and "beam passage on the other side within the range of A4" is controlled in steps ST468 to ST474.

The aforementioned operations (ST458 to ST474) repeat themselves until the passage position of beam a falls within the very narrow range of A4 (on both sides within the range of A4).

In this manner, when beam a can pass a position anywhere within the range corresponding to Vr6 or Vr7 (within the range of A4) (YES in step ST470), the process in FIG. 17 ends, and the CPU is ready to start another process.

More specifically, the CPU that executes a program corresponding to the flow charts shown in FIGS. 14 to 17 repeats control for narrowing down the passage area of beam a (corresponding to a laser beam coming from laser 31a in FIG. 5) in the order of A1U/A1L→A2→A3 in FIG. 12, while changing the threshold value of comparator CMP0 (corresponding to comparator 430 in FIG. 5). In this manner, the galvano mirror is finally adjusted (digitally controlled) so that beam a passes narrow area A4.

The above explanation has been given to one (beam a) of the multi-beams, and the same control is made for the remaining beams (beams b to d).

As a result, the respective beams (a to d) become parallel multi-beams having predetermined spacings (pitches) corresponding to, e.g., the physical layout of sensor patterns SF to SJ in FIG. 3, and can accurately scan the surface of photosensitive drum 15 in FIG. 2 at high speed.

Note that beam position correction amount X0 in FIG. 14 is selected to be relatively large (e.g., around 30 μm), beam position correction amount X1 in FIG. 15 is selected to be smaller than X0 (e.g., around 20 μm), beam position correction amount X2 in FIG. 16 is selected to be further smaller than X1 (e.g., around 10 μm), and last beam correction amount X3 in FIG. 17 is selected to be much smaller than X2 (e.g., around 1 μm). This is to attain coarse and large (quick) position movement when beam a is separated away from the control target position, and to attain fine (accurate) position control when beam a becomes closer to the control target position.

The threshold value data (computation result BMDA input to DAC circuit 434 in FIG. 9) obtained after execution of the program corresponding to the flow charts shown in FIGS. 14 to 17 corresponds to the digital value (7FH or 80H in the example in FIG. 13) of analog integration output Vo indicating the passage position of beam a at that time.

More specifically, the circuit arrangement shown in FIG. 9 has an A/D function that provides a digital value (7FH or 80H in this example) corresponding to analog value Vo. However, the circuit arrangement in FIG. 9 does not require any A/D converter which is expensive in device level (a D/A converter is much cheaper than an A/D converter having an equivalent speed and resolution).

CPU51 (shown in FIG. 5, etc.) executing the beam light path position control of FIGS. 14–17 may serve as means for calculating the amount in change of the light path.

Figure 18:
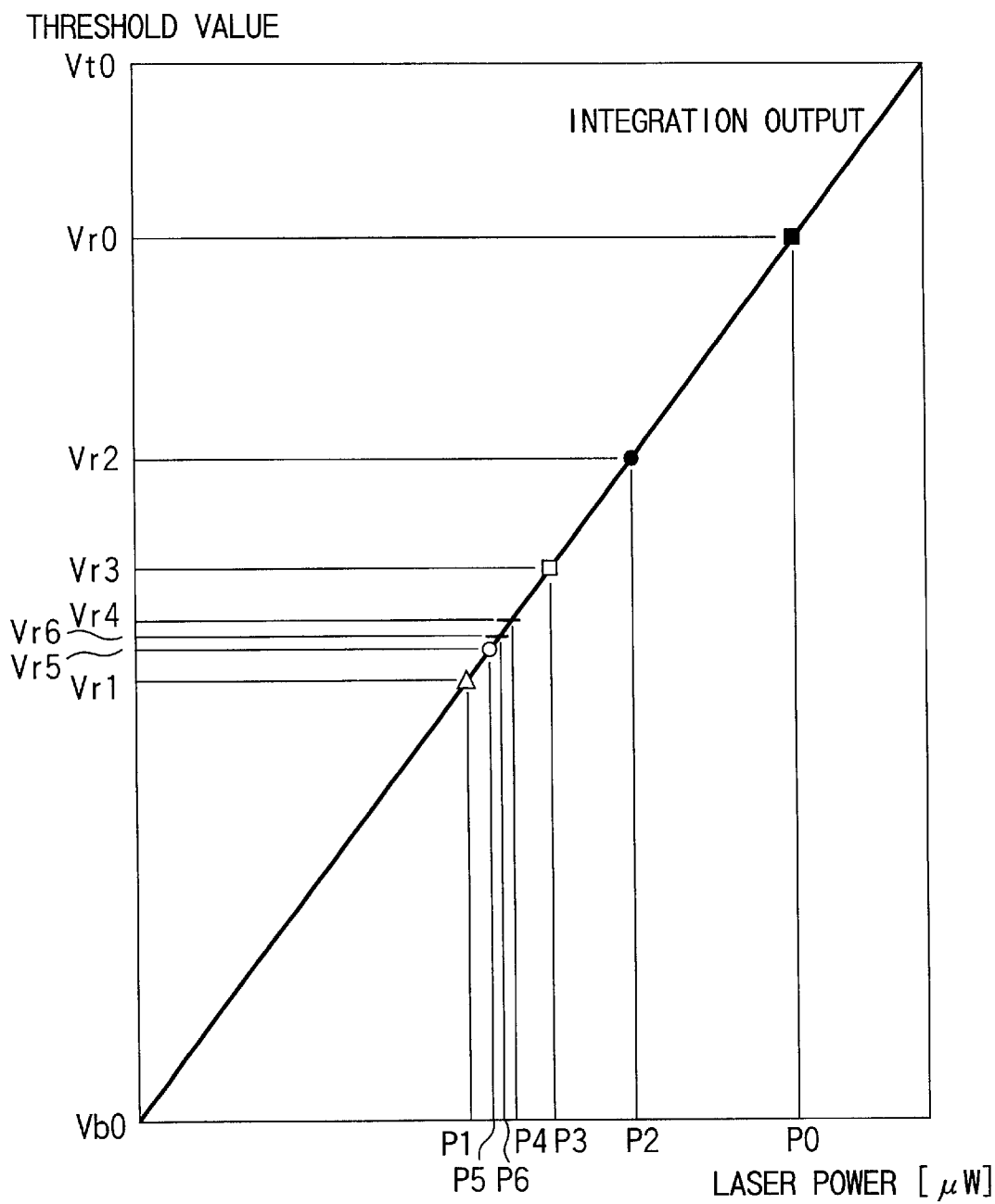
FIG. 18 is a graph showing the correspondence between the laser power detection characteristics and a comparison reference value (threshold value) of the single comparator.

FIG. 18 exemplifies the correspondence between the laser power detection characteristics and comparison reference value (threshold value) Vr of the comparator (430 or CMP0).

In this example, upon detecting laser power, only integration output Vo higher than a given threshold value (e.g., Vr=2.5 V) of the comparator is output. In this case, the threshold value of the comparator is set to be higher than a reference voltage.

More specifically, assuming that Vbo is +2.5 V and Vt0 is +5 V on the voltage axis of the threshold value in the graph shown in FIG. 18, and that laser power levels P0 to P6 are set when the threshold value falls within the range from 2.5 V to 5 V. That is, Vr0 corresponds to laser power P0 μW, and Vr1 corresponds to laser power P1 μW. Likewise, Vr2 to Vr6 respectively correspond to laser power levels P2 to P6.

In other words, by specifying the values (V) of threshold values Vr0 to Vr6, the values (μW) of corresponding laser power levels P0 to P6 are also specified from the relationship shown in FIG. 18.

When integration output Vo corresponding to the detection result of the laser light amount (laser power) by sensor pattern SL in FIG. 3 or 5 is used in the arrangement shown in FIG. 9, the relationship shown in FIG. 18 can be used as the correspondence between laser power levels P0 to P6 and comparison reference values (threshold values) Vr0 to Vr6 of comparator CMP0. (Note that Vr0 to Vr6 in FIG. 18 that pertain to laser power detection, and Vr0 to Vr7 in FIG. 12 that pertain to laser beam position detection assume different values even though they use the same symbols.)

Figure 19:
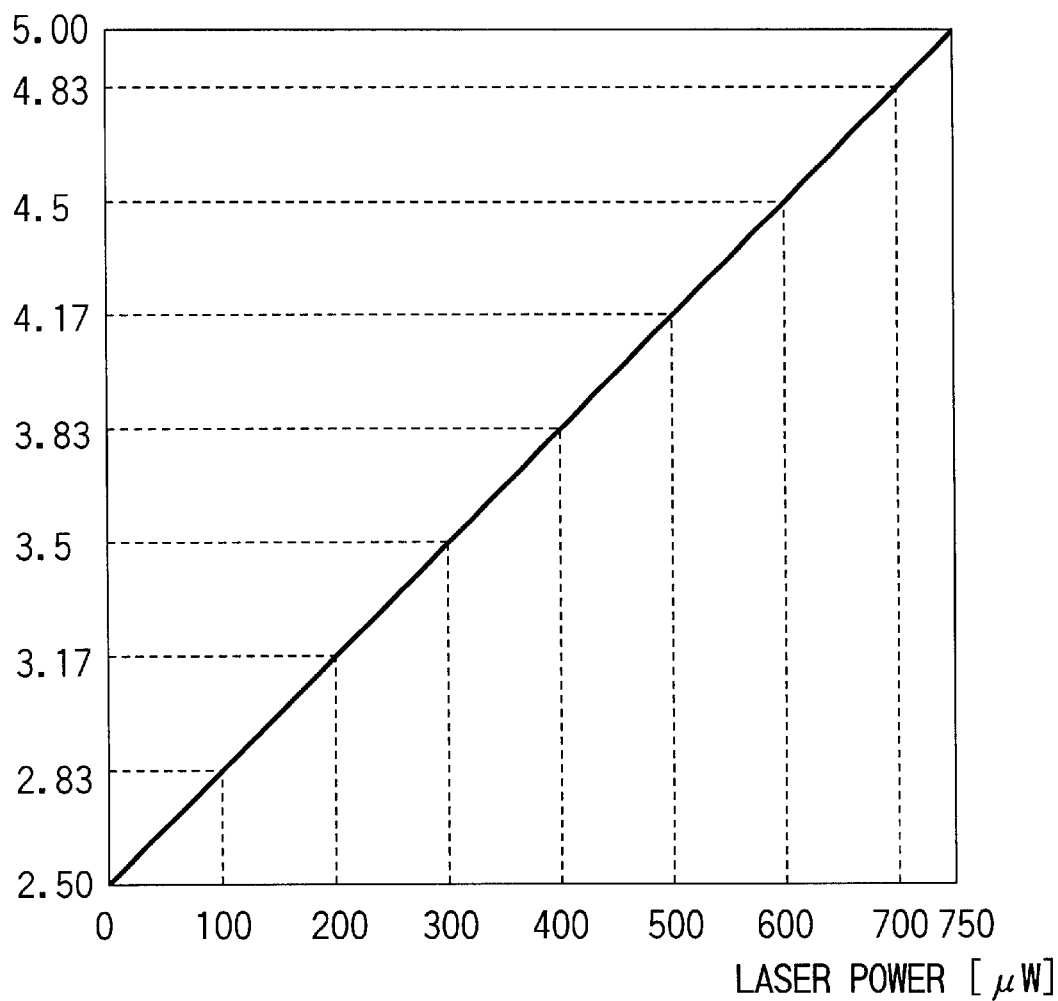
FIG. 19 is a graph showing the correspondence between the laser power detected by sensor pattern SL shown in FIG. 3 and the corresponding integration output.
Figure 35:
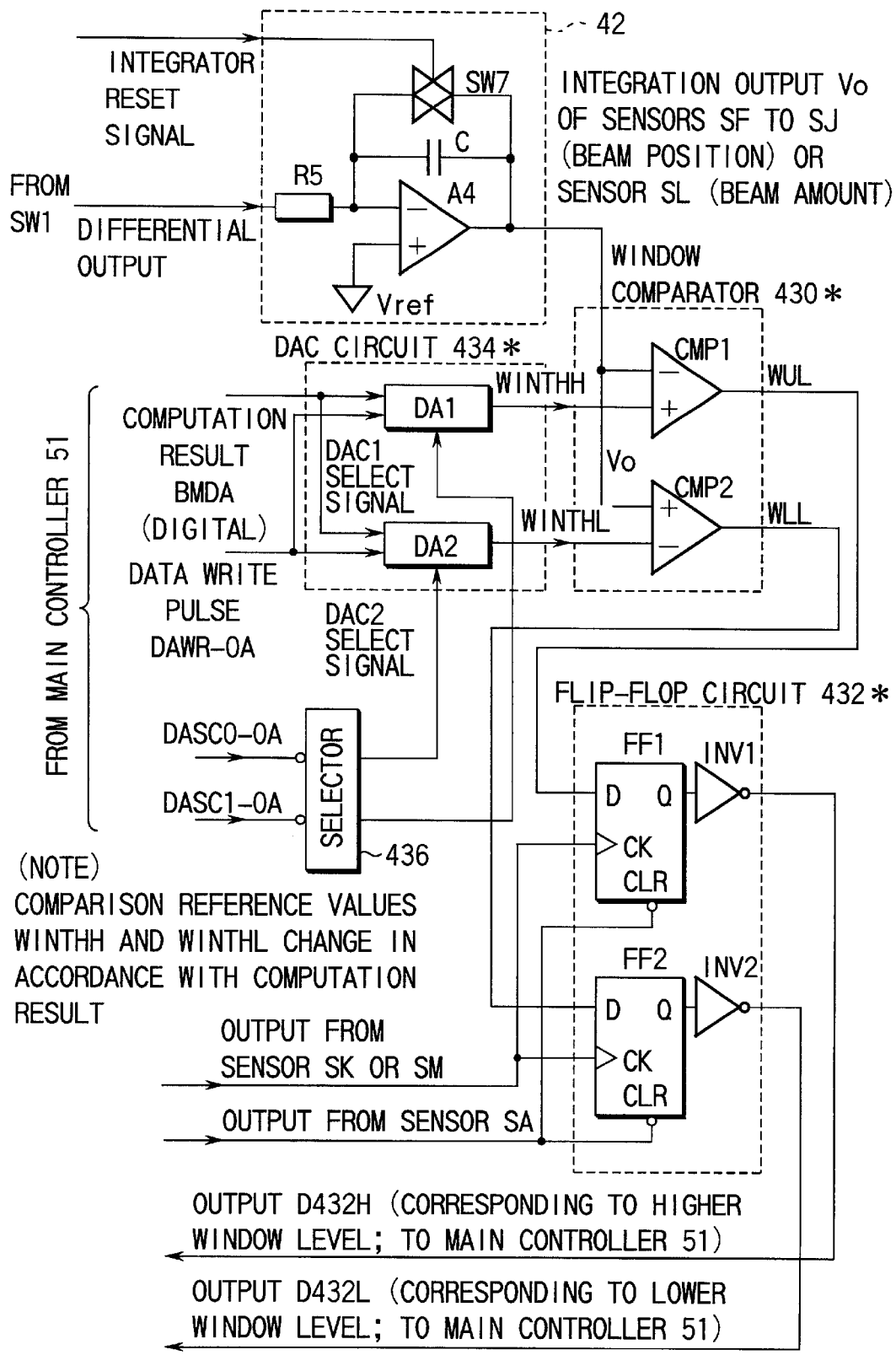
FIG. 35 is a circuit diagram for explaining an analog/digital processor using a window comparator according to another embodiment of the present invention.

FIG. 19 exemplifies the correspondence between the laser power detected by sensor pattern SL in FIG. 3, and the corresponding integration output. This correspondence is basically the same when a single comparator shown in FIG. 9 is used and when a window comparator in FIG. 35 is used.

The laser power can be detected by a CPU process when main controller 51 fetches integration output data corresponding to the light amount detected by sensor pattern SL in FIG. 3 or 5.

A power detector that includes the CPU process is adjusted to exhibit characteristics shown in, e.g., FIG. 19. More specifically, the power detector is adjusted in advance to obtain an integration output=3.5 V (=2.5 V+1.0 V; 1.0 V is a predetermined increment) when a laser beam with laser power of 300 µW is scanned on sensor 380 of beam position detector 38 at a predetermined speed.

The characteristic data (data that represents the correspondence between the integration output voltage and laser power) shown in FIG. 19 is stored in memory 52 connected to main controller 51 until delivery of the copying machine shown in FIG. 5 from a factory.

The laser light amount control (laser power control or beam power control) using the single comparator (CMP0) 430 in FIG. 9 will be explained below.

The laser light amount control includes two kinds of control, i.e., control for adjusting a given laser beam to a desired light amount (power) (non-relative value control), and control for adjusting the light amount (power) of another laser beam to that of a reference laser beam (relative value control).

The former laser power control (non-relative value control) is executed prior to the beam passage position control described above with reference to FIGS. 14 to 17.

On the other hand, the latter laser power control (relative value control) is executed prior to actual image formation using the multi-beams.

Either laser power control can be implemented by the internal CPU of the main controller 51 in FIG. 5 or 8.

Figure 20:
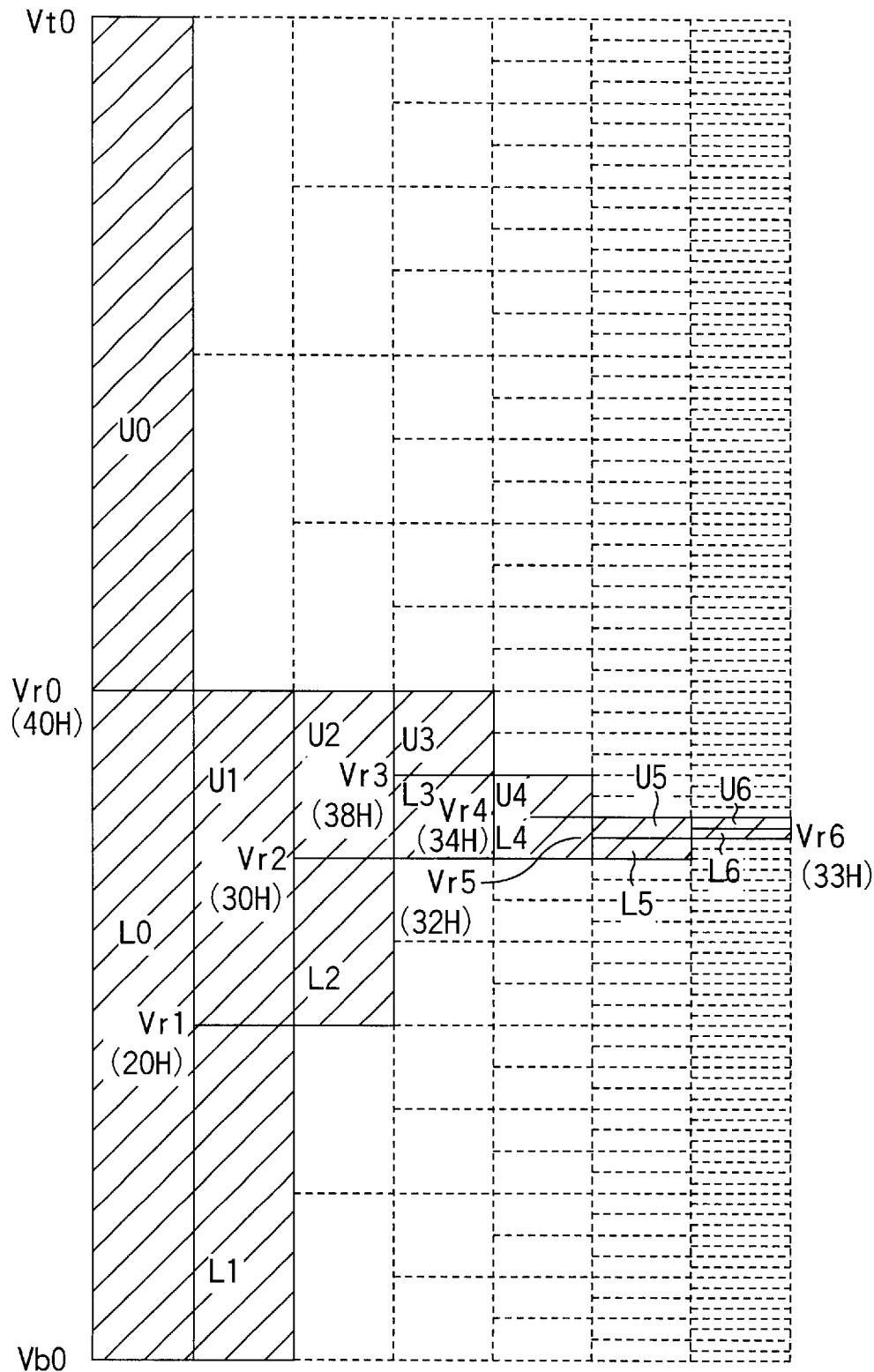
FIG. 20 is a view showing changes in threshold value of the single comparator when the laser power is controlled to a value (within the range from PL6 $\mu$W to PH6 $\mu$W) corresponding to threshold value Vr6 shown in FIG. 18.

FIG. 20 shows an example of a change in threshold value of the single comparator when the laser power is controlled to a value corresponding to predetermined threshold value Vr6.

In FIG. 20, assume that Vb0 corresponds to a reference voltage (Vr=2.5 V mentioned above), and that Vt0 corresponds to +5.0 V as the maximum value of the integration output.

Also, assume that PH6 (µW) represents the upper limit of desired laser power indicated by threshold value Vr6, and PL6 (µW) represents its lower limit. In this case, when laser power is controlled within the range from PL6 (µW) to PH6 (µW), the threshold value of the comparator is set in turn to be Vr0→Vr1→Vr2→Vr3→Vr4→Vr5→Vr6, and the laser power is adjusted so that integration output (laser light amount or laser power) V0 of integrator 42 finally falls within a desired threshold value range (the range between a threshold value corresponding to PL6 µW and a threshold value corresponding to PH6 µW).

Since hexadecimal values of the threshold values exemplified in FIG. 20 are assumed independently from laser instruction values exemplified in FIG. 13, the relationship between the hexadecimal values and threshold values in FIG. 20 is different from that in FIG. 13. For this reason, it may be considered that, for example, "33H" of Vr6 in FIG. 20 corresponds to "7FH" or "80H" in FIG. 13.

Also, since the threshold values in FIG. 20 are assumed independently from those in FIG. 18, Vr0 to Vr6 exemplified in FIG. 20 are not the same as those in FIG. 18.

Furthermore, FIG. 20 exemplifies threshold value control done within area L0 equal to or lower than threshold value Vr0. However, similar threshold value control may be done within area U0 equal to or higher than Vr0.

The power control for beam control will be described below with reference to FIG. 20 and FIGS. 21 to 24. This control assumes that the laser light amount is adjusted to obtain laser power=300 µW on the surface of sensor 380 in FIG. 3.

Normally, in an image forming apparatus to which the present invention is applied, each laser is adjusted in advance to emit light of, e.g., 300 µW in response to a predetermined instruction value (8-bit data in hexadecimal notation) upon delivery from a factory. Since the laser is adjusted in advance, the laser emission amount control seems not to be necessary, but is required for the following reasons.

That is, the polygonal mirror is rotated at high speed without being shielded from surroundings. For this reason, the reflection surface (mirror surface) of polygonal mirror 35 is contaminated with dust or the like in optical system unit 13 along with an elapse of time. When the mirror surface is contaminated, the loss of a laser beam reflected there increases, and the amount of laser beam with which the surface of sensor 380 is irradiated decreases. As a result, a desired sensor output cannot be obtained.

Even when an identical output voltage can be obtained from integrator 42, the laser power used in practice is likely to be higher (or lower) than the adjusted value (300 µW) upon delivery from a factory, which is actually used in image formation, due to a change in operation environment (temperature and the like) of the control circuit system, aging of circuit parts, and the like.

In other words, if control is done with reference to the pre-adjusted state of the laser oscillator without any correction, a desired laser-beam amount cannot often be obtained on the surface of sensor 380 due to contamination of polygonal mirror 35 or a change in operation environment. As a result, beam passage position control cannot often be normally executed.

For these reasons, even when the laser emission amount (laser power) is adjusted in advance to a predetermined value (300 µW) upon delivery from a factory, the laser emission amount control is needed to obtain a required laser light amount on the sensor surface in actual use.

In the example shown in FIG. 20, the control target of laser power is assumed to be PL6 (the allowable lower limit of laser power P6) <300 µW<PH6 (the allowable upper limit of laser power P6). That is, the instruction value to the laser oscillator is adjusted so that output Vo from integrator 42 belongs to area U6 (corresponding to laser power P6 that includes the allowable range from PL6 to PH6) bounded by threshold values Vr4 (e.g., PH6 corresponding to a hexadecimal value "34H") and Vr6 (e.g., PL6 corresponding to a hexadecimal value "33H") of comparator (CMP0) 430.

In this manner, the goal of the power control for beam control shown in FIGS. 21 to 24 is to obtain a laser light amount corresponding to 300 µW on the surface of sensor 380 even when the laser reflection surface of polygonal mirror 35 is contaminated.

FIGS. 21 to 24 are flow charts for explaining the laser power control (power control for beam control) using the arrangement (using the single comparator) shown in FIGS. 5 and 9.

Figure 21:
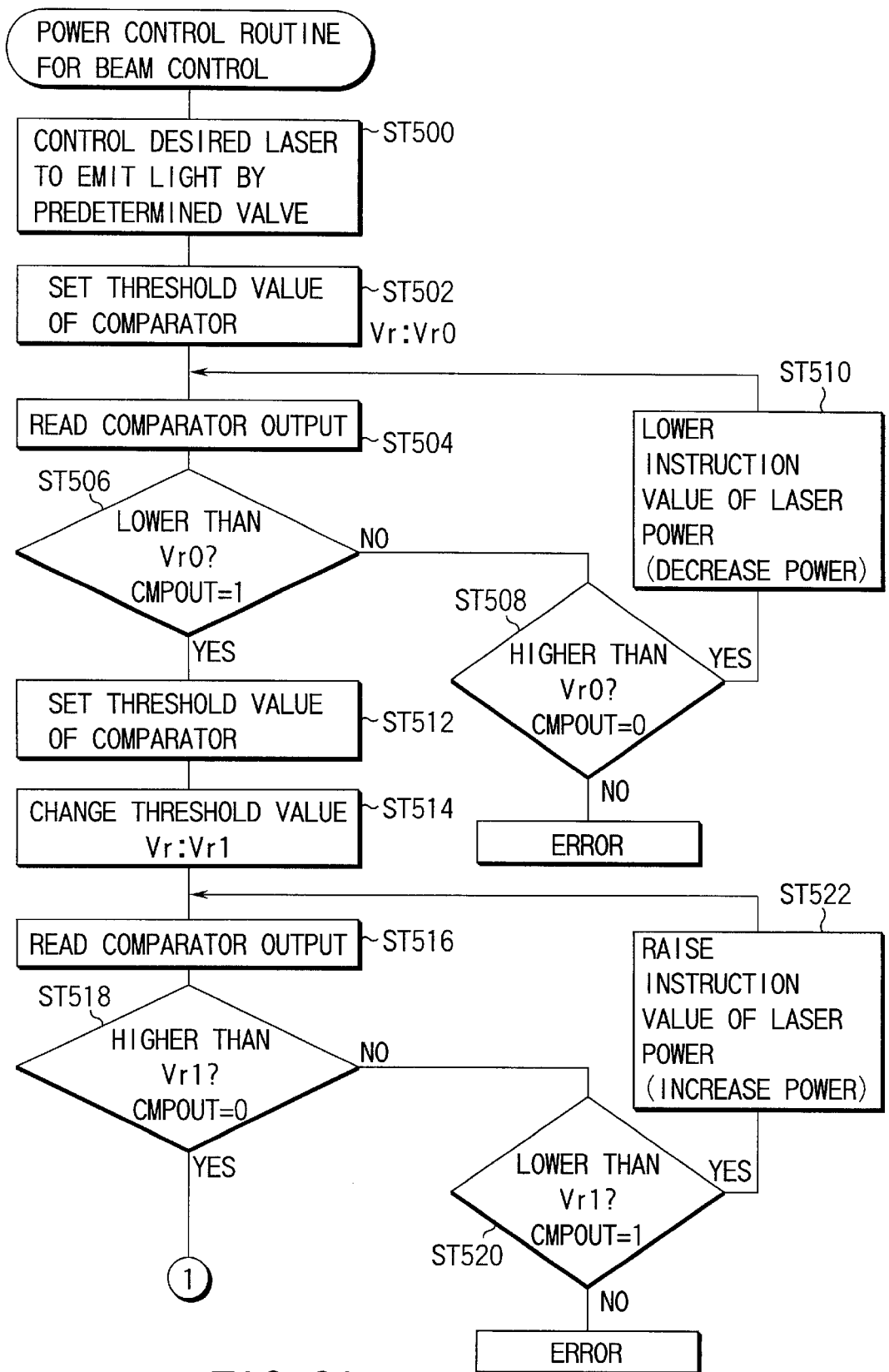
FIG. 21 is a flow chart for explaining a case wherein the beam amount (power) control is implemented using the arrangement shown in FIGS. 5 and 9 (using the single comparator)

Referring to FIG. 21, the CPU controls a desired laser (first laser) to emit light in accordance with a predetermined value (instruction value) (step ST500). More specifically, the CPU sets the predetermined instruction value in a laser driver (e.g., 32a in FIG. 5) of the first laser, and controls it to obtain a light amount of around 300 µW on the surface of sensor 380.

Assuming that the arrangement shown in FIG. 8 is used in laser power detection, when the laser power is large and the current of photodiode SL (a portion of sensor 380) is larger output voltage V3 of operational amplifier A3 increases. As a result, integration output Vo, the potential of which increases in proportion to the detected laser power, can be obtained.

The CPU sets threshold value Vr of comparator CMP0 in FIG. 9 to be Vr0 (V)=40H (step ST502), and reads the output from comparator CMP0 (step ST504). The CPU then checks the laser power on the basis of set threshold value Vr=Vr0 (40H) and integration output Vo corresponding to the detected laser power (step ST506).

The relationship between the area and power at this time is:

area U0 (Vo>Vr=40H): 374 to 750 µW (comparison result CMPOUT="0")

area L0 (Vo <Vr=40H): 0 to 374 µW (comparison result CMPOUT="1")

If output CMPOUT from comparator CMP0 is "0" (NO in step ST506; YES in step ST508), since the actual laser power is larger than the set value "40H", the CPU lowers the instruction value to be set in laser driver 32a to decrease the laser power (step ST510), and then checks the laser power again (step ST504, ST506).

Assume that the increment/decrement of laser power in this process (steps ST502 to ST510) is around 180 µW.

If NO in step ST506 and NO in step ST508, the checking results conflict with each other, and an error is determined, thus ending (or interrupting) the control.

The aforementioned operations repeat themselves until integration output Vo enters the target area (L0).

If output CMPOUT from comparator CMP0 is "1" (YES in step ST506), the flow advances to the next step.

Assume that the increment/decrement of laser power in the next process (steps ST512 to ST522) assumes a value smaller than that in area U0 or L0 in FIG. 20 (e.g., around 90 µW nearly half 180 µW).

More specifically, the CPU re-sets the comparison reference value in comparator CMP0 to obtain an increment/decrement of laser power of around 90 µW (step ST512), and changes threshold value Vr of comparator CMP0 to threshold value Vr1 corresponding to the re-set value (20H) (step ST514). The CPU then reads the output from comparator CMP0 (step ST516) to check the laser power again (step ST518).

The relationship between the area and power at this time is:

area U1 (Vo>Vr=20H): 185 to 374 µW (comparison result CMPOUT="0")

area L1 (Vo <Vr=20H): 0 to 185 µW (comparison result CMPOUT="1")

More specifically, if output CMPOUT from comparator CMP0 is "1" (NO in step ST518; YES in step ST520), since the actual laser power is smaller than the set value "20H", the CPU raises the instruction value to be set in laser driver 32a to increase the laser power (step ST522), and checks the laser power again (step ST516, ST518).

If NO in step ST518 and NO in step ST520, the checking results conflict with each other, and an error is determined, thus ending (or interrupting) the control.

The aforementioned operations repeat themselves until integration output Vo enters the target area (U1).

Figure 22:
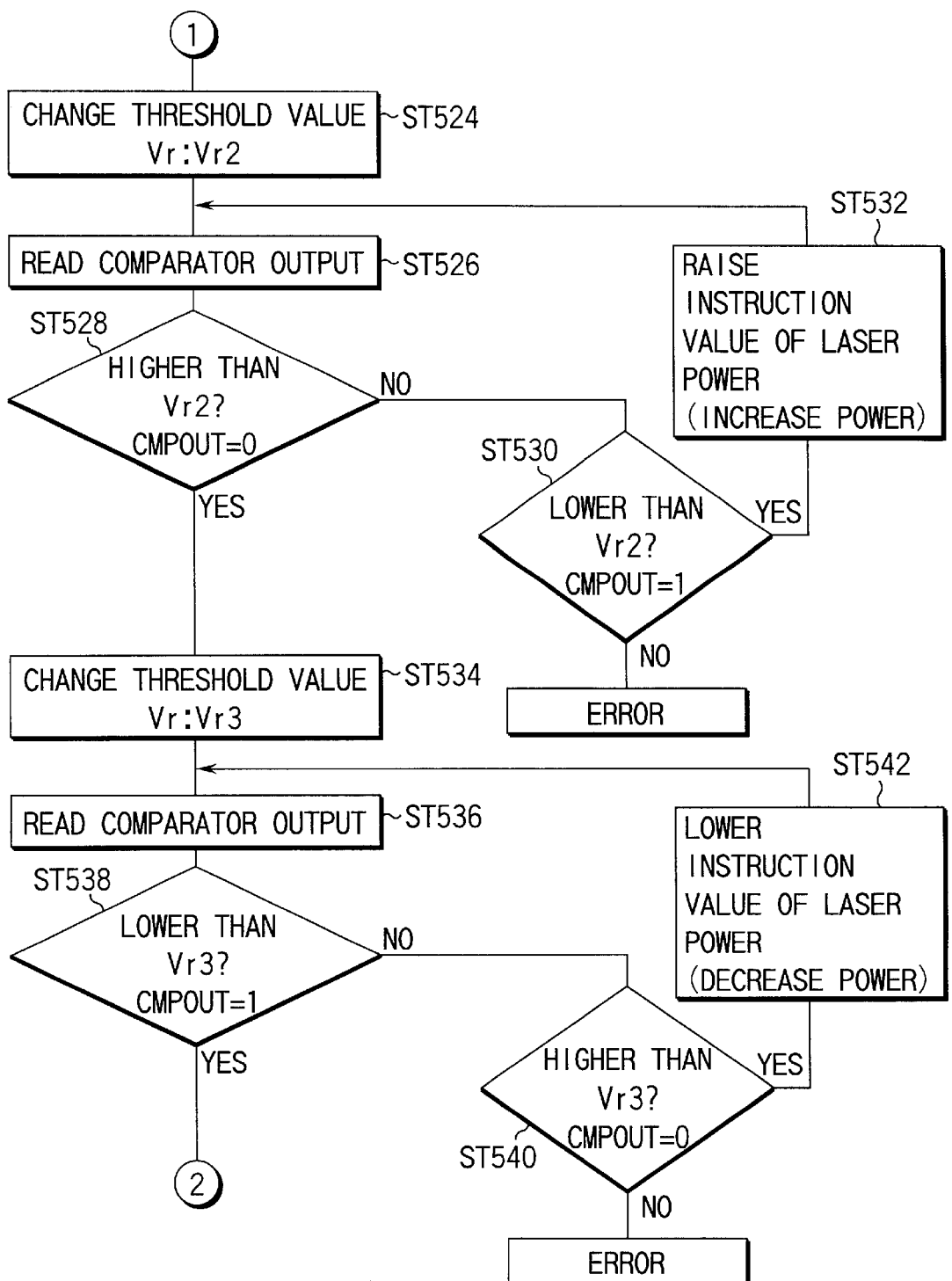
FIG. 22 is a flow chart for explaining the beam power control continued from FIG. 21.

If output CMPOUT from comparator CMP0 is "0" (YES in step ST518), the control enters the process shown in FIG. 22.

After completion of the steps in FIG. 21, in the process shown in FIG. 22, the CPU changes threshold value Vr of comparator CMP0 to Vr2 (V)=30H (step ST524), and reads the output from comparator CMP0 (step ST526). The CPU then checks the laser power on the basis of set threshold value Vr=Vr2 (30H) and integration output Vo corresponding to the detected laser power (step ST528).

The relationship between the area and power at this time is:

area U2 (Vo>Vr=30H): 280 to 374 µW (comparison result CMPOUT="0")

area L2 (Vo<Vr=30H): 185 to 280 µW (comparison result CMPOUT="1")

If output CMPOUT from comparator CMP0 is "1" (NO in step ST528; YES in step ST530) since the actual laser power is smaller than the set value "30H", the CPU raises the instruction value to be set in laser driver 32a to increase the laser power (step ST532), and checks the laser power again (step ST526, ST528).

Assume that the increment/decrement of laser power in this process (steps ST524 to ST532) is, e.g., around 40 µW.

If NO in step ST528 and NO in step ST530, the checking results conflict with each other, and an error is determined, thus ending (or interrupting) the control.

The aforementioned operations repeat themselves until integration output Vo enters the target area (U2).

If output CMPOUT from comparator CMP0 is "0" (YES in step ST528), the flow advances to the next step.

Assume that the increment/decrement of laser power in the next process (steps ST534 to ST542) is, e.g., around 20 µW.

More specifically, the CPU re-sets the comparison reference value in comparator CMP0 to obtain an increment/decrement of laser power of around 20 µW, and changes threshold value Vr of comparator CMP0 to threshold value Vr3 corresponding to the re-set value (38H) (step ST534). The CPU then reads the output from comparator CMP0 (step ST536) to check the laser power again (step ST538).

The relationship between the area and power at this time is:

area U3 (Vo>Vr=38H): 326 to 374 µW (comparison result CMPOUT="0")

area L3 (Vo<Vr=38H): 280 to 326 µW (comparison result CMPOUT="1")

That is, if output CMPOUT from comparator CMP0 is "0" (NO in step ST538; YES in step ST540), since the actual laser power is larger than the set value "38H", the CPU lowers the instruction value to be set in laser driver 32a to decrease the laser power (step ST542), and then checks the laser power again (step ST536, ST538).

If NO in step ST538 and NO in step ST540, the checking results conflict with each other, and an error is determined, thus ending (or interrupting) the control.

The aforementioned operations repeat themselves until integration output Vo enters the target area (L3).

Figure 23:
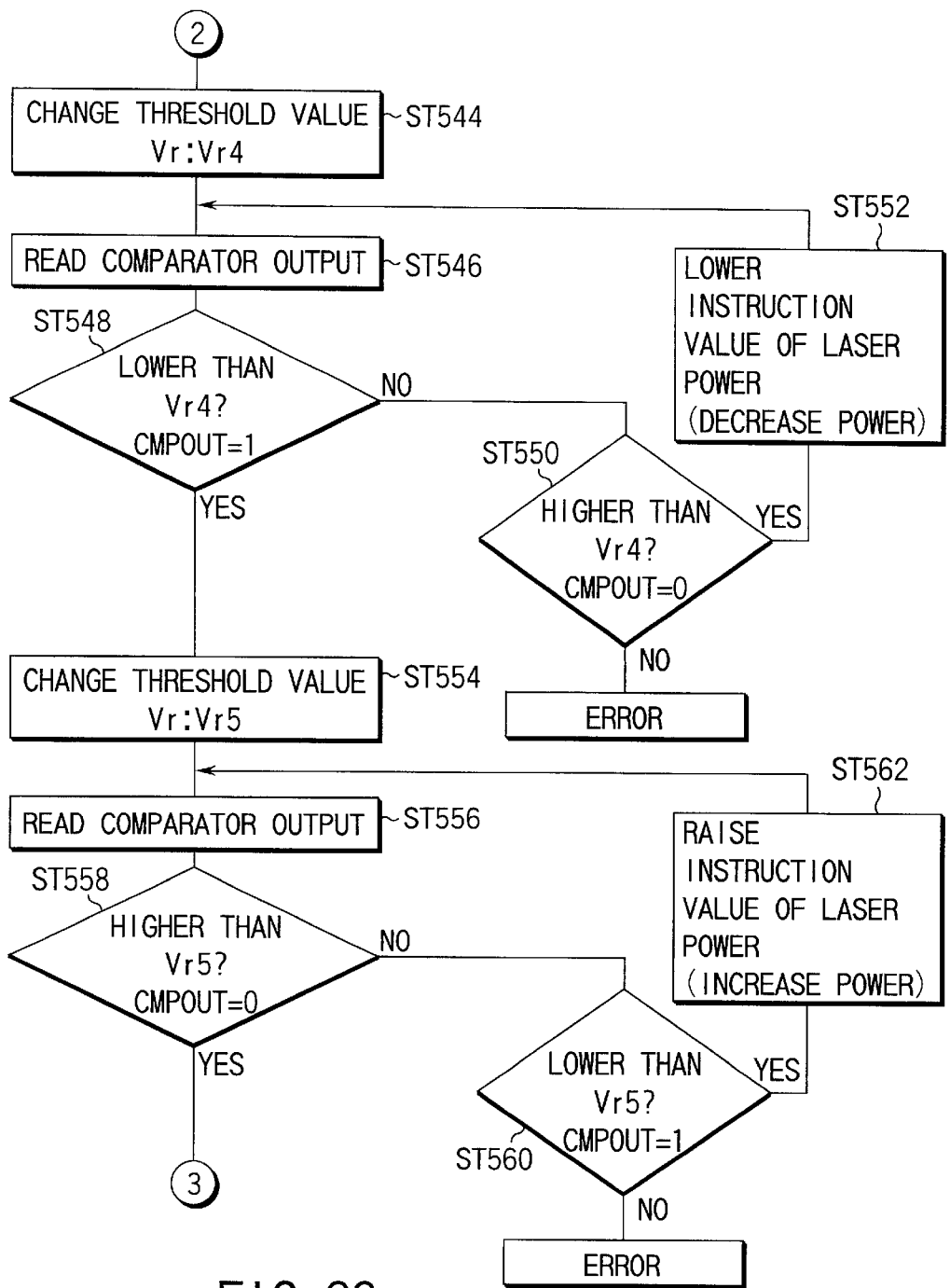
FIG. 23 is a flow chart for explaining the beam power control continued from FIG. 22.

If output CMPOUT from comparator CMP0 is "0" (YES in step ST538), the control enters the process shown in FIG. 23.

After completion of the steps in FIG. 22, in the process shown in FIG. 23, the CPU changes threshold value Vr of comparator CMP0 to Vr4 (V)=34H (step ST544), and reads the output from comparator CMP0 (step ST546). The CPU then checks the laser power on the basis of set threshold value Vr Vr4 (34H) and integration output Vo corresponding to the detected laser power (step ST548).

The relationship between the area and power at this time is:

area U4 (Vo>Vr=34H): 303 to 326 $\mu$W (comparison result CMPOUT="0")

area L4 (Vo<Vr=34H): 280 to 303 $\mu$W (comparison result CMPOUT="1")

If output CMPOUT from comparator CMP0 is "0" (NO in step ST548; YES in step ST550), since the actual laser power is larger than the set value "34H", the CPU lowers the instruction value to be set in laser driver 32a to decrease the laser power (step ST552), and then checks the laser power again (step ST546, ST548).

Assume that the increment/decrement of laser power in this process (steps ST544 to ST552) is, e.g., around 10 $\mu$W.

If NO in step ST548 and NO in step ST550, the checking results conflict with each other, and an error is determined, thus ending (or interrupting) the control.

The aforementioned operations repeat themselves until integration output Vo enters the target area (L4).

If output CMPOUT from comparator CMP0 is "1" (YES in step ST548), the flow advances to the next step.

Assume that the increment/decrement of laser power in the next process (steps ST554 to ST562) is, e.g., around 5 $\mu$W.

More specifically, the CPU re-sets the comparison reference value in comparator CMP0 to obtain an increment/decrement of laser power of around 5 $\mu$W, and changes threshold value Vr of comparator CMP0 to threshold value Vr5 corresponding to the re-set value (32H) (step ST554). The CPU then reads the output from comparator CMP0 (step ST556) to check the laser power again (step ST558).

The relationship between the area and power at this time is:

area U5 (Vo>Vr=32H): 291 to 303 $\mu$W (comparison result CMPOUT="0")

area L5 (Vo<Vr=32H): 280 to 291 $\mu$W (comparison result CMPOUT="1")

That is, if output CMPOUT from comparator CMP0 is "1" (NO in step ST558; YES in step ST560), since the actual laser power is smaller than the set value "32H", the CPU raises the instruction value to be set in laser driver 32a to increase the laser power (step ST562), and checks the laser power again (step ST556, ST558).

If NO in step ST558 and NO in step ST560, the checking results conflict with each other, and an error is determined, thus ending (or interrupting) the control.

The aforementioned operations repeat themselves integration output Vo enters the target area (U5).

Figure 24:
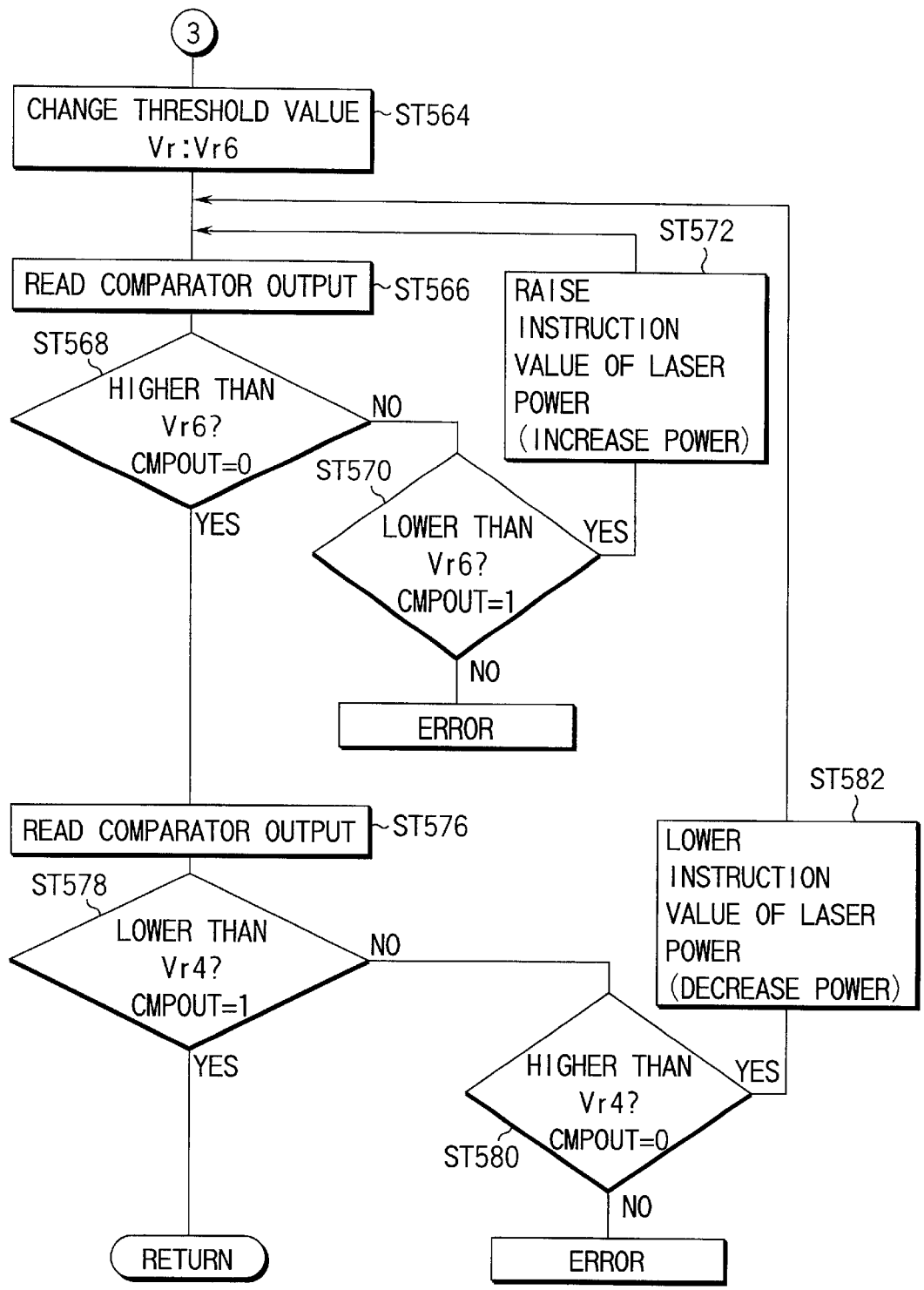
FIG. 24 is a flow chart for explaining the beam power control continued from FIG. 23.

If output CMPOUT from comparator CMP0 is "0" (YES in step ST558), the control enters the process shown in FIG. 24.

After completion of the steps in FIG. 23, in the process shown in FIG. 24, the CPU changes threshold value Vr of comparator CMP0 to Vr6 (V)=33H (step ST564), and reads the output from comparator CMP0 (step ST566). The CPU then checks the laser power on the basis of set threshold value Vr=Vr6 (33H) and integration output Vo corresponding to the detected laser power (step ST568).

The relationship between the area and power at this time is:

area U6 (Vo>Vr=33H): 297 to 303 $\mu$W (comparison result CMPOUT="0")

area L6 (Vo<Vr=33H): 291 to 297 $\mu$W (comparison result CMPOUT="1")

If output CMPOUT from comparator CMP0 is "1" (NO in step ST568; YES in step ST570), since the actual laser power is smaller than the set value "33H", the CPU raises the instruction value to be set in laser driver 32a to increase the laser power (step ST572), and checks the laser power again (step ST566, ST568).

Assume that the increment/decrement of laser power in this process (steps ST564 to ST572) is, e.g., around 2 $\mu$W. (If the minimum resolution of the laser oscillator actually used is, e.g., 2.3 $\mu$W the increment/decrement of power for threshold value Vr6 is preferably set at 2.3 $\mu$W.)

If NO in step ST568 and NO in step ST570, the checking results conflict with each other, and an error is determined, thus ending (or interrupting) the control.

The aforementioned operations repeat themselves until integration output Vo enters the target area (U6).

If output CMPOUT from comparator CMP0 is "0" (YES in step ST568), the flow advances to the next step.

Assume that the increment/decrement of laser power in the next process (steps ST576 to ST582) is, e.g., also around 2 $\mu$W (in case of the aforementioned example, 2.3 $\mu$W). Note that the internal memory (not shown) of the CPU that makes processes and decisions (or memory 52 in FIG. 5) saves threshold value data used so far. Upon executing the subsequent steps, the CPU reads out data of threshold value Vr4=34H from the saved threshold value data.

The CPU then reads the output from comparator CMP0 (step ST576), and checks the laser power based on Vr4=34H (step ST578).

The relationship between the area and power at this time is:

area U6 (between threshold values 33H and 34H): 397 to 303 $\mu$W (comparison result CMPOUT="0")

That is, if output COPOUT from comparator CMP0 is "0" (NO in step ST578; YES in step ST580), since the actual laser power is slightly larger than the set value "34H", the CPU lowers the instruction value to be set in laser driver 32a to slightly decrease the laser power (step ST582), and then checks the laser power again (steps ST556 to ST568, ST576 to ST578).

If NO in step ST578 and NO in step ST580, the checking results conflict with each other, and an error is determined, thus ending (or interrupting) the control.

The aforementioned operations repeat themselves until integration output Vo enters the target area (U6).

If output CMPOUT from comparator CMP0 is "1" (YES in step ST578), this indicates that the laser light amount on the sensor surface falls within the range from 297 to 303 $\mu$W (threshold values 33H to 34H) (the error with respect to 300 $\mu$W is within ±1%).

In this manner, when the practical laser power on the sensor surface has reached a desired value (approximately 300 $\mu$W), the power control for beam control shown in FIGS. 21 to 24 ends, and the CPU of the main controller 51 shown in FIG. 5 returns to another process.

In the above description, the threshold value range from 33H to 34H corresponds to the laser power range from 397 to 303 $\mu$W. However, as exemplified in FIG. 25, the control method (sequence) executed when the laser power=300 $\mu$W corresponds to the threshold value=80H remains the same, except for numerical values of threshold value instruction data. Upon practicing the present invention, the numerical value relationship between the numerical values ($\mu$W) of laser power and threshold values (hexadecimal data) is not particularly limited.

FIG. 20 exemplifies a change in threshold value within area L0 until a desired control target is reached (to obtain laser power of 300 μW on the sensor surface). Also, the control operation when the threshold value changes within area U0 in FIG. 20 is substantially the same as that described above except for numerical values of instruction values (hexadecimal values) used (for example, threshold value control resulting from contamination of the polygonal mirror may be similarly done within area U0).

Figure 25:
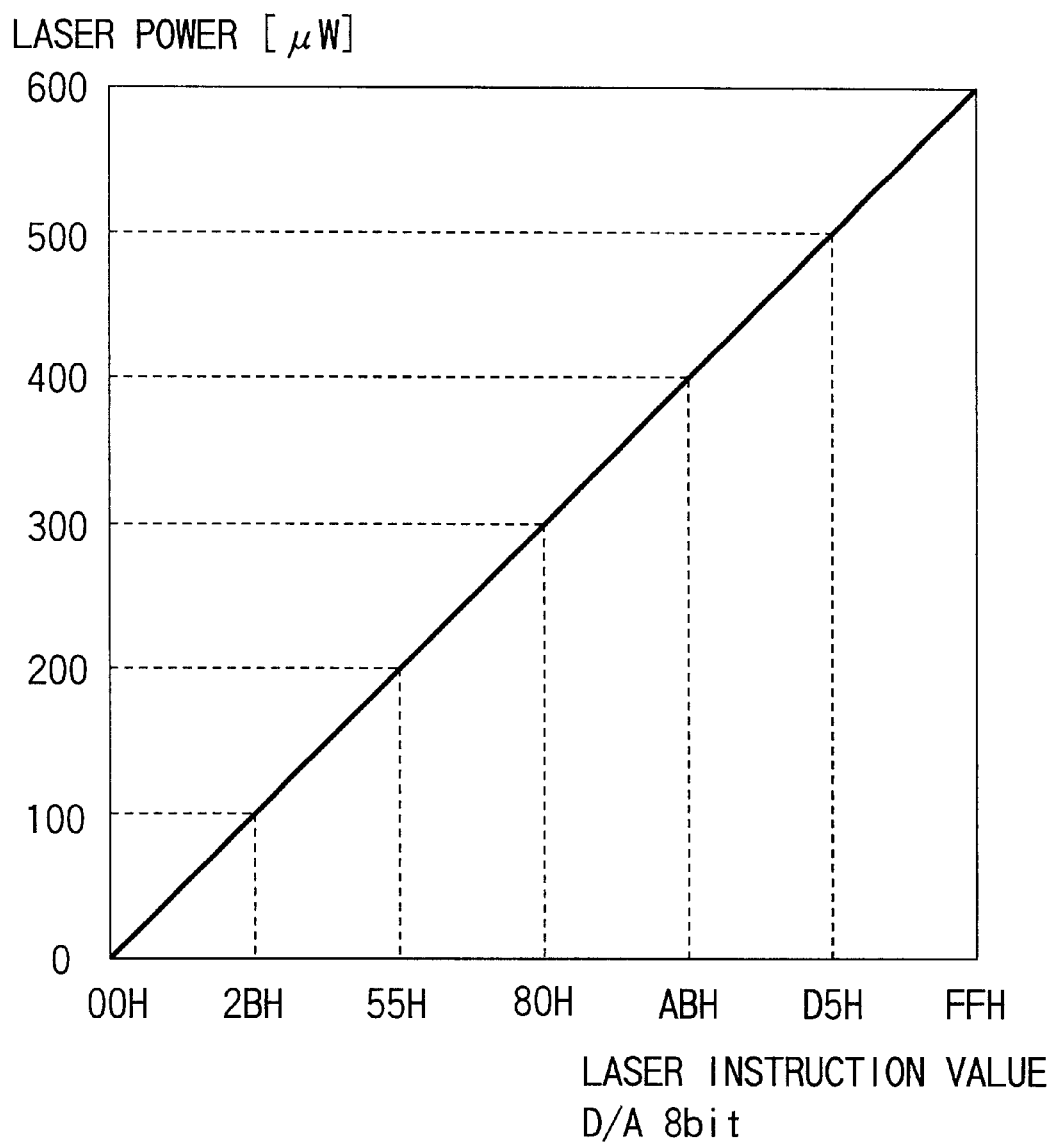
FIG. 25 is a graph showing the correspondence between the instruction value of the beam amount (power) and the corresponding laser power.

FIG. 25 shows an example of the correspondence between the instruction value (laser instruction value expressed by an 8-bit hexadecimal value; a value which is D/A-converted into a corresponding analog threshold value upon comparison) of the amount of beam coming from the laser that can be used in the embodiment of the present invention, and the corresponding laser power (μW).

More specifically, when the CPU of main controller 51 shown in FIG. 5 outputs, e.g., an instruction value "00H", the laser power is set at 0 μW (i.e., zero laser light amount); when the CPU outputs "FFH", the laser power is set at 600 μW.

Likewise, when the instruction values from the CPU are 2BH, 55H, 80H, ABH, and D5H, the corresponding laser power levels are respectively 100 μW, 200 μW, 300 μW, 400 μW, and 500 μW.

Since the laser instruction value vs. laser power relationship shown in FIG. 25 is merely an example, the instruction value data that instructs, e.g., laser power=300 μW is not limited to 80H, and can be arbitrarily selected depending on embodiments.

If the maximum output of the laser used is 750 μW, this laser can emit light at 750 μW by a CPU instruction other than "FFH".

Operational amplifier A4 that constructs integrator 42 shown in FIG. 9 can linearly output an analog integration voltage (Vo) of ±5 V. In this case, laser power=600 μW (instruction value "FFH") in FIG. 25 can be detected by integration output Vo=4 V in FIG. 19; laser power=750 μW can be detected by integration output Vo=5 V.

The light amount control routine of a laser beam for image formation will be explained below.

Figure 26:
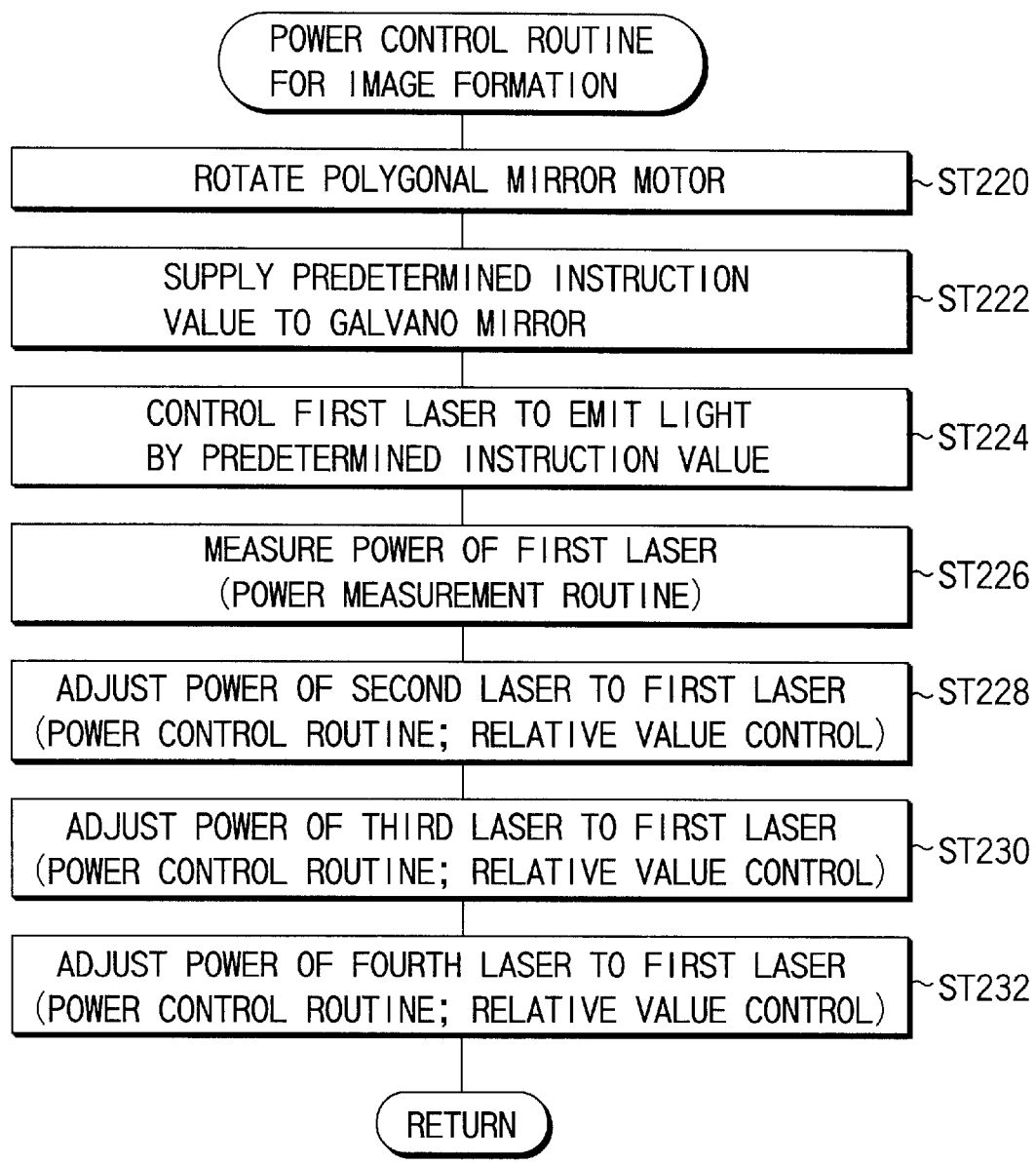
FIG. 26 is a flow chart for explaining the beam amount (power) control for image formation.

FIG. 26 is a flow chart for explaining the main flow of the beam amount (laser power) control for image formation.

For example, the CPU of main controller 51 shown in FIG. 5 supplies an instruction to polygonal mirror motor driver 37 to rotate polygonal mirror motor 36 at a predetermined rotational speed (step ST220).

Subsequently, the CPU supplies a predetermined instruction value(s) to galvano mirror driving circuits 39*a* to 39*d* to designate scan routes of the four multi-laser beams (step ST222).

The CPU controls first laser 31*a* of the four multi-laser beams by a predetermined instruction value (e.g., 300 μW designated by 80H in the example in FIG. 25) (step ST224), and measures the amount (laser power) of light coming from first laser 31*a* on the surface of sensor 380 (step ST226).

The power measurement of first laser 31*a* (step ST226) can be implemented using, e.g., the circuit arrangement shown in FIG. 9 and the sequence shown in FIG. 27 (to be described later).

With reference to the measured power of first laser 31*a*, the laser power of second laser 31*b* is controlled to match (on the sensor surface) that of first laser 31*a* (step ST228).

The power control of second laser 31*b* (step ST228) can be implemented by the sequence shown in FIGS. 29 to 32 (to be described later).

Subsequently, the laser power of third laser 31*c* is controlled with reference to the measured power of first laser 31*a* to match (on the sensor surface) that of first laser 31*a* (step ST230).

The power control of third laser 31*c* (step ST230) can also be implemented by the sequence shown in FIGS. 29 to 32 (to be described later).

Finally, the laser power of fourth laser 31*d* is controlled with reference to the measured power of first laser 31*a* to match (on the sensor surface) that of first laser 31*a* (step ST232).

The power control of fourth laser 31*d* (step ST232) can also be implemented by the sequence shown in FIGS. 29 to 32 (to be described later).

The process shown in FIG. 26 can be summarized as follows. That is, a specific one of the multi-beams undergoes the absolute value control of laser power on the sensor surface (ST226). The laser power levels of the remaining beams undergo relative value control to match that of the specific beam that has undergone the absolute value control (ST228 to ST232).

Note that an embodiment in which all the multi-laser beams undergo absolute value control (ST226 or power control shown in FIGS. 21 to 24) is also available. In such case, relative value control of the multi-beam laser power can be omitted.

When the relative value control is used, the laser power serving as the control target and the instruction value (or approximate value around that value) of the corresponding threshold value are known in advance from the power measurement result of the absolute value control. For this reason, the number of times of execution of the repetitive processing loops required until completion of relative value control of each beam may be smaller than that required when only the absolute value control is done.

Further, when the relative value control is used, if the laser power levels of all the beams are to be changed, only a reference laser beam can undergo new absolute value control, and the relative value control for the remaining beams is likely to be omitted if a new change in instruction value obtained for the reference laser beam is reflected in the remaining laser beams. (Whether or not the relative value control can be omitted is determined depending on the allowable laser power variations among all the beams in terms of the specifications of a product, or depending on laser power variations that could occur in an actual product as a result of omission of the relative value control).

In the laser beam amount control for image formation, a reference laser beam (first laser beam a) is controlled to emit light by a predetermined instruction value (e.g., 80H), and the amount of that beam is measured on sensor 380 of beam amount (position) detector 38 and is recorded in memory 52.

With reference to the measurement result of beam amount detector 38, the instruction values of the laser drivers (32*b*, 32*c*, and 32*d*) are adjusted so that the amounts of the remaining laser beams (laser beams b, c, and d) match the measurement result of the reference laser beam (laser beam a) (in the same manner as in the case described using FIG. 26).

That is, the CPU of main controller 51 rotates polygonal mirror motor 36 at a predetermined speed, and supplies instruction values to the galvano mirrors (33*a* to 33*d*) so that the respective laser beams pass near the center of beam detect sensor 380.

Note that beam detect sensor 380 has a shape having a sufficient margin in the sub-scan direction. In the structure shown in FIG. 3, the vertical size (several mm or more) of sensor pattern SL is sufficiently (exceedingly) larger than the total width (less than 0.1 mm) of parallel multi-beams. For this reason, the beam passage position in the control using the galvano mirrors does not require precision as high as that required for the beam passage position control (the sub-scan beam position control that defines the beam pitches of the neighboring beams).

Then, the reference laser is controlled to emit light by a predetermined value. In this example, first laser 31a is used as a reference laser. Assume that the reference laser has been adjusted to have the I/O characteristics shown in FIG. 25 upon delivery from a factory (i.e., 300 µW are obtained by 80H). When the I/O characteristics shown in FIG. 25 are used, if the laser power upon image formation is controlled to be 200 µW, the CPU of main controller 51 can supply an instruction value "55H" to laser driver 32a.

Figure 27:
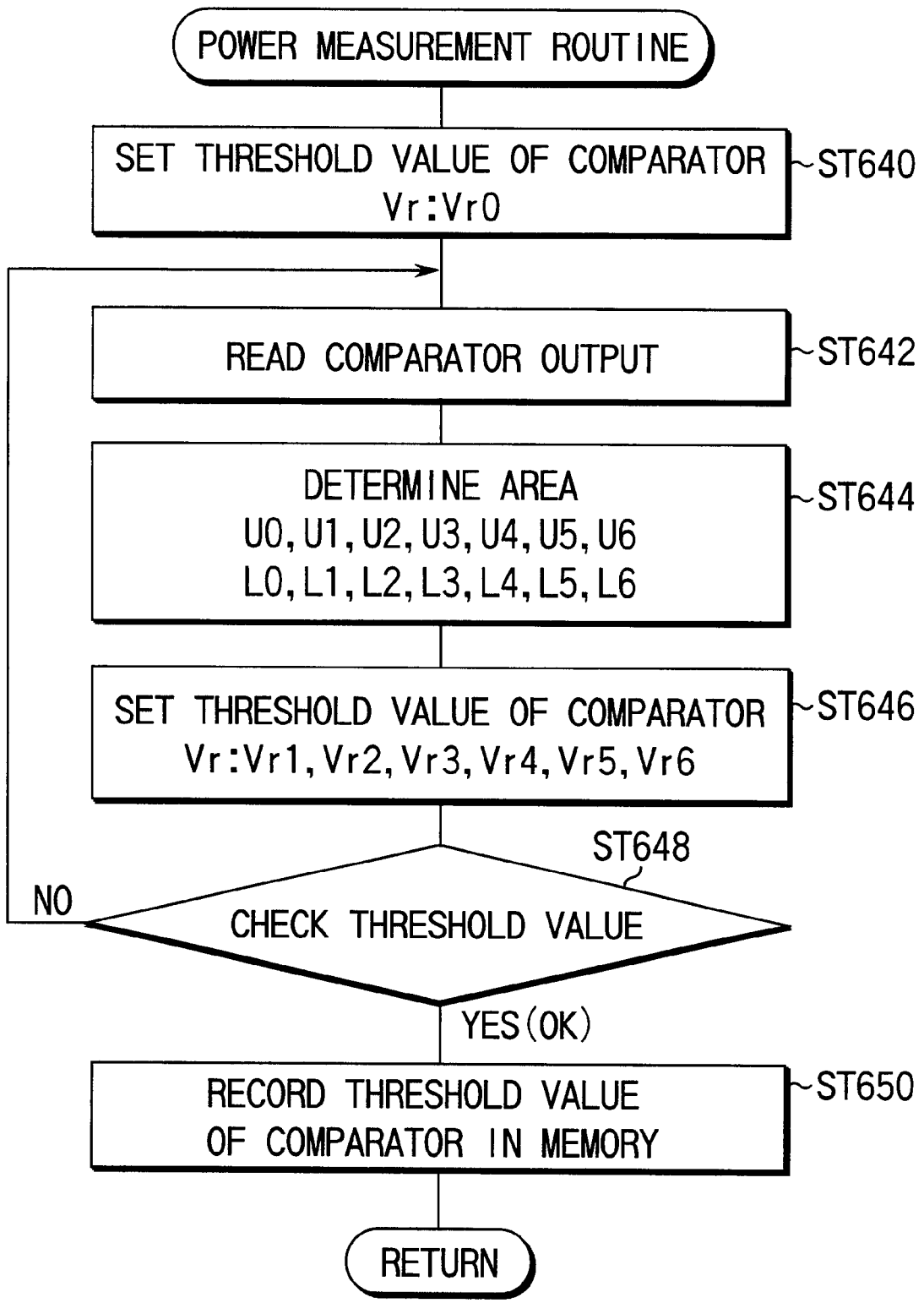
FIG. 27 is a flow chart for explaining the sequence for measuring the beam amount (power)

After the aforementioned pre-process, the amount of the beam emitted by first laser beam 31a is measured in accordance with the laser power measurement routine shown in FIG. 27.

Figure 28:
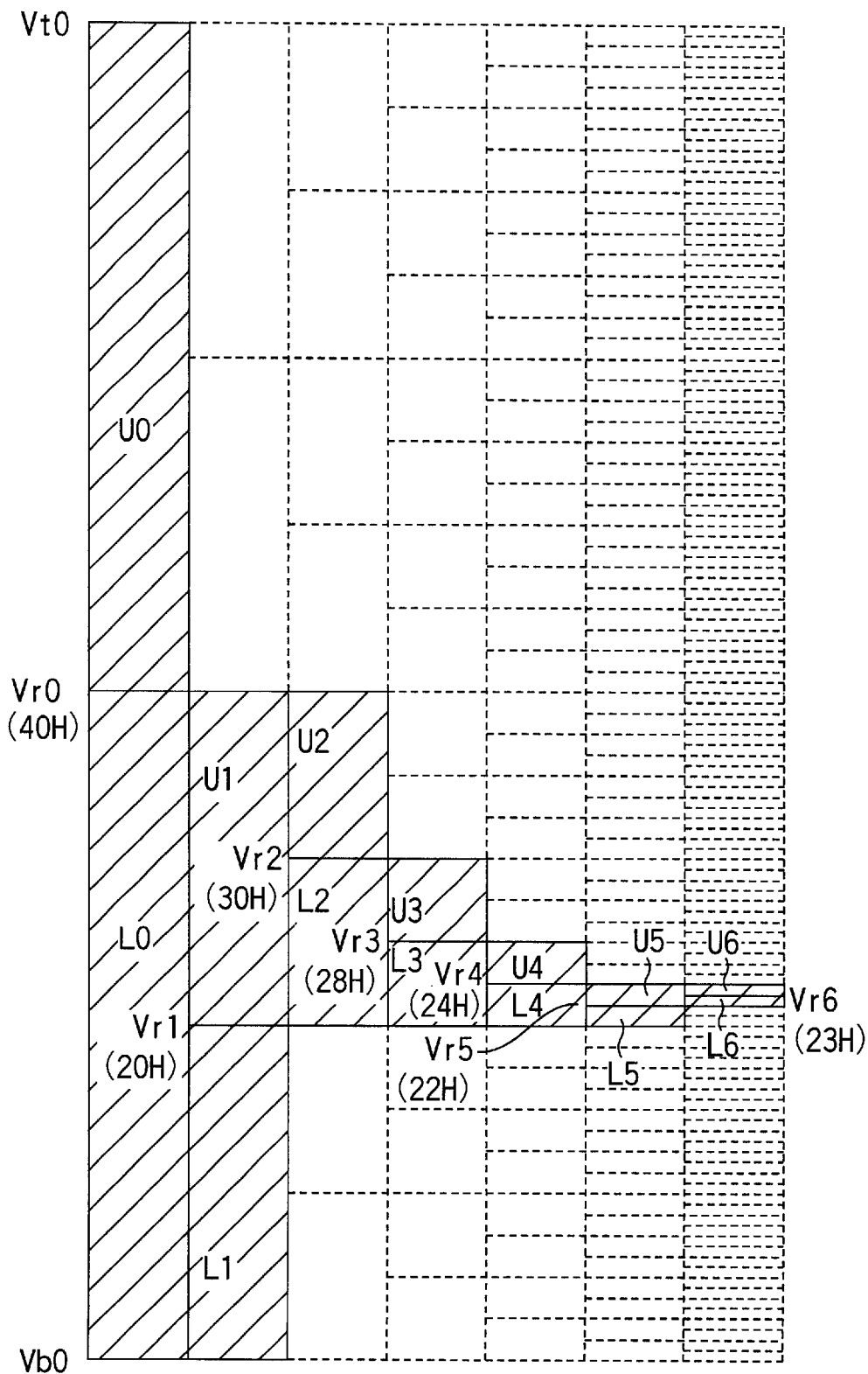
FIG. 28 is a view showing changes in threshold value of the single comparator in laser power measurement and laser power relative value control.

FIG. 27 is a flow chart for explaining the laser power measurement sequence (absolute value control) in step ST226 in FIG. 26. FIG. 28 shows a change in threshold value of the single comparator in the laser power measurement and laser power relative value control in FIG. 26. (Since the hexadecimal values of threshold values exemplified in FIG. 28 are assumed independently from the laser instruction values exemplified in FIG. 25, FIGS. 28 and 25 use different hexadecimal values. For this reason, it may be considered that "23H" of Vr6 in FIG. 28 corresponds to "55H" of 200 µW in FIG. 25.)

In the process shown in FIG. 27, the CPU of main controller 51 shown in FIG. 5 sets threshold value Vr of comparator 430 (CMP0 in FIG. 9) at Vr0 using predetermined instruction data (40H in the example shown in FIG. 28) (step ST640).

The CPU then reads the comparator output (CMPOUT in FIG. 9) as a comparison result of threshold value Vr0 and integration output Vo at that time (step ST642).

Threshold value Vr0 (40H) is set to roughly equally divide (U0 and L0 obtained by dividing the area into two areas in FIG. 28) the detection characteristics of beam amount detector 38. That is, the CPU determines, based on the contents ("0" or "1") of the comparator output, one of the two-divided areas (U0 and L0 in FIG. 28) to which area the beam amount (laser power) of the first laser beam (31a) belongs (step ST644).

The correspondence among the threshold value, area, laser power, and comparator output (comparison result) at that time is:

$Vr \rightarrow Vr0(V)=40H$ area U0: 374 to 750 µW (comparison result CMPOUT= "0")

area L0: 0 to 374 µW (comparison result CMPOUT="1")

Upon completion of determining based on Vr0 the area (U0 or L0) to which the laser power belongs in step ST644, the CPU changes the threshold value of the comparator (step ST646).

For example, if it is determined that the laser power belongs to area L0, the CPU changes threshold value Vr to threshold value Vr1 (20H in the example in FIG. 28) that roughly equally divides the range from Vb0 to Vr0 into two areas (U1 and L1 obtained by dividing area L0 into two areas) (step ST646). The CPU checks if the threshold value corresponds to the control target area (step ST648).

As a result of checking the threshold value in step ST648, if the laser power has not reached the control target area (area U1/L1 has a broad range, and the laser power has not reached the target control area yet; NO in step ST648), the CPU reads the comparator output again (step ST642) to determine one of the two-divided areas (U1 and L1 in FIG. 28) to which the laser power belongs (step ST644). The correspondence among the threshold value, area, laser power, and comparator output (comparison result) at that time is:

$Vr \rightarrow Vr1(V)=20H$ area U1: 185 to 374 µW (comparison result CMPOUT= "0")

L1: 0 to 185 µW (comparison result CMPOUT="1")

Upon completion of determining based on Vr0 the area (U1 or L1) to which the laser power belongs in step ST644, the CPU changes the threshold value of the comparator (step ST646).

For example, if it is determined that the laser power belongs to area U1, the CPU changes threshold value Vr to threshold value Vr2 (30H in the example in FIG. 28) that roughly equally divides the range from Vr1 to Vr0 into two areas (U2 and L2 obtained by dividing area U1 into two areas) (step ST646). The CPU checks if the threshold value corresponds to the control target area (step ST648).

As a result of checking the threshold value in step ST648, if the laser power has not reached the control target area (area U2/L2 has a broad range, and the laser power has not reached the target control area yet; NO in step ST648), the CPU reads the comparator output again (step ST642) to determine one of the two-divided areas (U2 and L2 in FIG. 28) to which the laser power belongs (step ST644). The correspondence among the threshold value, area, laser power, and comparator output (comparison result) at that time is:

$Vr \rightarrow Vr2(V)=30H$ area U2: 280 to 374 µW (comparison result CMPOUT= "0")

area L2: 185 to 280 µW (comparison result CMPOUT= "1")

After that, the CPU repeats the loop of steps ST642 to ST648 to gradually narrow down the determination area (L2→L3→L4→U5→L6) while changing threshold value Vr to Vr3 (28H)→Vr4 (24H)→Vr5 (22H)→Vr6 (23H).

$Vr \rightarrow Vr3(V)=28H$ area U3: 232 to 374 µW (comparison result CMPOUT= "0")

area L3: 185 to 232 µW (comparison result CMPOUT= "1")

$Vr \rightarrow Vr4(V)=24H$ area U4: 209 to 232 µW (comparison result CMPOUT= "0")

area L4: 185 to 209 µW (comparison result CMPOUT= "1")

$Vr \rightarrow Vr5(V)=22H$ area U5: 197 to 209 µW (comparison result CMPOUT= "0")

area L5: 185 to 197 µW (comparison result CMPOUT="1")

and $$Vr \rightarrow Vr6(V)=23H$$

area U6: 203 to 209 µW (comparison result CMPOUT="0")

area L6: 197 to 203 µW (comparison result CMPOUT="1")

Assume that it is determined based on the comparator output (e.g., CMPOUT="1") using Vr6 that the laser power belongs to area L6 (step ST644).

In the process shown in FIG. 27, area U6/L6 is estimated to be the width of the minimum resolution level. For this reason, the threshold value set at Vr6 is not changed any more (step ST646), and the threshold value is checked (step ST648).

As a result of checking based on threshold value Vr6 (=23H), it is determined that the laser power has reached the control target area (YES/OK in step ST648). (At this time, since area U6/L6 to be checked corresponds to the minimum width estimated upon processing of this power measurement routine, it can be determined accordingly that the control target area has been reached.) Then, the CPU of main controller 51 in FIG. 5 records in memory 52 in FIG. 5 the comparator threshold value (Vr6=23H) and comparator output (CMPOUT="1" indicating area L6) at that time as data corresponding to the laser power absolute value (e.g., 200 µW) of the first laser beam (31a) on the sensor surface (step ST650).

In this manner, the process shown in FIG. 27 corresponding to the power measurement routine (absolute value control) in step ST226 in FIG. 26 comes to an end.

When the measurement result of the power absolute value of the first laser (31a) can be recorded by the process shown in FIG. 27, the laser power levels of the remaining laser beams can be relatively adjusted using as reference data the recorded threshold value (23H) and comparator output (CMPOUT="1" for area L6) to match the reference data.

More specifically, in the above-mentioned example, data in area L6 corresponding to the threshold value range from Vr5=22H and Vr6=23H is used as reference data of the laser power relative value control in steps ST228 to ST232 in FIG. 26.

FIGS. 29 to 32 are flow charts for explaining the laser power relative value control in step ST228, ST230, or ST232 in FIG. 26. This relative value control can also be done using the arrangement (using the single comparator) shown in FIGS. 5 and 9.

The execution sequence of this laser power relative value control can be the same as that of the laser power absolute value control shown in FIGS. 21 to 24. However, since the control target data (Vr6=23H and CMPOUT="1" indicating area L6) is already stored in memory 52, if the process is executed based on this stored data, the processing time required until completion of the control can be shortened by setting coarser increments/decrements of the laser power instruction value (ST710, ST722, ST732, ST742, ST752, ST762) in the former half (FIGS. 29 and 30) of the control, or by skipping some increment/decrement processes of the laser power instruction value.

For example, in the absolute value control shown in FIGS. 21 to 24, the processes that approach the final control target are executed while changing the threshold value step by step like Vr0→Vr1→Vr2→Vr3→Vr4→Vr5→Vr6. In the relative value control shown in FIGS. 29 to 32, however, the processes may be simplified to approach the final control target while changing the threshold value in two steps like Vr0→Vr2=Vr4→Vr6.

Alternatively, in the relative value control shown in FIGS. 29 to 32, the processes may be simplified to approach the final control target while changing the threshold value in three steps like Vr0→Vr3→Vr6.

Figure 29:
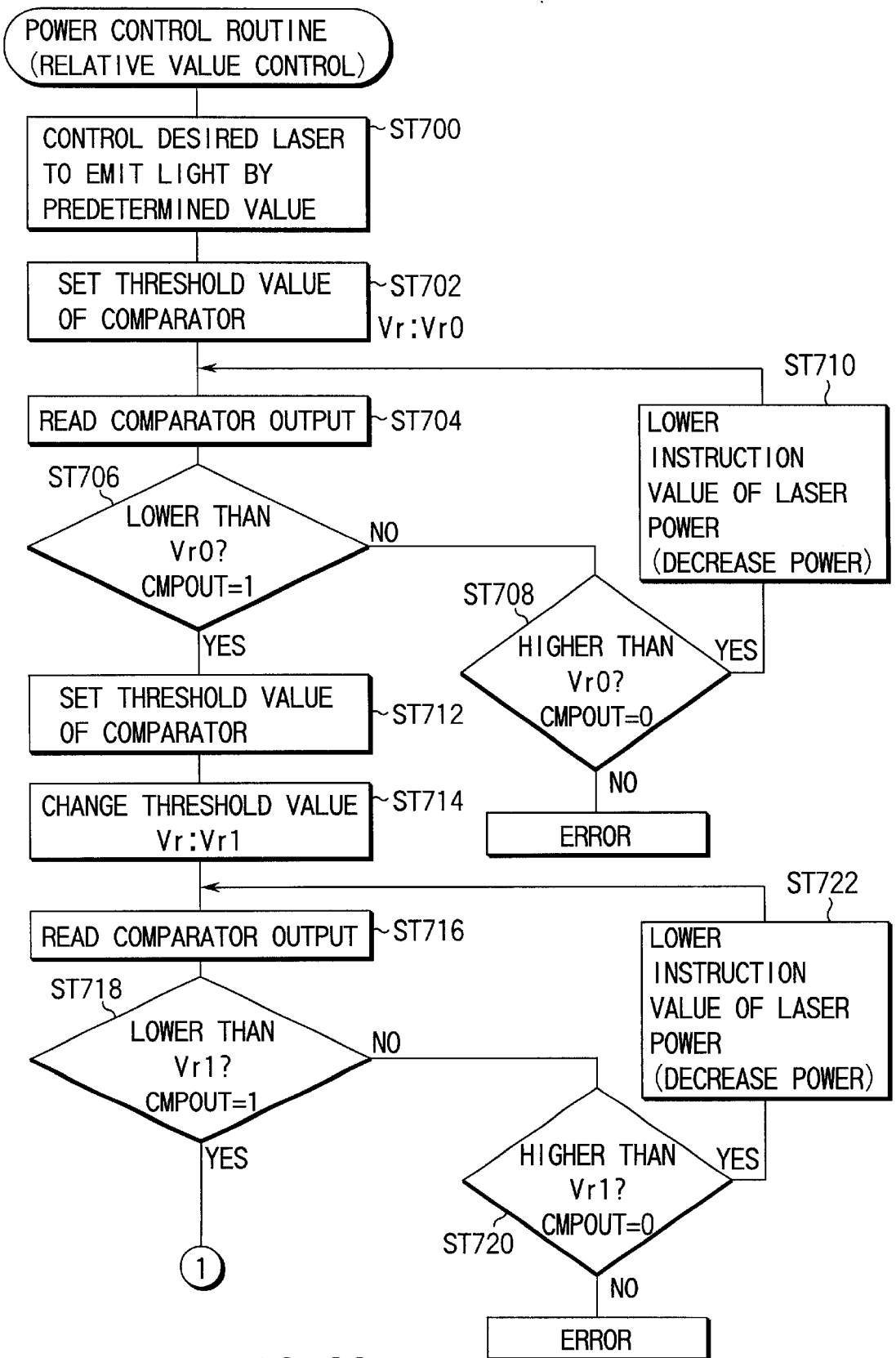
FIG. 29 is a flow chart for explaining a case wherein the laser power relative value control is implemented using the arrangement shown in FIGS. 5 and 9 (using the single comparator)
Figure 30:
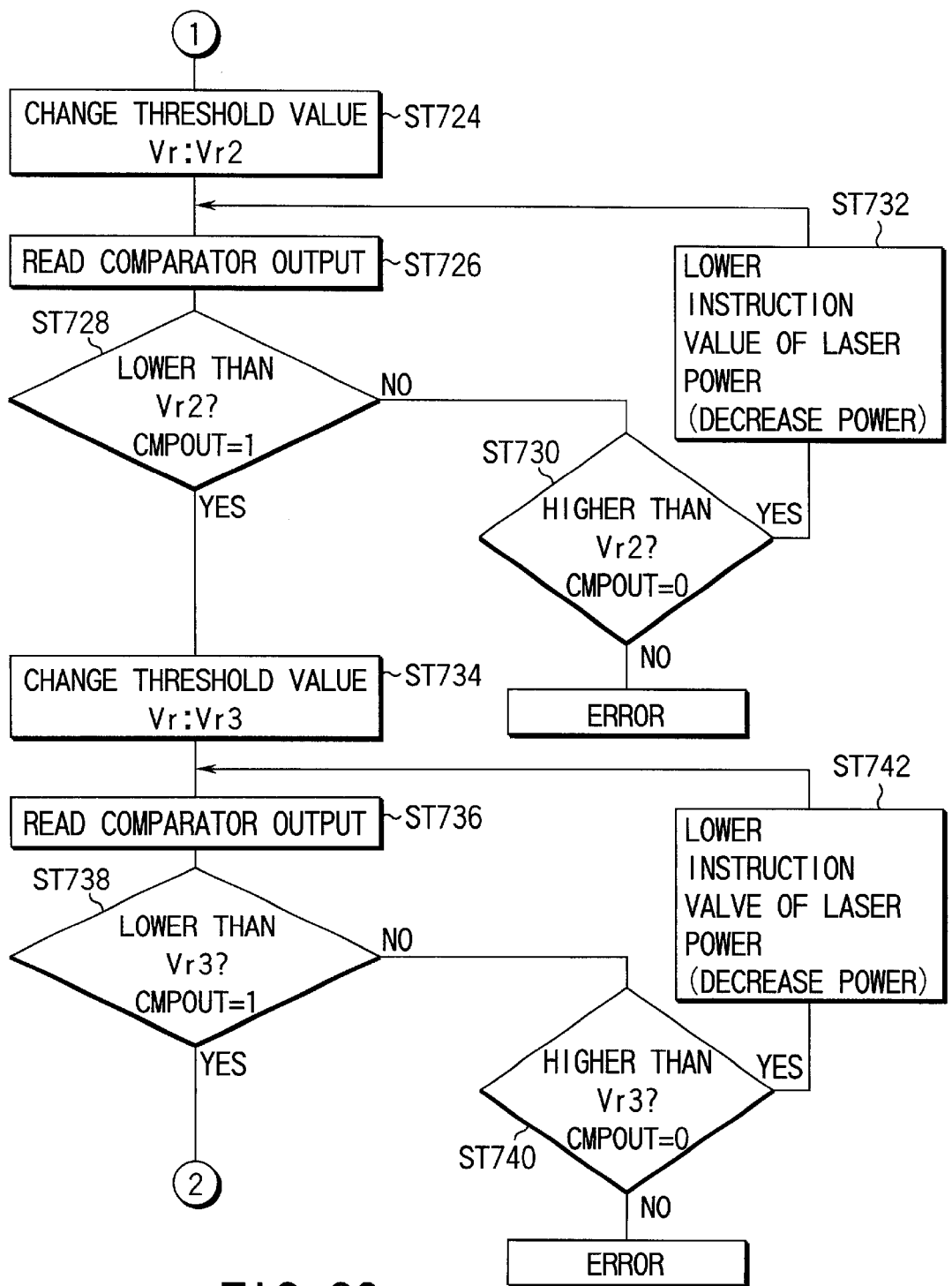
FIG. 30 is a flow chart for explaining the laser power relative value control continued from FIG. 29.
Figure 31:
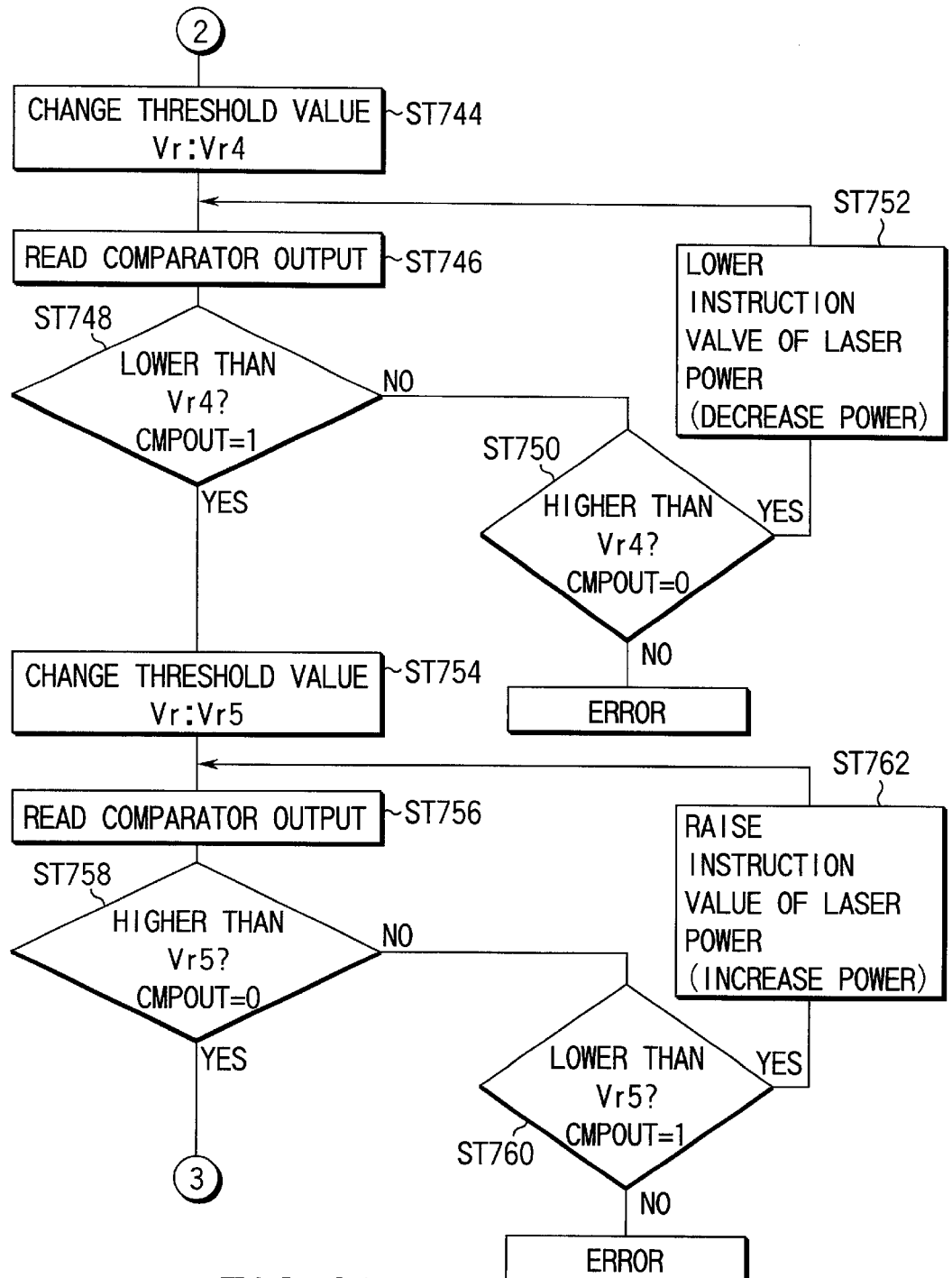
FIG. 31 is a flow chart for explaining the laser power relative value control continued from FIG. 30.
Figure 32:
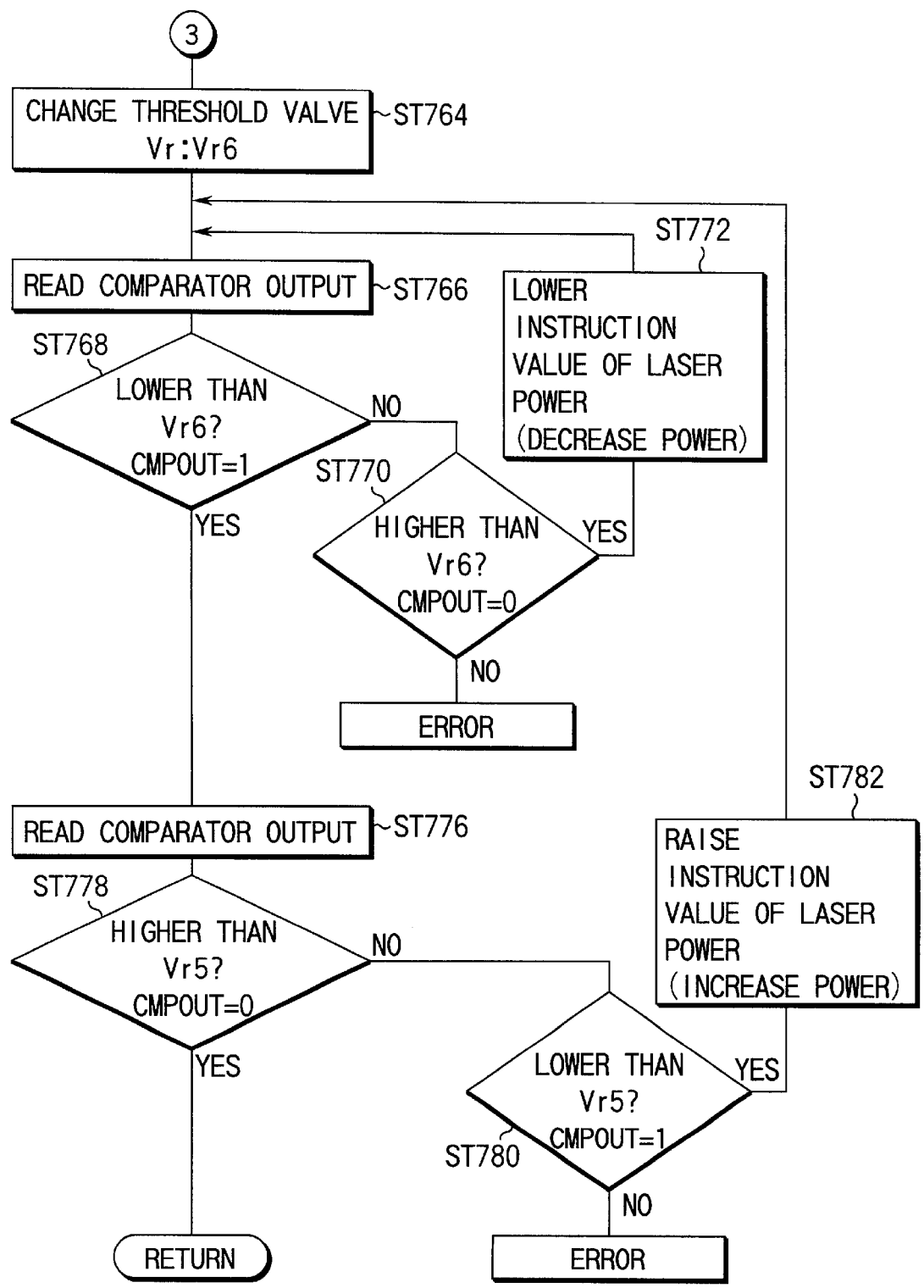
FIG. 32 is a flow chart for explaining the laser power relative value control continued from FIG. 31.

In some cases, the flow may immediately jump from step ST700 in FIG. 29 to step ST764 in FIG. 32 while skipping the processes shown in FIGS. 29 to 31, and the beam power relative value control of each laser may be completed by only the process shown in FIG. 32.

That is, the flow charts of the absolute value control shown in FIGS. 21 to 24 may have the same flow of the processes in the respective steps as that in the flow charts of the relative value control shown in FIGS. 29 to 32, but the actual processing contents (threshold value data, laser power increment/decrement, and the like) in the individual steps are not always the same.

When the processing contents of the laser power relative value control are set to be coarser than those in the absolute value contents, the processing time can be shortened accordingly.

Figure 33:
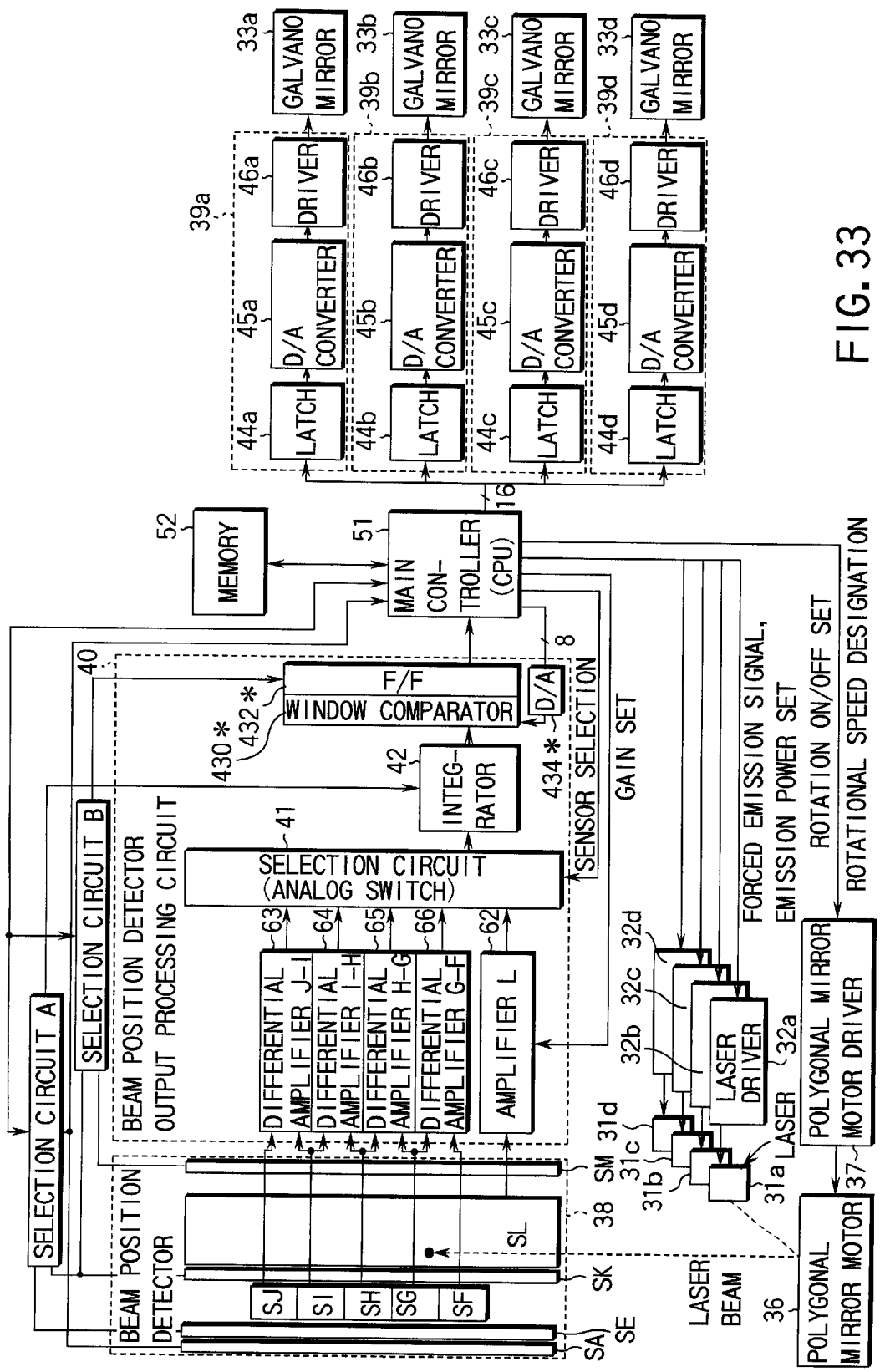
FIG. 33 is a circuit diagram showing details of blocks that pertain to multi-beam control (using a window comparator) in the block diagram shown in FIG. 4.

FIG. 33 is a circuit diagram showing details of blocks that pertain to multi-beam control (using a window comparator) in the block diagram shown in FIG. 4.

The arrangement shown in FIG. 33 can be used in, e.g., passage position control of laser beams in the same manner as the arrangement shown in FIG. 5. The same components as those in the arrangement shown in FIG. 5 will be briefly explained, and a characteristic feature of the arrangement shown in FIG. 33 will be mainly explained below.

Sensor patterns SA, SE, SK, and SM of beam detect sensor 380 that form beam position detector 38 output pulse signals when a laser beam has passed (crossed) them. Also, a plurality of sensor patterns SF to SJ output independent signals in accordance with the passage positions of laser beams. Furthermore, sensor pattern SL outputs a signal (analog) corresponding to the light amount (power) of each of four laser beams that have passed them.

Selection circuit 41 selects one of the input signals in accordance with a sensor select signal from main controller (CPU) 51, and supplies the selected signal to integrator 42. Integrator 42 integrates the signal selected by selection circuit 41.

The pulse signals respectively output from the photodiodes of sensor patterns SA, SE, and SK are input to selection circuit A. Selection circuit A selects one of the pulse signals from SA, SE, and SK, and supplies the selected signal to integrator 42. Integrator 42 is reset by the supplied pulse signal to start integration of the signal input from selection circuit 41.

That is, integrator 42 starts integration in accordance with the layout of sensor patterns (sensor light-receiving portions comprised of photodiodes) SA, SE, and SK of beam detect sensor 380 shown in FIG. 3, and the passage timings of a laser beam which has traversed them.

On the other hand, the pulse signals respectively output from the photodiodes of sensor patterns SK and SM are input to selection circuit B. Selection circuit B selects one of the pulse signals from SK and SM in accordance with a command from main controller 51, and supplies the selected signal to flip-flop circuit 432* (to be described later). Flip-flop circuit 432* is latched by the supplied pulse signal to make given operation.

That is, flip-flop circuit 432* makes flip-flop operation in accordance with the layout of sensor patterns (sensor light-receiving portions comprised of photodiodes) SK and SM of beam detect sensor 380 shown in FIG. 3, and the passage timings of a laser beam that has crossed them at a predetermined speed (as will be described later, this flip-flop operation is associated with A/D conversion of the present invention).

In this manner, integrator 42 is reset by the pulse signal from one of sensor patterns SA, SE, or SK when a laser beam has passed the beam detect sensor 380, thus starting integration. While a laser beam is passing the sensor patterns of beam detect sensor 380, integrator 42 integrates the signal indicating the passage position of the laser beam.

The integration result of integrator 42 undergoes an A/D process (the circuit arrangement and operations for this A/D process will be described later with reference to other drawings) substantially corresponding to an A/D conversion, without using a conventional A/D conversion device, by a circuit operation implemented by a loop of comparator 430*, flip-flop circuit 432*, main controller 51, and D/A converter 434*.

The A/D process including integration operation can convert the detection signal, which suffers less noise, and from which influences of any tilt of beam position detector 38 upon attachment are removed, into a digital signal.

Note that amplifiers 62 to 66, selection circuit 41, integrator 42, comparator 430*, flip-flop circuit 432*, and D/A converter 434* construct beam position detector output processing circuit 40.

In this manner, the beam position detection signal from beam position detector 38, which is converted into a digital signal, is input to main controller 51 as beam position information, and is used to check the passage positions, laser light amounts (power levels), and the like of the laser beams.

Since the subsequent arrangement for controlling galvano mirrors 33*a* to 33*d*, laser drivers 32*a* to 32*d,* polygonal mirror motor driver 37, and the like by main controller 31 is the same as that in FIG. 5, a description thereof will be omitted.

Figure 54:
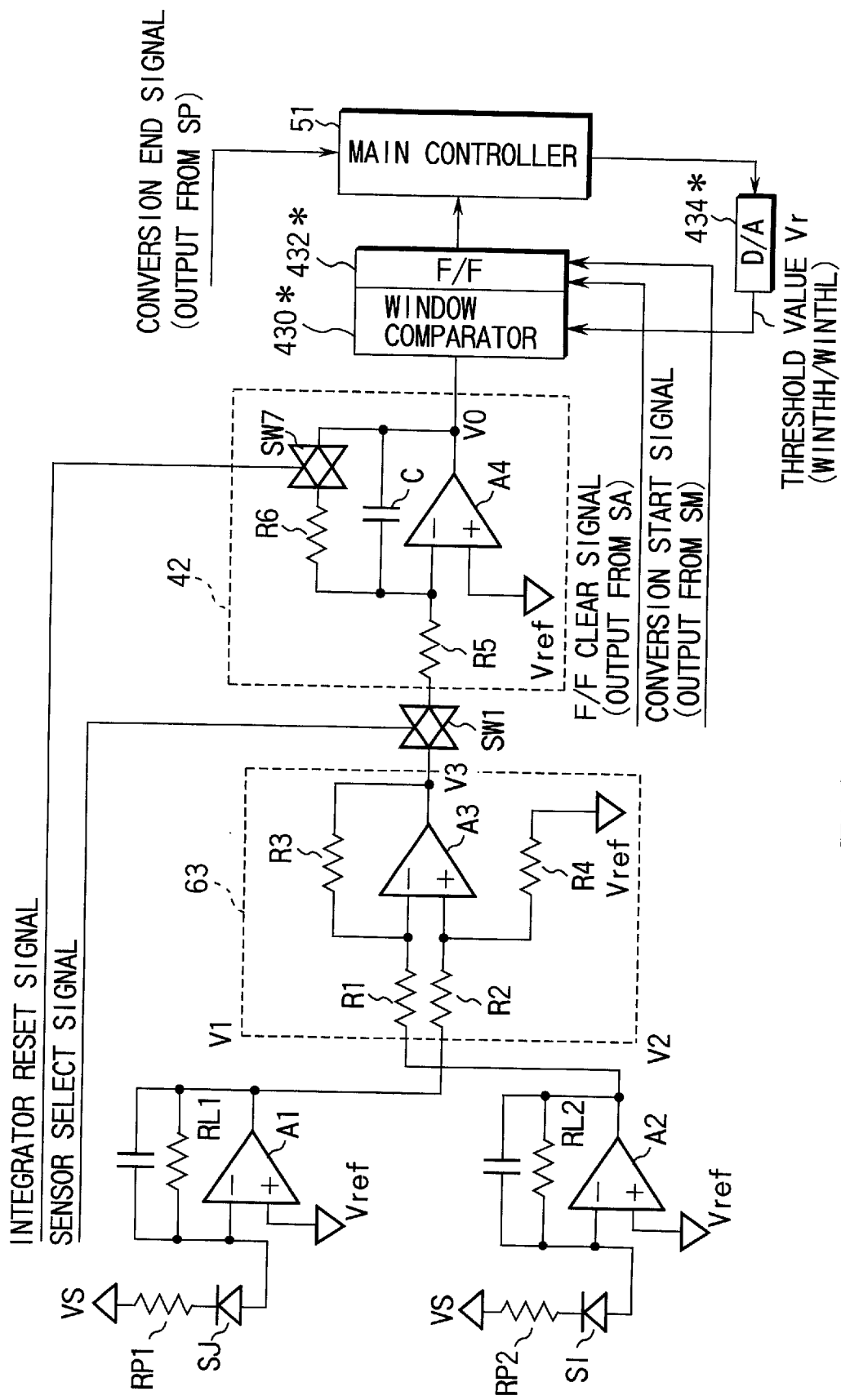
FIG. 54 is a circuit diagram for explaining the circuit arrangement from a sensor pattern for beam position detection to an integrator of the beam detect sensor in the beam position detector output processing circuit shown in FIG. 33.

FIG. 54 is a circuit diagram for explaining the circuit arrangement from the sensor patterns for beam position detection to the integrator of the beam detect sensor in the beam position detector output processing circuit shown in FIG. 33.

This arrangement is substantially the same as that in FIG. 6, except that FIG. 6 adopts single comparator 430 (CMP0) that uses single threshold value (comparison reference value) Vr, while FIG. 54 adopts window comparator 430* that uses two threshold values (a pair of comparison reference values) WINTHH/WINTHL.

Figure 34:
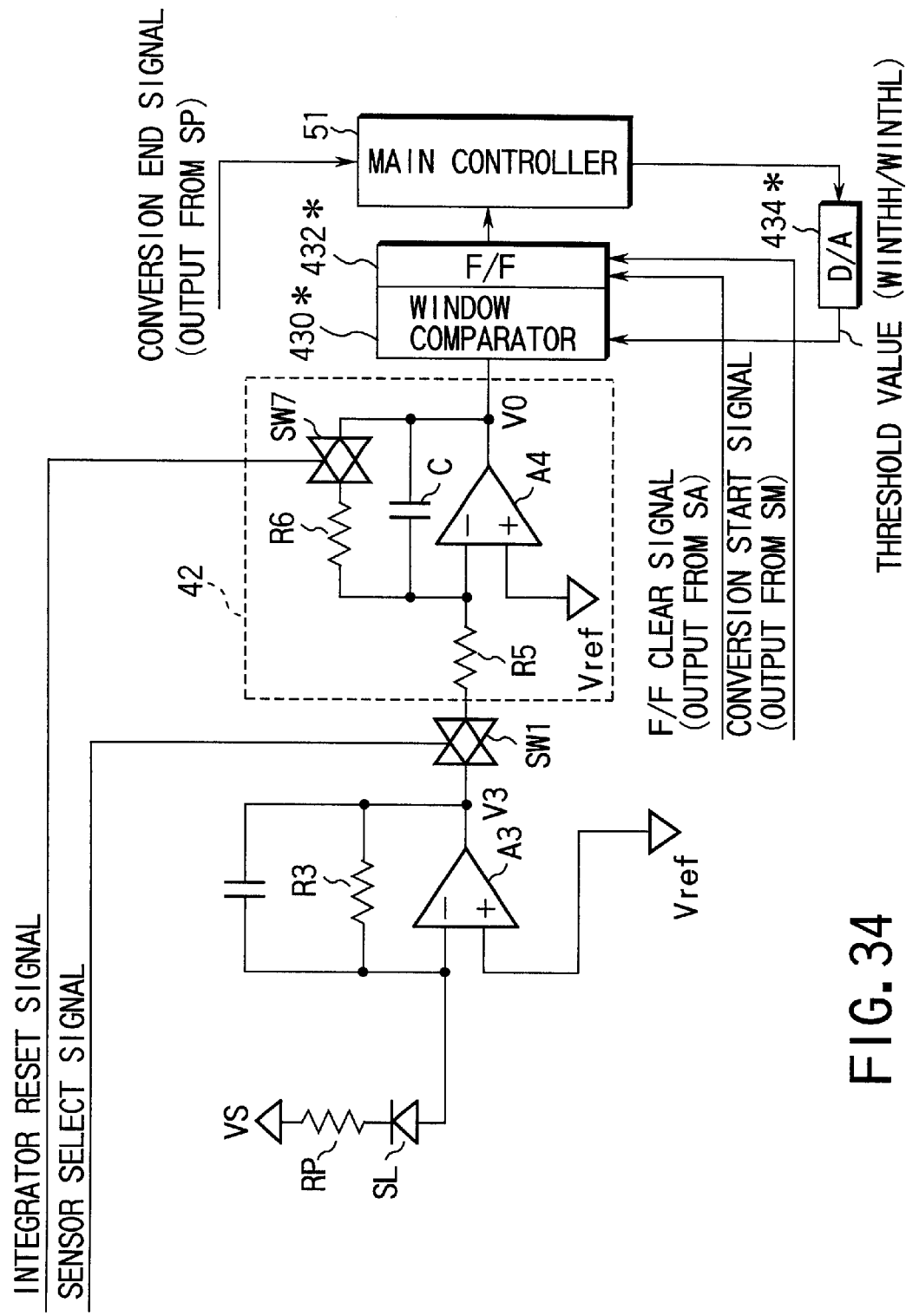
FIG. 34 is a circuit diagram for explaining the circuit arrangement from a sensor pattern for beam power detection to an integrator of a beam detect sensor in a beam position detector output processing circuit shown in FIG. 33.

FIG. 34 is a circuit diagram for explaining the circuit arrangement from the sensor patterns for beam power detection to the integrator of the beam detect sensor in the beam position detector output processing circuit shown in FIG. 33.

This arrangement is substantially the same as that in FIG. 8, except that FIG. 8 adopts single comparator 430 (CMP0) that uses single threshold value (comparison reference value) Vr, while FIG. 34 adopts window comparator 430* that uses two threshold values (a pair of comparison reference values) WINTHH/WINTHL.

FIG. 35 is a circuit diagram for explaining an analog-to-digital processor using the window comparator according to another embodiment of the present invention.

In the circuit arrangement of this embodiment, the integration output increases to the + side with respect to Vref when the beam scans on the sensor SJ side; it increases to the− side with respect to Vref when the beam scans on the sensor SI side.

Referring to FIG. 35, when the signal input to integration circuit 42 is the output from differential amplifier 63 in FIG. 33, the object to be integrated is analog voltages detected by the photodiodes of sensor patterns SJ and SI shown in FIGS. 3 or 33.

Likewise, when the signal input to integration circuit 42 is the output from differential amplifier 64, the object to be integrated is analog voltages detected by sensor patterns SI and SH. When the signal input to integration circuit 42 is the output from differential amplifier 65, the object to be integrated is analog voltages detected by sensor patterns SH and SG. Furthermore, when the signal input to integration circuit 42 is the output from differential amplifier 66, the object to be integrated is analog voltages detected by sensor patterns SG and SF.

On the other hand, when the signal input to operational amplifier A4 of integration circuit 42 is the output (not a differential output) from amplifier 62 in FIG. 33 or operational amplifier A3 in FIG. 34, integration output Vo from integration circuit 42 is an analog voltage that represents the laser light amount (power) detected by sensor pattern SL.

In this way, integration output Vo output from integration circuit 42 is an analog voltage corresponding to some (one or two) of the detection results of sensor patterns SF to SJ and SL.

The internal CPU of main controller 51 in FIGS. 33, 54, or 34 has a plurality of threshold value data in memory 52 in FIG. 33 (or its internal memory; not shown). These threshold value data are determined by experimentally computing correlation values between the actual beam positions on beam position detector 38 in FIG. 33 and corresponding integration outputs Vo. (These threshold value data are different from those computed for the single comparator shown in FIG. 9.)

These threshold value data correspond to VH1 to VH4 and VL1 to VL4 and to digital data (e.g., 8-bit hexadecimal values) representing these VH1 to VH4 and VL1 to VL4 in an example shown in FIG. 39 (to be described later). The CPU of main controller 51 is programmed to be able to sequentially read out these threshold value data at predetermined timings during the A/D process.

Integration circuit 42 shown in FIG. 35 corresponding to integrator 42 in FIGS. 33, 54, or 34 is temporarily reset by the integrator reset signal from selection circuit A in FIG. 33, and then integrates a signal input via selection circuit 41 in FIG. 33 or via analog switch SW1 in FIG. 54 at a time constant determined by the product of resistor R5 and capacitor C. With this integration, an analog voltage value from which pulse noise or high-frequency noise components are removed can be obtained.

Obtained integration output Vo (analog voltage value which is to undergo the A/D process) is supplied to window comparator (CMP1/CMP2) 430* shown in FIG. 35.

That is, window comparator 430* comprises a pair of comparators CMP1 and CMP2, and the integration result (Vo) from integrator 42 is supplied to one input (−) of comparator CMP1 and the other input (+) of comparator CMP2.

On the other hand, the other input (+) of comparator CMP1 receives comparison reference voltage WINTHH that determines a higher threshold value of window comparator 430*, and one input (−) of comparator CMP2 receives comparison reference voltage WINTHL that determines a lower threshold value of window comparator 430*.

The comparison reference voltages (WINTHH/WINTHL) that determine the higher and lower threshold values (i.e., the window range of the window comparator) of window comparator (CMP1/CMP2) 430* can be independently set by 8-bit D/A converters DA1 and DA2.

Upon receiving the comparison reference voltages (WINTHH/WINTHL), window comparator 430* outputs different comparison results (a pair of WUL and WLL) depending on whether integration output Vo falls within the window range of the window comparator, is higher than the range, or is lower than the range.

That is, as shown in FIG. 36, when integration output Vo is higher than the window (between WINTHH and WINTHL) of the window comparator, i.e., Vo>WINTHH, output level WUL of comparator CMP1 is "0", and output level WLL of comparator CMP2 is "1".

When the integration output falls within the window range of the window comparator, i.e., WINTHH>Vo>WINTHL, output level WUL of comparator CMP1 is "1", and output level WLL of comparator CMP2 is also "1".

When the integration output is lower than the window of the window comparator, i.e., Vo<WINTHL, output level WUL of comparator CMPl is "1", and output level WLL of comparator CMP2 is "0".

The operations of D/A converters DA1 and DA2 that output comparison reference voltages WINTHH and WINTHL of window comparator 430* can be arbitrarily set by a combination of DA select signals DASCO-0A and DASCL-0A from the CPU of main controller 51.

More specifically, as shown in FIG. 37, when DASCO-0A="1" and DASC1-0A="0" are input to selector 436 in FIG. 35, selector 436, outputs only a DAC1 select signal, which activates only D/A converter DA1. Then, DA1 samples data BMDA (the computation result by the internal CPU of main controller 51) from main controller 51 in response to the signal edge of data write pulse DAWR-0A, D/A-converts the sampled data, and supplies corresponding analog level WINTHH to comparator CMP1.

In this case, DA2 supplies WINTHL corresponding to "0" level (minimum level) to comparator CMP2. In this state, since one (WINTHL) of the window levels shifts to the minimum level, window comparator 430* serves as a single comparator using only comparator CMP1.

When DASCO-0A="0" and DASC1-0A="1" are input to selector 436, selector 436 outputs only a DAC2 select signal, which activates only D/A converter DA2. Then, DA2 samples data BMDA (the computation result by the internal CPU of main controller 51) from main controller 51 in response to the signal edge of data write pulse DAWR-0A, D/A-converts the sampled data, and supplies corresponding analog level WINTHL to comparator CMP2.

In this case, DA1 supplies WINTHH corresponding to "1" level (maximum level) to comparator CMP1. In this state, since one (WINTHH) of the window levels shifts to the maximum level, window comparator 430* serves as a single comparator using only comparator CMP2.

When DASCO-0A="0" and DASC1-0A="0" are input to selector 436, selector 436 outputs DAC1 and DAC2 select signals, which activate both D/A converters DA1 and DA2. Then, DA1 samples data BMDA (the computation result by the internal CPU of main controller 51) from main controller 51 in response to the signal edge of data write pulse DAWR-0A, D/A-converts the sampled data, and supplies corresponding WINTHH to comparator CMP1, while DA2 samples another data BMDA (the computation result by the internal CPU of main controller 51) from main controller 51 in response to the signal edge of data write pulse DAWR-0A, D/A-converts the sampled data, and supplies corresponding WINTHL to comparator CMP2.

In this case, window comparator 430* can serve as a window comparator having the window range defined by two threshold values (WINTHH/WINTHL in FIG. 38).

The width of this window (the range from WINTHH to WINTHL) can be arbitrarily changed by the value of first data BMDA sampled by D/A converter DA1, and the value of second data BMDA sampled by D/A converter DA2.

Figure 45:
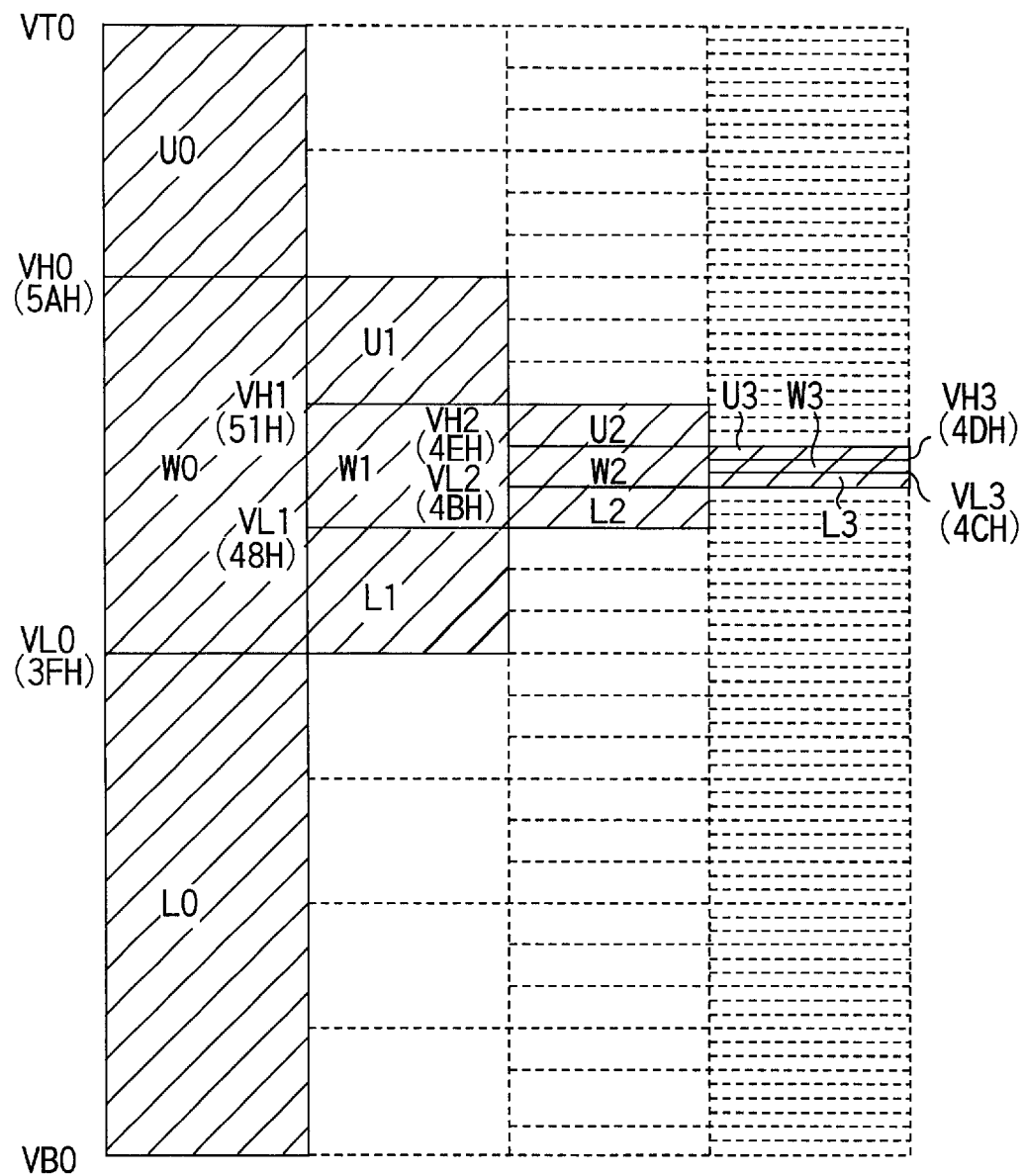
FIG. 45 is a view showing changes in threshold value of the window comparator when the laser power is controlled to a value (within the range from PL3 $\mu$W to PH3 $\mu$W) corresponding to threshold values VH3/VL3 shown in FIG. 44.

For example, as shown in FIG. 45, when higher VH0 of the window is designated by first data BMDA=5AH, and lower VL0 of the window is designated by 3FH of second data BMDA=3FH, window comparator 430* has a large window of the maximum range from VH0 to VL0.

On the other hand, if higher VH3 of the window is designated by first data BMDA=4DH, and lower VL3 of the window is designated by second data BMDA=4CH, window comparator 430* has a small window of the minimum range from VH3 to VL3.

When the window range of the window comparator is set in correspondence with ranges U0/L0 to U6/L6 to which threshold values Vr0 to Vr6 shown in FIG. 20 belong, window comparator 430* in FIG. 35 can perform laser power detection as in single comparator 430 in FIG. 9.

The window range of the window comparator for laser power detection is selected by DASCO-0A="0" and DASC1-0A="0".

The CPU of main controller 51 in FIGS. 33, 54, or 34 initially supplies digital data (BMDA) that tentatively designates predetermined initial comparison reference values (initial higher threshold value WINTHH of comparator CMP1 and initial lower threshold value WINTHL of comparator CMP2) to D/A converters DA1 and DA2 of DAC circuit 434*.

Figure 39:
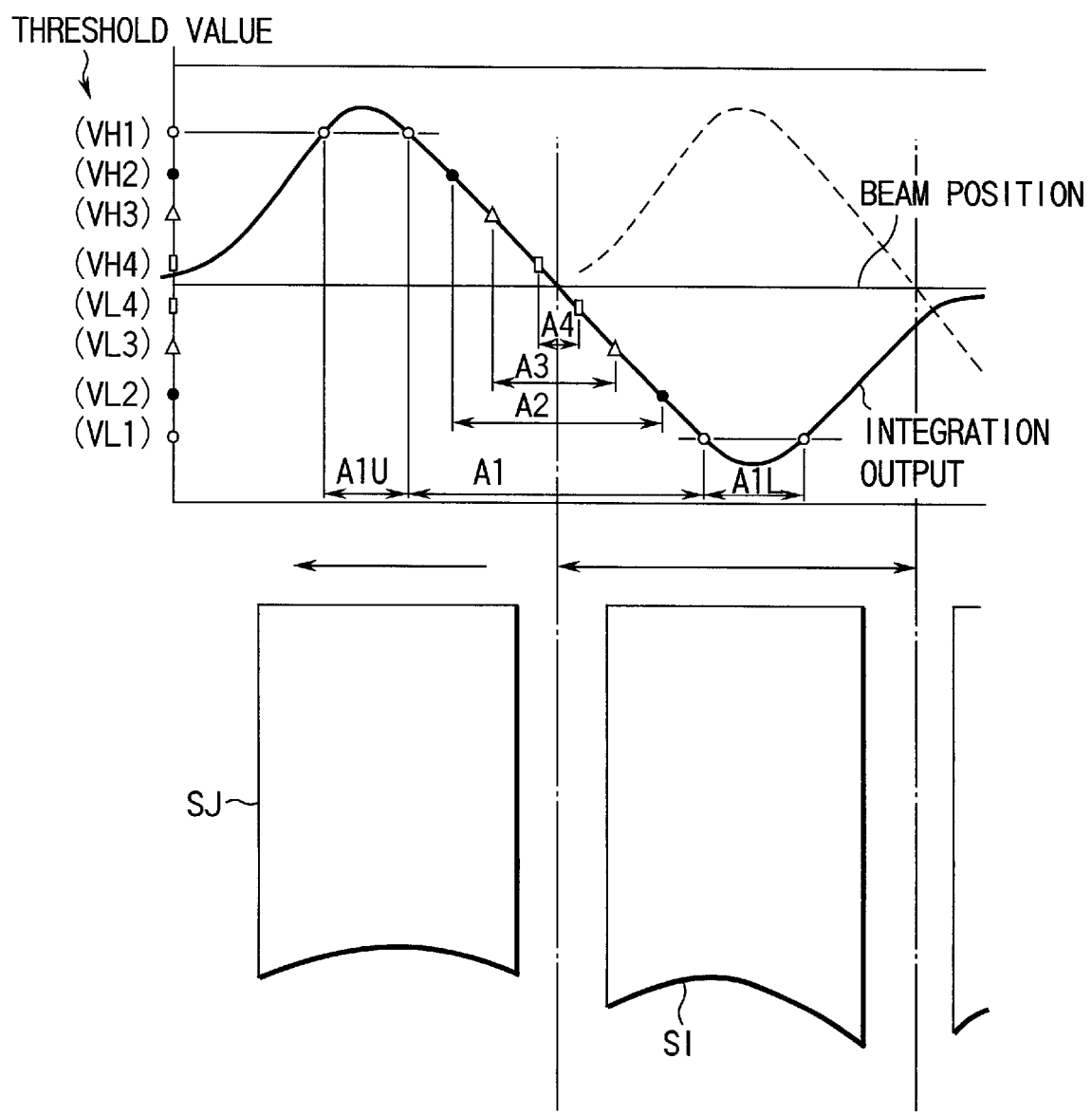
FIG. 39 is a view for explaining the relationship among the position of a laser beam that passes the sensor pattern shown in FIG. 3, the corresponding integration output, and the threshold values of the window comparator shown in FIG. 35.

As such tentative comparison reference values (initial higher and lower window threshold values) WINTHH and WINTHL, for example, VH1 (higher threshold value) and VL1 (lower threshold value) shown in FIG. 39 can be used (the window of window comparator 430* is broad). Digital data BMDA with values corresponding to these WINTHH and WINTHL are supplied from the CPU of main controller 51.

Comparator CMP1 of window comparator 430* compares WINTHH=VH1 with integration output Vo, and supplies comparison result WUL of "0" level to the D input terminal of D-flip-flop FF1 of flip-flop circuit 432* if Vo>WINTHH.

In this case, since VH1>VL1 and Vo>WINTHL, comparator CMP2 of window comparator 430* supplies comparison result WLL of "1" level to the D input terminal of D-flip-flop FF2 of flip-flop circuit 432*.

FF1 and FF2 are initially cleared by the signal edge from sensor SA in FIG. 33, are latched by the signal edge from sensor SK or SM that appears immediately after the signal edge from sensor SA, and store WUL="0" and WLL="1" (these storage contents are held after a given laser beam has passed the sensor patterns of detector 38 until the next laser beam reaches them).

The levels of WUL="0" and WLL="1" stored in FF1 and FF2 are respectively inverted by inverters INV1 and INV2, and the inverted data are returned as outputs (digital bits) D432H="1" and D432L="0" to the CPU of main controller 51. At this time, the width (higher and lower threshold values) of window comparator 430* remains the same, and comparison with integration output Vo, the level of which changes along with an elapse of time, using the threshold values at that time repeats itself.

On the other hand, if Vo<WINTHL, comparator CMP2 supplies comparison result WLL of "0" level to the D input terminal of FF2. In this case, since VH1>VL1 and Vo<WINTHH, comparator CMP1 supplies comparison result WUL of "1" level to the D input terminal of FF1.

FF1 and FF2 are initially cleared by the signal edge from sensor SA, are latched by the signal edge from sensor SK or SM that appears immediately after the signal edge from sensor SA, and store WUL="1" and WLL="0" (these storage contents are held after a given laser beam has passed the sensor patterns of detector 38 until the next laser beam reaches them).

The levels of WUL="1" and WLL="0" stored in FF1 and FF2 are respectively inverted by inverters INV1 and INV2, and the inverted data are returned as outputs D432H="0" and D432L="1" to the CPU of main controller 51. At this time, the width (higher and lower threshold values) of window comparator 430* remains the same, and comparison with integration output Vo, the level of which changes along with an elapse of time, using the threshold values at that time repeats itself.

As a result of the repetitive comparisons, if WINTHH>Vo>WINTHL, comparator CMP1 supplies comparison result WUL of "1" level to the D input terminal of FF1, and comparator CMP2 supplies comparison result WLL of "1" level to the D input terminal of FF2 at the same time.

FF1 and FF2 are initially cleared by the signal edge from sensor SA, are latched by the signal edge from sensor SK or SM that appears immediately after the signal edge from sensor SA, and store WUL="1" and WLL="1" (these storage contents are held after a given laser beam has passed the sensor patterns of detector 38 until the next laser beam reaches them).

The levels of WUL="1" and WLL="1" stored in FF1 and FF2 are respectively inverted by inverters INV1 and INV2, and the inverted data are returned as outputs D432H="0" and D432L="0" to the CPU of main controller 51. The CPU determines based on D432H="0" and D432L="0" that integration output Vo falls within the window range (VH1 to VL1 in FIG. 39) of window comparator 430* at that time.

The CPU of main controller 51 generates new threshold value data BMDA on the basis of D432H="0" and D432L= "0" (data representing the comparison results in window comparator 430*; data indicating that integration output Vo falls within the window range of window comparator 430*).

For example, the CPU generates data BMDA corresponding threshold values VH2 and VL2 in FIG. 39, and supplies the data to D/A converters DA1 and DA2 of DAC circuit 434*.

Upon receiving DAC1 select signal from the CPU, D/A converter DA1 D/A-converts data BMDA corresponding to VH2 and feeds back new comparison reference value WINTHH (higher threshold value of the window comparator) to comparator CMP1.

Likewise, upon receiving DAC2 select signal from the CPU, D/A converter DA2 D/A-converts data BMDA corresponding to VL2 and feeds back new comparison reference value WINTHL (lower threshold value of the window comparator) to comparator CMP2.

In this manner, the window of window comparator 430* becomes narrower (VH2 to VL2) than the previous one (VH1 to VL1). The CPU of main controller 51 waits until integration output Vo that yields D432H="0" and D432L= "0" is obtained using the narrower window.

When D432H="0" and D432L="0" are obtained using the narrower window, the CPU sets new threshold values (VH3/VL3 in FIG. 39) and feeds back corresponding comparison reference values WINTHH/WINTHL to window comparator 430*.

The CPU repeats the aforementioned operation until D432H="0" and D432L="0" are obtained using the final threshold values (VH4/VL4 in FIG. 39).

When D432H="0" and D432L="0" are obtained using the final threshold values (VH4/VL4 in FIG. 39), the CPU can determine that integration output Vo at that time has fallen within target area A4 in FIG. 39 (i.e., a given laser beam passed a position between sensor patterns SJ and SI), and can complete beam position control for that laser beam. The beam position control for another laser beam can be similarly done using the window comparator shown in FIG. 35.

Digital value BMDA (4DH and 4CH in the example of FIG. 45) corresponding to comparison reference values WINTHH/WINTHL (threshold values of comparators CMP1/CMP2) of the window comparator obtained in this manner become digital values (i.e., A/D conversion results) corresponding to analog integration output Vo input to window comparator 430*.

From another point of view, the feature of the circuit operation in FIG. 35 is also "a digital feedback loop that controls data BMDA corresponding to comparison reference values (threshold values) WINTHH/WINTHL to yield WINTHH>Vo>WINTHL (or WINTHH≈Vo≈WINTHL) upon receiving analog input Vo".

The convergence target of this feedback loop is an analog value of integration output Vo, and digital values (BMDA or equivalent) corresponding to threshold values WINTHH/WINTHL when the loop converges to WINTHH≈Vo≈WINTHL become A/D process outputs for analog input Vo.

In laser beam position control or beam amount (power) control (to be described later), comparison results WUL/WLL (or D432H/D432L) obtained before the digital values converge to values corresponding to integration output Vo are used, and in such control operation state, the arrangement shown in FIG. 35 cannot be said to be identical to a conventional A/D converter in an ordinary sense in terms of functions.

When window comparator 430* in FIG. 35 makes the first comparison, data BMDA that set a broad window of the window comparator are selected so that actual integration output Vo can immediately fall within the window range of the window comparator. However, in such case, the number of times of processing of the WINTHH/WINTHL feedback loop becomes relatively large until the final A/D process results are obtained.

However, once digital data BMDA of comparison reference values WINTHH/WINTHL corresponding to integration output Vo are obtained, the CPU of main controller 51 stores those data. Since the difference between integration output Vo that has changed slightly after the first A/D process, and digital data BMDA corresponding to already stored comparison reference values WINTHH/WINTHL is small from the beginning in the second and subsequent A/D processes, the number of repetition of feedback loop until the second or subsequent A/D process results are obtained finally may be reduced. This means that the second and subsequent ones of A/D processes which are repeated can be done at substantially higher speed.

In this connection, in the circuit arrangement shown in FIG. 35, since the circuit operation of the A/D process is done by comparators CMP1/CMP2, flip-flops FF1/FF2, and inverters INV1/INV2, and these devices are inexpensive and allow high-speed operations (on the several ten nanosecond order even if they are slowest), the A/D process of the circuit shown in FIG. 35 can sufficiently follow the high-speed print process.

FIG. 39 is a view for explaining the relationship among the position of a laser beam which passes detector 38 in FIG. 33 or sensor 380 in FIG. 33, the corresponding integration output, and the threshold values of the window comparator shown in FIG. 35.

Referring to FIG. 39, the right-and-left direction agrees with the up-and-down direction (sub-scan direction) of the sensor, and a laser beam scans in the vertical direction on the page of FIG. 39.

When a beam passes exactly the middle position of sensor patterns SJ and SI (within the narrowest window range of window comparator 430*), integration output Vo corresponding to the difference between the outputs from sensor patterns SJ and SI becomes zero, as shown in FIG. 39. When the beam passage position relatively deviates from this middle position toward the sensor pattern SI side, integration output Vo changes to decrease; when the beam passage position relatively deviates from the middle position toward the sensor pattern SJ side, integration output Vo changes to increase.

That is, integration output Vo of sensor patterns SJ and SI changes depending on a change in beam position. This change similarly takes place for other pairs of sensor patterns SF to SI. Therefore, when a change in voltage of integration output Vo is detected, a change in beam passage position relative to sensor patterns SF to SJ can be detected.

Assume that the window of window comparator 430*, the range of which changes, is represented by four pairs of window threshold values VH1/VL1 to VH4/VL4. In this case, the beam passage position can be estimated by detecting the narrowest one, which includes Vo, of the four windows, the ranges of which become gradually smaller in the order of threshold value pairs VH1/VL1 to VH4/VL4.

For example, in the circuit arrangement shown in FIG. 35, if data BMDA of the comparison reference values (a pair of threshold values WINTHH/WINTHL of window comparator 430*) obtained upon completion of the A/D process correspond to VH4/VL4 in FIG. 39, the CPU of main controller 51 can detect that a laser beam may have passed the intermediate position (area A4 in FIG. 39) between sensor patterns SI and SJ.

The beam passage position control (beam position control in the sub-scan direction) using window comparator 430* in FIG. 35 will be explained below using FIGS. 40 to 43.

Figure 40:
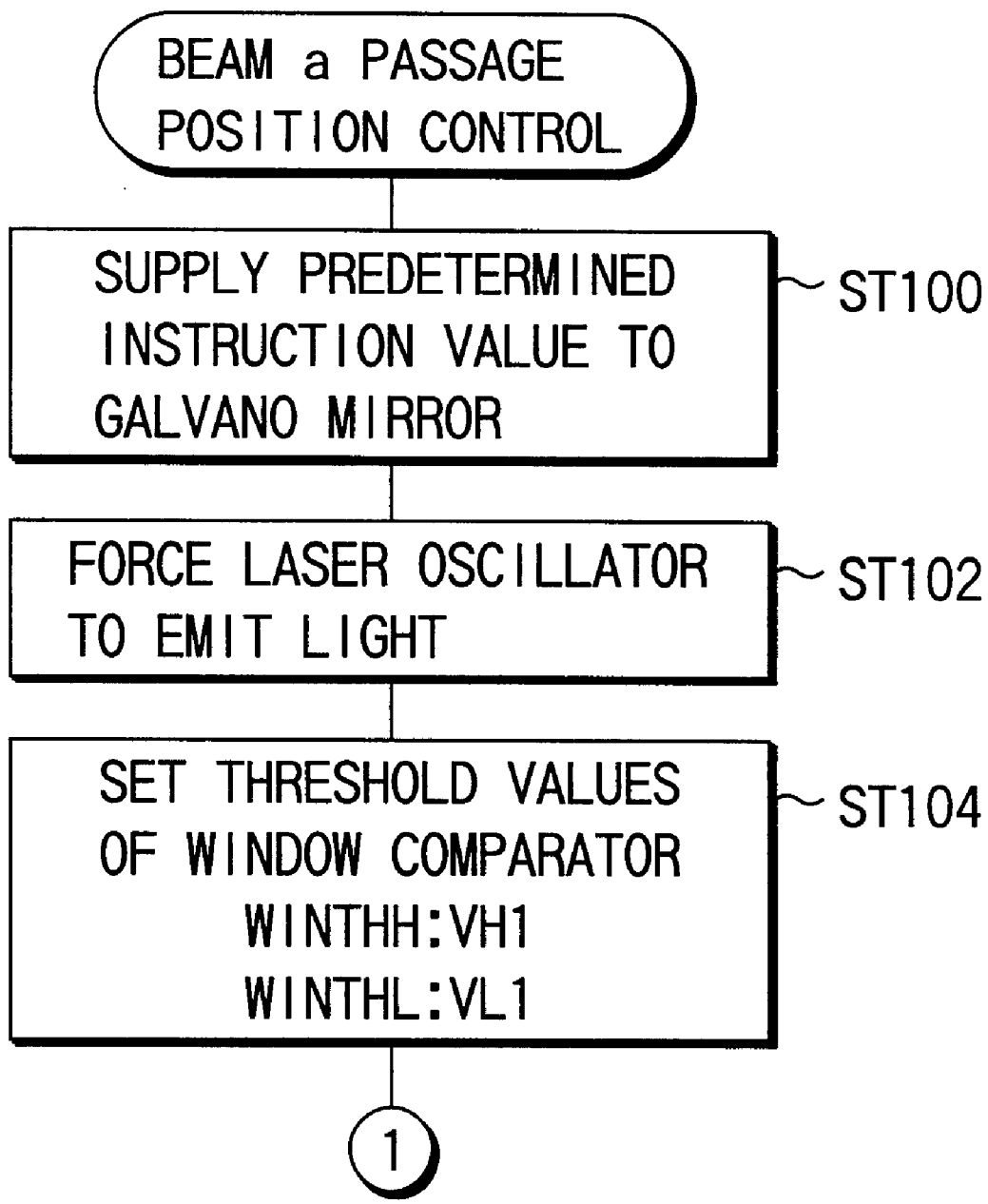
FIG. 40 is a flow chart for explaining a case wherein the passage position control of one (beam a) of multi-beams is implemented using the arrangement shown in FIGS. 33 and 35 (using the window comparator)

Referring to FIG. 40, the CPU supplies an instruction value to galvano mirror 33a so that specific laser beam a (a laser beam coming from first laser 31a) passes the upper side (near area A1U on the sensor pattern SJ side in FIG. 39) on the surface of detector 38 in FIG. 33 (sensor 380 in FIG. 3) (step ST100).

Then, the CPU issues an instruction to polygonal mirror motor driver 37 in FIG. 33 to start polygon mirror motor 36, thus rotating polygonal mirror 35 at a predetermined rotational speed.

When polygonal mirror 35 has reached a predetermined high rotational speed, the CPU controls the laser oscillator for beam a (first laser 31a) to forcibly emit light with predetermined power (step ST102; this step is the same as step ST402 in FIG. 14). Beam a is emitted toward the polygonal mirror 35 side. In this manner, laser beam a with predetermined power passes beam position detector 38 (sensor 380 in FIG. 3) and photosensitive drum 15 in FIG. 2 at a predetermined velocity.

Subsequently, in the process shown in FIG. 41, the CPU supplies predetermined data BMDA (e.g., B3H (hex)) to DAC circuit 434* in FIG. 35 to set comparison reference values WINTHH/WINTHL (a pair of threshold values of the window comparator, which define the window range) of window comparator 430* as follows (step ST104).

$$WINTHH \rightarrow VH1(V)=B2H$$
$$WINTHL \rightarrow VL1(V)=4CH$$

If VH1/VL1 correspond to those in FIG. 39, the window of window comparator 430* at that time has a large width that can cover from one peak to another (from area A1U to area A1L) of a change in integration output Vo.

However, the first instruction value in step ST100 instructs laser beam a to pass near the end portion (near area A1U in FIG. 39) of the window range of window comparator 430*.

The comparison results (WUL/WLL) obtained from window comparator 430* in FIG. 35 at that time have contents corresponding to, e.g., Vo>WINTHH in FIG. 36.

The CPU of main controller 51 in FIG. 33 can detect, based on the outputs (digital bits D432H/D432L) from flip-flop circuit 432* corresponding to the comparison results (WUL/WLL) obtained when Vo>WINTHH, that laser beam a passes near the end portion (above sensor SJ) of the window range of window comparator 430*.

Figure 41:
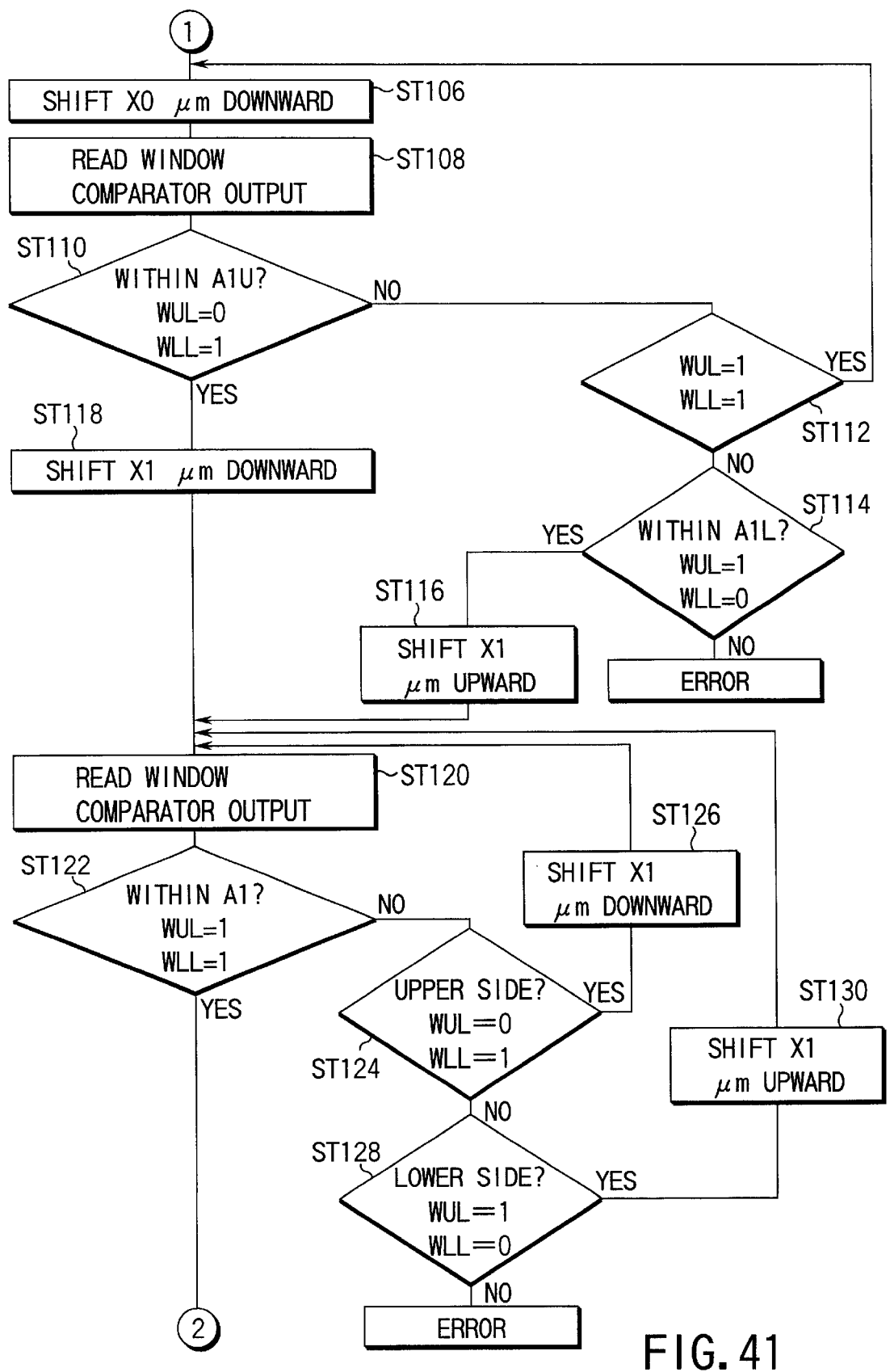
FIG. 41 is a flow chart for explaining the beam passage position control continued from FIG. 40.

In the process shown in FIG. 41, since it is detected that laser beam a passed near the end portion (above sensor SJ) of the window range of window comparator 430*, the CPU slightly moves galvano mirror 33a to shift the passage position of beam a on sensor 380 X0 ($\mu$m) downward (toward sensor pattern SI) (step ST106).

This X0 is one step moving amount of galvano mirror 33a, which is set to be a vary small amount that does not make mirror 33a jump over area A1U in FIG. 39. More specifically, X0 is set to be a value smaller than the width of A1U, e.g., around 30 $\mu$m.

The CPU then reads the outputs (D432H/D432L corresponding to WUL/WLL) from window comparator 430* (step ST108).

Note that the CPU of main controller 51 fetches outputs D432H/D432L from flip-flop circuit 432* in practice. However, since these outputs have one-to-one correspondence with comparison results WUL/WLL of window comparator 430* (although logic levels are inverted), the following explanation will be given using comparison results WUL/WLL of window comparator 430*.

If the comparison results of window comparator 430* are WUL="1"/WLL="1" or WUL="1"/WLL="0" which indicate that laser beam a falls outside area A1U (higher side of the set window range) (NO in step ST110), the CPU checks if WUL="1"/WLL="1" which indicate that laser beam a has passed within the set window range (step ST112).

If WUL="1"/WLL="1" which indicate that laser beam a has passed within the set window range (YES in step ST112), the flow returns to step ST106 to control galvano mirror 33a to further shift the passage position of laser beam a X0≈30 $\mu$m downward.

If it is determined in step ST112 that laser beam a has not passed within the window range (not WUL="1"/WLL="1") (NO in step ST112), and it is also determined that laser beam a has not passed the lower side of the set window range (not WUL="1"/WLL="0") (NO in step ST114), since these results conflict with the checking result (not WUL="0"/WLL="1") in step ST110, an error occurs, thus ending or interrupting the process in FIG. 41.

If it is determined in step S114 that laser beam a has passed the lower side of the set window range (WUL="1"/WLL="0") (YES in step ST114), the CPU controls galvano mirror 33a to shift the current passage position of laser beam a X1≈10 $\mu$m upward (step ST116).

On the other hand, if it is determined in step ST110 that laser beam a has passed the upper side of the set window range (WUL="0"/WLL="1") (YES in step ST110), the CPU controls galvano mirror 33a to shift the current passage position of laser beam a X1≈10 µm downward (step ST118).

When the window range (WINTHH/WINTHL) of window comparator 430* is set as described above, and the process (steps ST106 to ST118) shown in FIG. 41 repeats itself, laser beam a can be controlled to pass within area A1U (or area A1L) in FIG. 39.

The CPU then reads the output (data corresponding to WUL/WLL) from window comparator 430* (step ST120).

At this time, the threshold values of window comparator 430* have not been changed, and are:

$$WINTHH \rightarrow VH1(V)=B2H$$

$$WINTHL \rightarrow VL1(V)=4CH$$

Window comparator 430* executes comparison with integration output Vo corresponding to the passage position of laser beam a using threshold values VH1/VL1.

If the comparison results of window comparator 430* are WUL="0"/WLL="1", WUL="1"/WLL="0", or WUL="0"/WLL="0" which indicate that laser beam falls outside area A1 (outside the set window range) (NO in step ST112), the CPU checks the passage position of laser beam a outside the set window range (step ST124, ST128).

More specifically, if the comparison results are WUL="0"/WLL="1" which indicate that laser beam a has passed the upper side of the set window (YES in step ST124), the CPU controls galvano mirror 33a to further shift the passage position of laser beam a X1≈10 µm downward (step ST126).

If it is determined in step ST124 that laser beam a has not passed the upper side of the window (not WUL="0"/WLL="1") (NO in step ST124), and it is also determined that laser beam a has not passed the lower side of the set window (not WUL="1"/WLL="0") (NO in step ST128), since these results conflict with the checking result (not WUL="1"/WLL="1") in step ST122, an error is detected, thus ending or interrupting the process in FIG. 41.

If it is determined in step S128 that laser beam a has passed the lower side of the set window range (WUL="1"/WLL="0") (YES in step ST128), the CPU controls galvano mirror 33a to shift the current passage position of laser beam a X1≈10 µm upward (step ST130).

When the window range (WINTHH/WINTHL) of window comparator 430* is set as described above, and the process (steps ST120 to ST130) shown in FIG. 41 repeats itself, laser beam a can be controlled to pass within area A1 in FIG. 39.

Note that the relationship between the laser beam passage area and the window comparator output is:

within A1U: [WUL, WLL]=[0, 1]

within A1L: [WUL, WLL]=[1, 0]

within A1: [WUL, WLL]=[1, 1]

outside A1, A1U, A1L: [WUL, WLL]=[1, 1]

The aforementioned operation can be summarized as follows.

That is, if it is determined in the process in steps ST106 to ST114 in FIG. 41 that the beam passage position falls within area A1U (YES in step ST110), the CPU supplies an instruction value to galvano mirror 33a to shift beam a X1 (µm) downward (ST118), and the control then advances to step ST120.

On the other hand, if the beam passage position falls within area A1L (YES in step ST114), the CPU supplies an instruction value to galvano mirror 33a to shift beam a X1 (µm) upward (ST118), and the control then advances to step ST120.

Note that unit shift amount X1 is selected to be a value smaller than area A1 in FIG. 39. In this example, X1≈10 µm.

On the other hand, if the beam passage position is other than those described above (within A1 or outside A1, A1U, or A1L) (NO in step ST110; NO in step ST112), the CPU supplies an instruction value to galvano mirror 33a to further shift the current passage position of beam a X0 (µm) downward. The above operation repeats itself until the beam can pass within A1U or A1L.

In this connection, the CPU can detect such case, i.e., the beam passage position which falls within none of A1U, A1L, and A1, and falls outside none of A1, A1U, and A1L (i.e., an impossible beam passage state), on the basis of the output [WUL="0", WLL="0"] from window comparator 430* or the output [D432H="1", D432L="1"] from flip-flop circuit 432*. In this case, the CPU sets an error flag and interrupts or stops the control.

Figure 42:
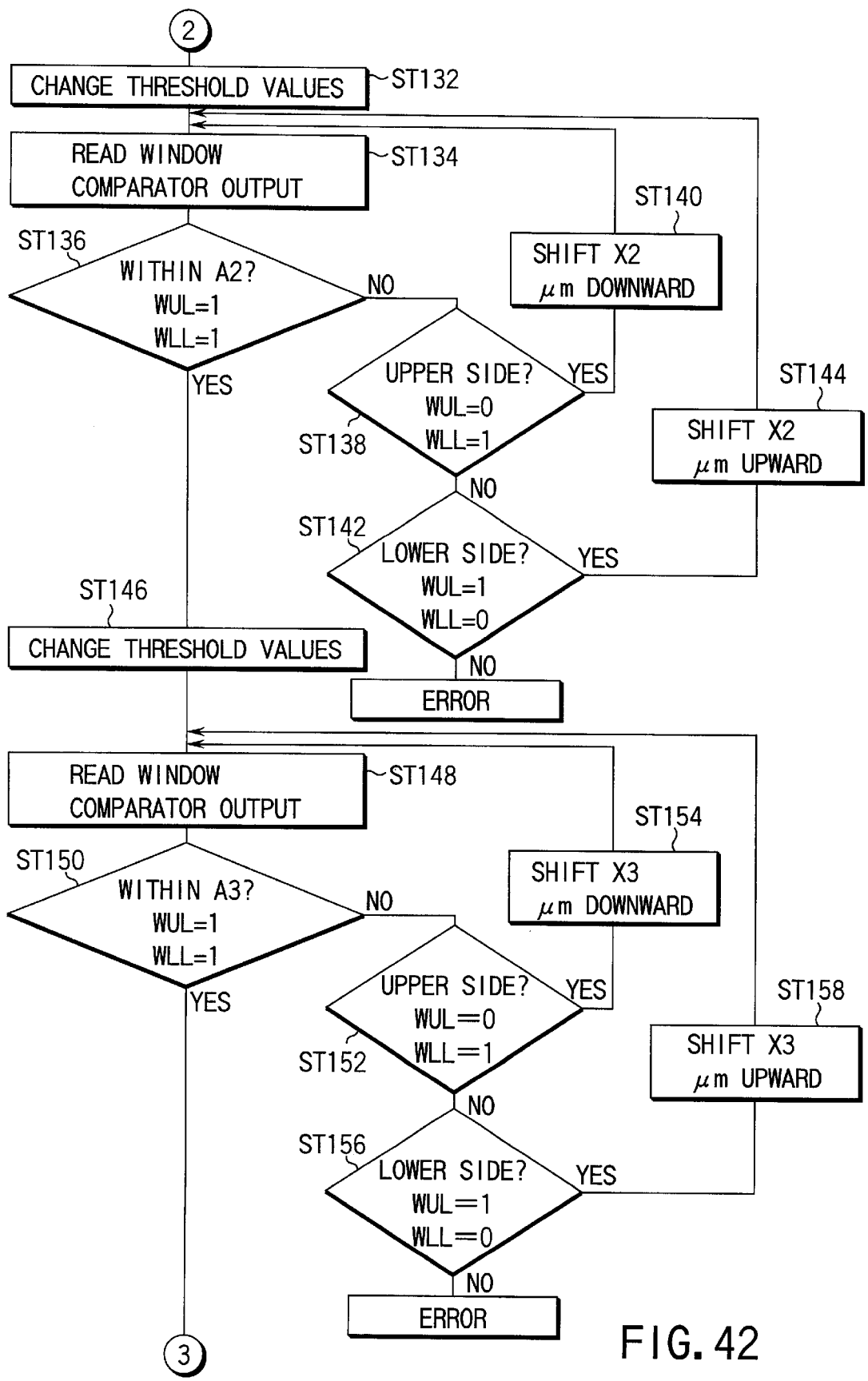
FIG. 42 is a flow chart for explaining the beam passage position control continued from FIG. 41.

If it is determined in step ST122 in FIG. 41 that laser beam a has passed within the set window range (within area A1 in FIG. 39) (WUL="1"/WLL="1") (YES in step ST122), the control enters the process in FIG. 42.

When it is detected that laser beam a has passed within area A1, the CPU of main controller 51 in FIG. 33 changes threshold value instruction data BMDA of window comparator 430* in the process in FIG. 42 (step ST132) to narrow down the "window" of the window comparator from the range from VH1 to VL1 (area A1) in FIG. 39 to that from VH2 to VL2 (area A2).

That is, in case of the beam position control that has a target within area A2 in FIG. 39, the threshold values of window comparator 430* in FIG. 35 and position correction shift amount are, for example, set to be:

$$WINTHH \rightarrow VH2(V)=99H$$

$$WINTHL \rightarrow VL2(V)=66H$$

shift amount→X2 (µm)≈3 µm (value smaller than area A2)

The CPU of main controller 51 changes threshold values WINTHH/WINTHL that define the width of the window of window comparator 430* to VH2/VL2 (step ST132), and reads the comparison results (WUL/WLL) between the integration output Vo and threshold values WINTHH/WINTHL in window comparator 430* (step ST134).

If the comparison results of window comparator 430* are WUL="0"/WLL="1", WUL="1"/WLL="0", or WUL="0"/WLL="0", which indicate that laser beam a falls outside area A2 (outside the set window range) (NO in step ST136), the CPU checks the passage position of laser beam a outside the set window range (step ST138, ST142).

That is, if the comparison results are WUL="0"/WLL="1", which indicate that laser beam a has passed the upper side of the set window (YES in step ST138), the CPU controls galvano mirror 33a to further shift the passage position of laser beam a X2≈3 µm downward (step ST140).

If it is determined in step ST138 that laser beam a has not passed the upper side of the window (not WUL="0"/WLL="1") (NO in step ST138), and it is also determined that laser beam a has not passed the lower side of the set window (not WUL="1"/WLL="0") (NO in step ST142), since these results conflict with the checking result (not WUL="1"/WLL="1") in step ST136, an error is detected, thus ending or interrupting the process in FIG. 42.

If it is determined in step S142 that laser beam a has passed the lower side of the set window range (WUL="1"/

WLL="0") (YES in step ST142), the CPU controls galvano mirror 33a to shift the current passage position of laser beam a X2≈3 μm upward (step ST144).

When the window range (WINTHH/WINTHL) of window comparator 430* is set as described above, and the process (steps ST134 to ST144) shown in FIG. 42 repeats itself, laser beam a can be controlled to pass within area A2 in FIG. 39.

If it is detected in the process in FIG. 42 that laser beam a has passed within area A2 (YES in step S136), the CPU changes threshold value instruction data BMDA of window comparator 430* (step ST146) to narrow down the "window" of the window comparator from the range from VH2 to VL2 (area A2) in FIG. 39 to that from VH3 to VL3 (area A3).

In the beam position control that has a target within area A3 in FIG. 39, the threshold values of window comparator 430* in FIG. 35 and position correction shift amount are, for example, changed to:

$$WINTHH \rightarrow VH3(V)=8FH$$
$$WINTHL \rightarrow VL3(V)=70H$$

shift amount→X3 (μm)≈1 μm (value smaller than area A3)

The CPU of main controller 51 changes threshold values WINTHH/WINTHL that define the width of the window of window comparator 430* to VH3/VL3 (step ST146), and reads the comparison results (WUL/WLL) between the integration output Vo and threshold values WINTHH/WINTHL in window comparator 430* (step ST148).

If the comparison results of window comparator 430* are WUL="0"/WLL="1", WUL="1"/WLL="0", or WUL="1"/WLL="0", which indicate that laser beam a falls outside area A3 (outside the set window range) (NO in step ST150), the CPU checks the passage position of laser beam a outside the set window range (step ST152, ST156).

That is, if the comparison results are WUL="0"/WLL="1", which indicate that laser beam a has passed the upper side of the set window (YES in step ST152), the CPU controls galvano mirror 33a to further shift the passage position of laser beam a X3≈1 μm downward (step ST154).

If it is determined in step ST152 that laser beam a has not passed the upper side of the window (not WUL="0"/WLL="1") (NO in step ST152), and it is also determined that laser beam a has not passed the lower side of the set window (not WUL="1"/WLL="0") (NO in step ST156), since these results conflict with the checking result (not WUL="1"/WLL="1") in step ST150, an error is detected, thus ending or interrupting the process in FIG. 42.

If it is determined in step S156 that laser beam a has passed the lower side of the set window range (WUL="1"/WLL="0") (YES in step ST156), the CPU controls galvano mirror 33a to shift the current passage position of laser beam a X3≈1 μm upward (step ST158).

When the window range (WINTHH/WINTHL) of window comparator 430* is set as described above, and the process (steps ST148 to ST158) shown in FIG. 42 repeats itself, laser beam a can be controlled to pass within area A3 in FIG. 39.

Figure 43:
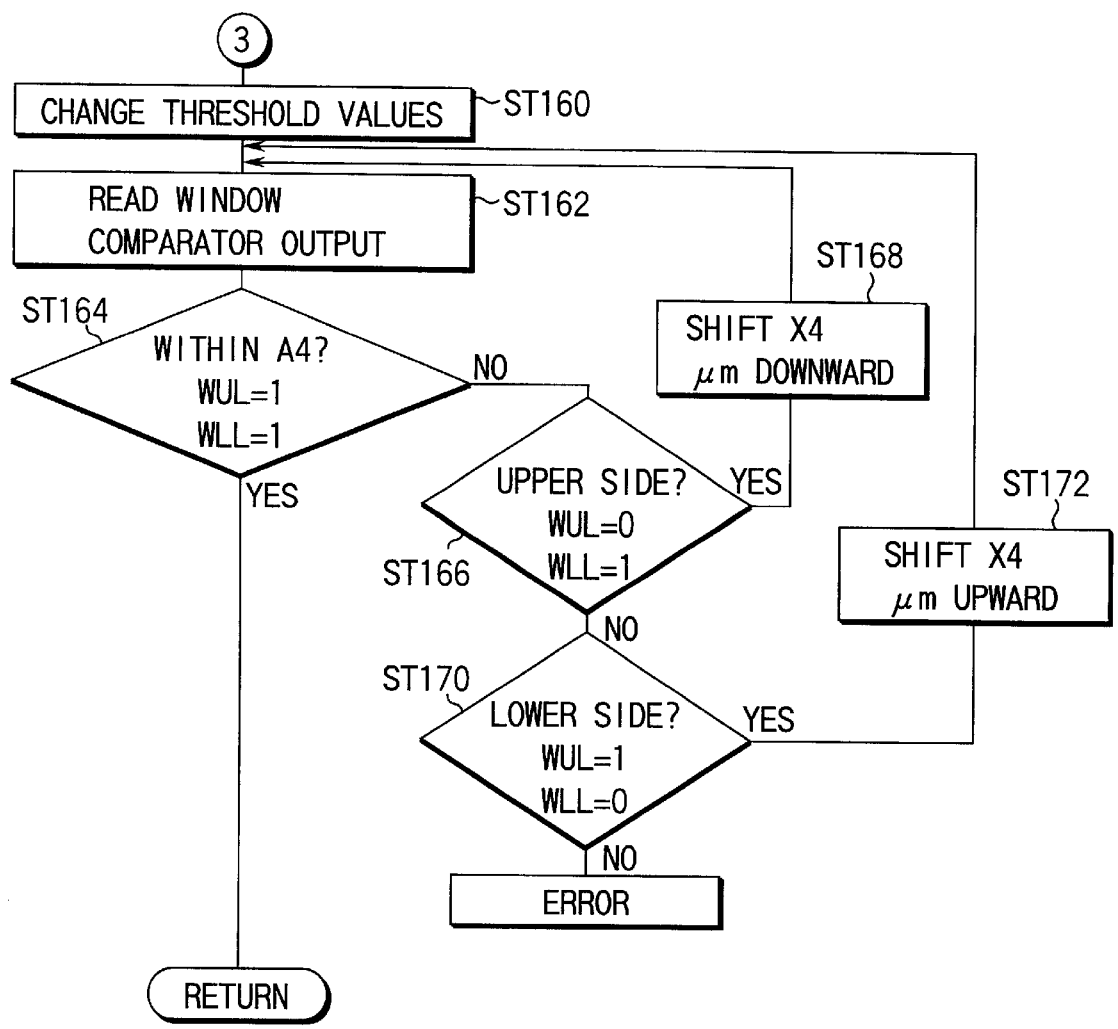
FIG. 43 is a flow chart for explaining the beam passage position control continued from FIG. 42.

If it is determined in step ST150 in FIG. 42 that laser beam a has passed within the set window range (within area A3 in FIG. 39) (WUL="1"/WLL="1") (YES in step ST150), the control enters the process in FIG. 43.

When it is detected that laser beam a has passed within area A3, the CPU of main controller 51 in FIG. 33 changes threshold value instruction data BMDA of window comparator 430* in the process in FIG. 43 (step ST160) to narrow down the "window" of the window comparator from the range from VH3 to VL3 (area A3) in FIG. 39 to that from VH4 to VL4 (area A4).

That is, in case of the beam position control that has a target within area A4 in FIG. 39, the threshold values of window comparator 430* in FIG. 35 and position correction shift amount are, for example, changed to:

$$WINTHH \rightarrow VH4(V)=85H$$
$$WINTHL \rightarrow VL4(V)=7AH$$

shift amount→X4 (μm)≈0.1 μm (value smaller than area A4)

The CPU of main controller 51 changes threshold values WINTHH/WINTHL that define the width of the window of window comparator 430* to VH4/VL4 (step ST160), and reads the comparison results (WUL/WLL) between the integration output Vo and threshold values WINTHH/WINTHL in window comparator 430* (step ST162).

If the comparison results of window comparator 430* are WUL="0"/WLL="1", WUL="1"/WLL="0", or WUL="0"/WLL="0", which indicate that laser beam a falls outside area A4 (outside the set window range) (NO in step ST164), the CPU checks the passage position of laser beam a outside the set window range (step ST166, ST170).

That is, if the comparison results are WUL="0"/WLL="1"which indicate that laser beam a has passed the upper side of the set window (YES in step ST166), the CPU controls galvano mirror 33a to further shift the passage position of laser beam a X4≈0.1 μm downward (step ST168).

If it is determined in step ST166 that laser beam a has not passed the upper side of the window (not WUL="0"/WLL="1") (NO in step ST166), and it is also determined that laser beam a has not passed the lower side of the set window (not WUL="1"/WLL="0") (NO in step ST170), since these results conflict with the checking result (not WUL="1"/WLL="1") in step ST164, an error is detected, thus ending or interrupting the process in FIG. 43.

If it is determined in step S170 that laser beam a has passed the lower side of the set window range (WUL "1"/WLL="0") (YES in step ST170), the CPU controls galvano mirror 33a to shift the current passage position of laser beam a X4≈0.1 μm upward (step ST172).

When the window range (WINTHH/WINTHL) of window comparator 430* is set as described above, and the process (steps ST162 to ST172) shown in FIG. 43 repeats itself, laser beam a can be controlled to pass within area A4 in FIG. 39 as a final target.

With the aforementioned control operation, when laser beam a can pass a predetermined position (within area A4 in FIG. 39), the CPU appropriately changes threshold values WINTHH/WINTHL to be set in window comparator 430* and similarly makes beam passage position control for the remaining laser beams.

In this manner, the beam spacing between neighboring ones of four laser beams a to d used in image formation in the copying machine shown in FIG. 33 can be controlled to a desired pitch corresponding to the pattern spacing of neighboring patterns SF to SJ of sensor 380 in FIG. 3.

CPU51 (shown in FIG. 5, etc.) executing the beam light path position control of FIGS. 40–43 may serve as means for calculating the amount in change of the light path.

The aforementioned operations shown in FIGS. 40 to 43 can be summarized as follows. That is, the threshold values of window comparator 430* are initially set to define a sufficiently large window. Every time the laser window that has passed within the window of the window comparator is detected, the area on the sensor surface in which the beam passes is narrowed down in turn to A2, A3, . . . while changing the threshold values of the window comparator to gradually narrow down the window. By repeating such operation, the beam position can be automatically adjusted so that the beam can pass within area A4 as a final target area.

According to the aforementioned embodiment of the present invention, since an image forming apparatus using a multi-beam optical system uses a window comparator in a beam passage position detector and beam passage position control, a high-quality image which suffers less beam pitch errors can be obtained.

Figure 44:
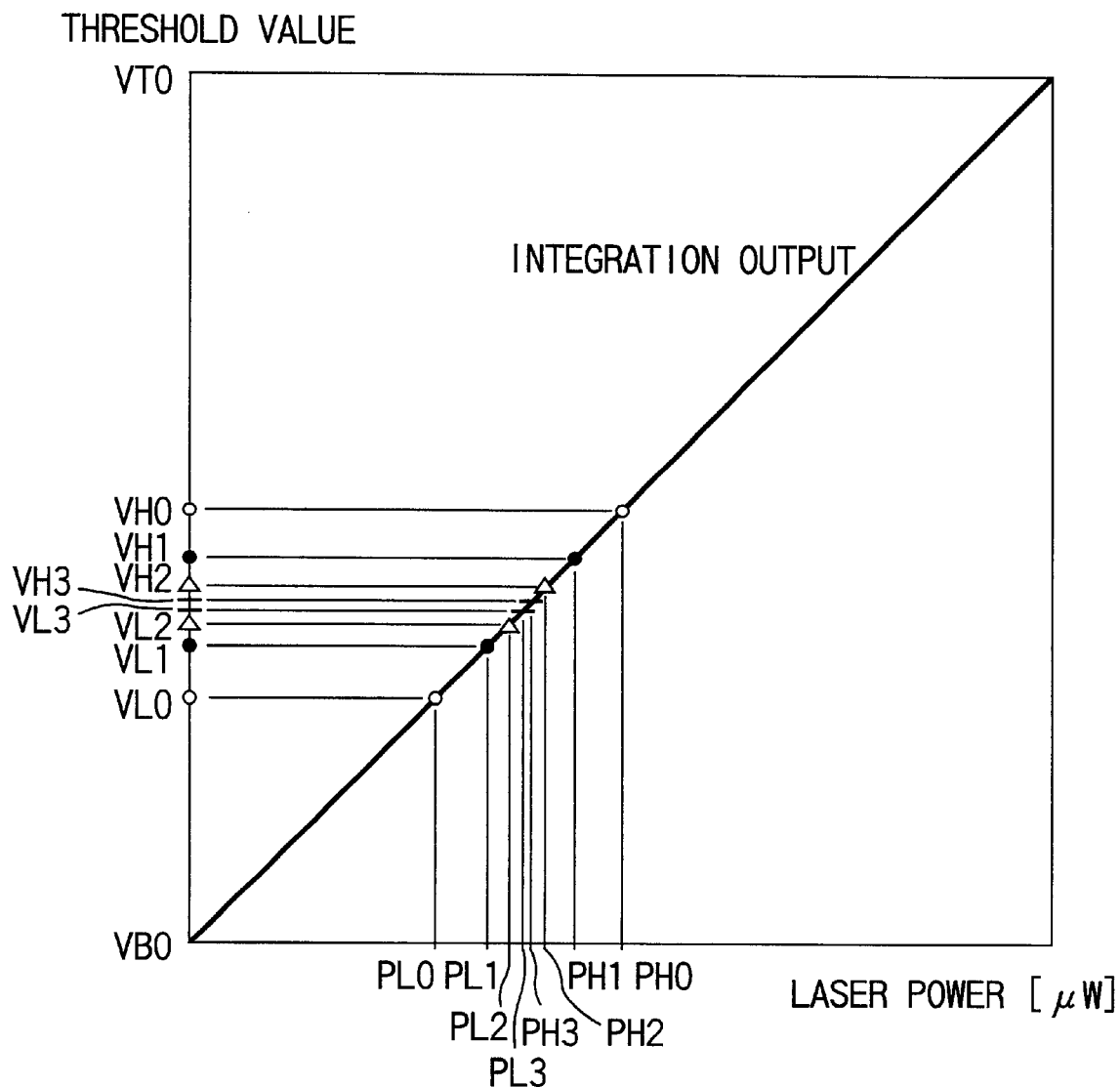
FIG. 44 is a graph showing the correspondence between the laser power detection characteristics (PH/PL) and the comparison reference threshold values (higher and lower threshold values VH/VL) of the window comparator.

FIG. 44 exemplifies the correspondence between the laser power detection characteristics (PH/PL) and the comparison reference values (higher and lower threshold values VH/VL) of the window comparator.

In this case, upon detecting laser power, only integration output Vo higher than a predetermined reference voltage (e.g., Vref=2.5 V) is output. Hence, upon detecting laser power using window comparator 430* in FIG. 35, the threshold values of window comparator 430* are set to be higher than the reference voltage.

More specifically, when window comparator 430* is used in a power detector, the power detector is adjusted to have the characteristics exemplified in FIG. 44. For example, the power detector is adjusted in advance to generate integration output Vo=3.5 V when a laser beam of 300 $\mu$W is scanned at a predetermined velocity.

In the example shown in FIG. 44, threshold value VB0 corresponds to the reference voltage (Vref=2.5 V), and threshold value VT0 corresponds to +5 V. FIG. 44 shows a change in set threshold value upon controlling the laser power to finally fall within the range from PL3 ($\mu$W) to PH3 ($\mu$W).

Upon controlling laser power to fall within the range from PL3 ($\mu$W) to PH3 ($\mu$W), the threshold values of window comparator 430* are set in the order of [VH0/VL0]→[VH1/VL1]→[VH2/VL2]→[VH3/VL3] to gradually narrow down the window of the window comparator. Then, the laser power is adjusted so that integration output Vo corresponding to the laser power (laser light amount) falls within the threshold value range (the range between WINTHH and WINTHL in FIG. 35) of the window of window comparator 430*, which is narrowed down gradually.

FIG. 45 shows a change in threshold value of window comparator 430* when the laser power is controlled to be a value (falling within the range from PL3 $\mu$W to PH3 $\mu$W) corresponding to threshold values VH3/VL3 in FIG. 44.

In FIG. 45, assume that the hexadecimal values (VH3= 4DH/VL3=4CH; numerical values different from the example in FIG. 25) of threshold value instruction data exemplified in FIG. 45 correspond to laser power=300 $\mu$W.

Note that FIG. 45 exemplifies hexadecimal values "4DH/4CH" as instruction data corresponding to laser power=300 $\mu$W, but a hexadecimal value "80H" corresponds to laser power=300 $\mu$W in the example in FIG. 25. However, FIGS. 25 and 45 are different examples, and do not mean any inconsistency.

That is, FIG. 25 suggests that the magnitude ($\mu$W) of laser power can be arbitrarily designated by instruction data from the CPU or the like, and FIG. 45 suggests that the window range of the window comparator can be freely changed by instruction data from the CPU or the like. FIG. 45 is prepared to explain that the laser power can be controlled to a value corresponding to threshold value instruction data obtained after the window of the window comparator has been narrowed down to a predetermined range.

Figure 46:
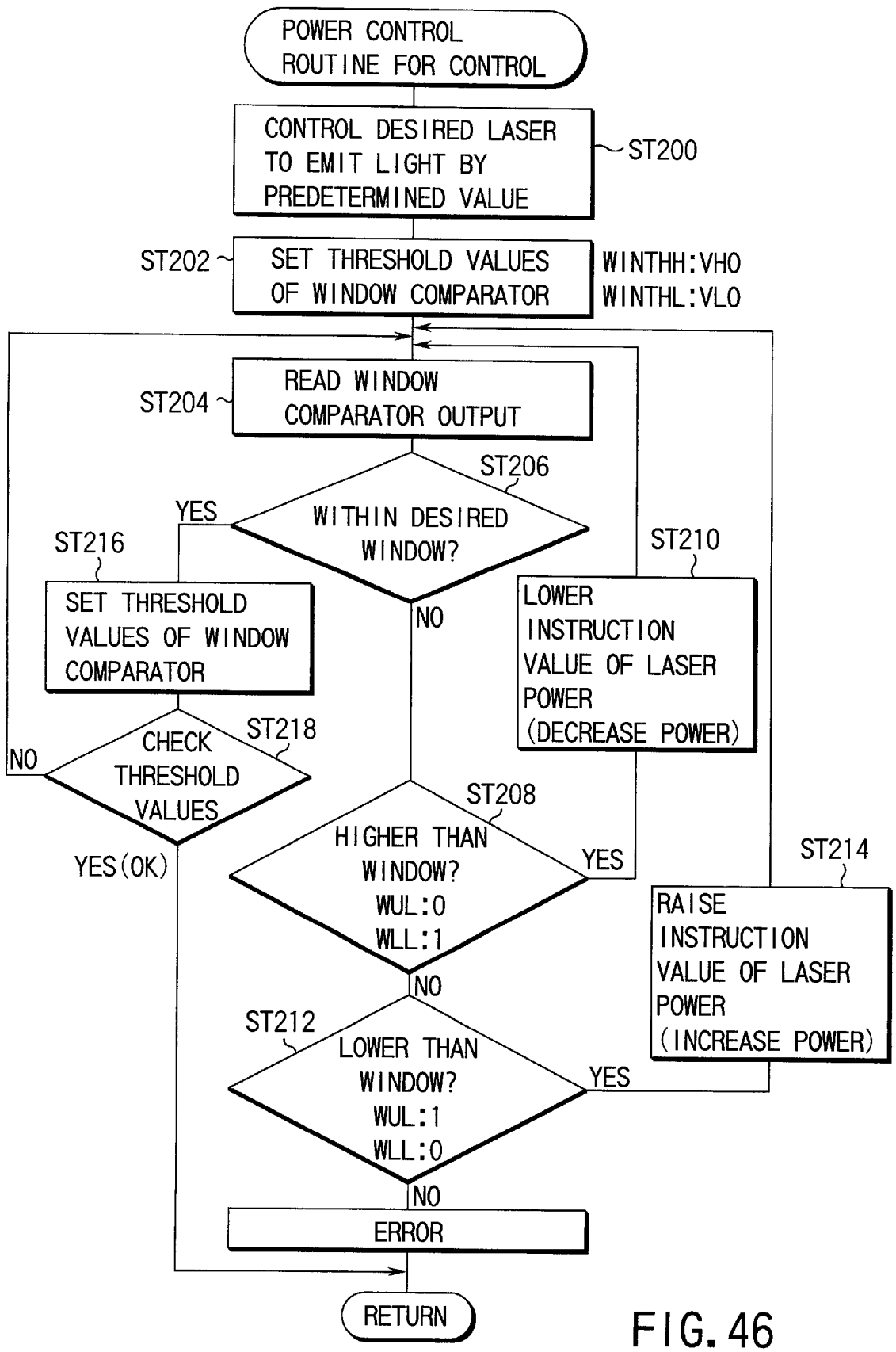
FIG. 46 is a flow chart for explaining a case wherein the laser power control is implemented using the arrangement shown in FIGS. 33 and 35 (using the window comparator)

FIG. 46 is a flow chart for explaining the laser power control using the arrangement shown in FIGS. 33 and 35 (using window comparator 430*).

The laser power control will be explained below with reference to FIGS. 44 to 46. This control assumes that the laser light amount is adjusted to obtain laser power=300 $\mu$W on the sensor surface. That is, the laser power is adjusted to a required value (300 $\mu$W) by changing the laser instruction value so that the outputs from the window comparator upon setting the threshold values VH3 and VL3 of window comparator 430* become [WUL, WLL]=[1, 1]. In FIG. 44, PL3<300 $\mu$W>PH3.

Referring to FIG. 46, the CPU controls a desired laser to emit light by a predetermined value (instruction value (step ST200). For example, the CPU sets a predetermined instruction value in laser driver 32a of first laser 31a, and controls it to emit light to obtain approximately 300 $\mu$W on the sensor surface.

Each laser of the copying machine shown in FIG. 33 is adjusted in advance to emit light of, e.g., 300 $\mu$W in response to a predetermined instruction value upon delivery from a factory. However, when the laser reflection surface of polygonal mirror 35 is contaminated with dust or the like in optical system unit 13 along with an elapse of time, a laser beam with which the sensor surface is irradiated weakens, and a desired sensor output cannot be obtained. For this reason, even when the laser is pre-adjusted to emit light of 300 $\mu$W upon delivery from a factory, this power control is required.

The CPU then sets the threshold values of window comparator 430* as follows (step ST202). The set threshold values are compared with integration output Vo at that time, and the CPU reads the output from window comparator 430* as the comparison results (step ST204).

*WINTHH*→*VH0(V)=5AH*

*WINTHL*→*VL0(V)=3FH*

The relationship among the areas shown in FIG. 45, power, and the comparison results of window comparator 430* is one of:

area U0: 379 to 750 $\mu$W: [WUL, WLL]=[0, 1]

area W0: 221 to 379 $\mu$W: [WUL, WLL]=[1, 1]

area L0: 0 to 221 $\mu$W: [WUL, WLL]=[1, 0]

If the output from window comparator 430* is not [1, 1], this means that integration output Vo at that time falls outside the window (=the detection window of window comparator 430*) (NO in step ST206).

If the output from window comparator 430* is [0, 1] (YES in step ST208; higher than the window), since the laser power is too large, the CPU lowers the instruction value of the laser driver to decrease the laser power (step ST210), and checks the threshold values again (step ST204, ST206).

If the output from the window comparator is [1, 0] (NO in step ST208, YES in step ST212; lower than the required window), since the laser power is too small, the CPU raises the instruction value of the laser driver to increase the laser power (step ST214), and checks the threshold values again (step ST204, ST206).

If integration output Vo falls outside the window (NO in step ST206), and is neither higher nor lower than the window (NO in step ST208, NO in step ST212), since there is no area to which integration output Vo belongs, an error is detected, thus interrupting or ending the control routine shown in FIG. 46.

The increment/decrement of laser power in the above process (step ST210, ST214) assumes a value smaller than the smallest one of areas U0, W0, and L0 in FIG. 45. In the above example, since area W0 (158 µW from 221 µW to 379 µW) is smallest, the increment/decrement of laser power is selected to be 80 µW around half that area.

The aforementioned process (ST204 to ST214) repeats itself until window comparator 430* outputs [1, 1], i.e., integration output Vo falls within the window range (W0 in FIG. 45) of window comparator 430* at that time.

When the output from window comparator 430* becomes [1, 1] (YES in step ST206; i.e., integration output Vo falls within the window), the CPU sets new threshold values (step ST216):

$$WINTHH \rightarrow VH1(V)=51H$$

$$WINTHL \rightarrow VL1(V)=48H$$

At this time, the relationship between the areas and power is:

area U1: 326 to 379 µW: [WUL, WLL]=[0, 1]
area W1: 274 to 326 µW: [WUL, WLL]=[1, 1]
area L1: 221 to 274 µW: [WUL, WLL]=[1, 0]

Subsequently, the CPU checks if the threshold values (VH1/VL1) currently used in comparison in window comparator 430* correspond to the narrowest window (step ST218).

If the current threshold values (VH1/VL1) do not correspond to the narrowest window (NO in step ST218; threshold values are not VH3/VL3 in FIG. 45), the flow returns to step ST204 to repeat the aforementioned process (steps ST204 to ST214) until integration output Vo falls within the desired window (W1 in FIG. 45) (YES in step ST206), thus adjusting the laser power.

During this repetition process (ST210, ST214), the increment/decrement of laser power is half (around 25 µW) the smallest one (area W1=52 µW) of areas U1, W1, and L1 in FIG. 45.

The aforementioned operations (ST204 to ST218) repeat themselves by changing the threshold values as follows until integration output Vo falls within the target threshold value range, while checking if the threshold values currently used in comparison in window comparator 430* correspond to the narrowest window (step ST218).

$$WINTHH \rightarrow VH2(V)=4EH$$

$$WINTHL \rightarrow VL2(V)=4BH$$

At this time, the relationship between the areas and power is:

area U2: 309 to 326 µW: [WUL, WLL]=[0, 1]
area W2: 291 to 309 µW: [WUL, WLL]=[1, 1]
area L2: 274 to 291 µW: [WUL, WLL]=[1, 0]

In this case, the laser power is adjusted until the integration output falls within area W2 in FIG. 45. The increment/decrement of laser power in this process is around 9 µW.

$$WINTHH \rightarrow VH3(V)=4DH$$

$$WINTHL \rightarrow VL3(V)=4CH$$

At this time, the relationship between the areas and power is:

area U3: 303 to 309 µW: [WUL, WLL]=[0, 1]
area W3: 297 to 303 µW: [WUL, WLL]=[1, 1]
area L3: 291 to 297 µW: [WUL, WLL]=[1, 0]

In this case, the laser power is adjusted until the integration output falls within area W3 in FIG. 45. The increment/decrement of laser power in this process is around 2 µW.

While the threshold values (VH2/VL2) at that time do not correspond to the narrowest window (NO in step ST218), the aforementioned process (ST204 to ST214) repeats itself until integration output Vo falls within the desired window (W3 in FIG. 45) (YES in step ST206), thus adjusting the laser power.

If it is determined that integration output Vo falls within the desired window (W3 in FIG. 45) (YES in step ST206), and the threshold values (VH3/VL3) at that time correspond to the narrowest window (YES/OK in step ST218), the required power is obtained, and the process shown in FIG. 46 ends.

The power control routine for image formation using the window comparator will be explained below. An outline of the flow of this power control is as follows.

That is, in the power control for image formation, a reference laser (first laser 31a) is controlled to emit light by a predetermined instruction value, and that laser power is measured by sensor 380 and is recorded in memory 52.

With reference to the measurement result of sensor 380, which is recorded in memory 52, the instruction values to the laser drivers (32b to 32d) are adjusted so that the laser power levels of the remaining lasers (31b to 31d) match the measurement result of the reference laser (31a).

Figure 47:
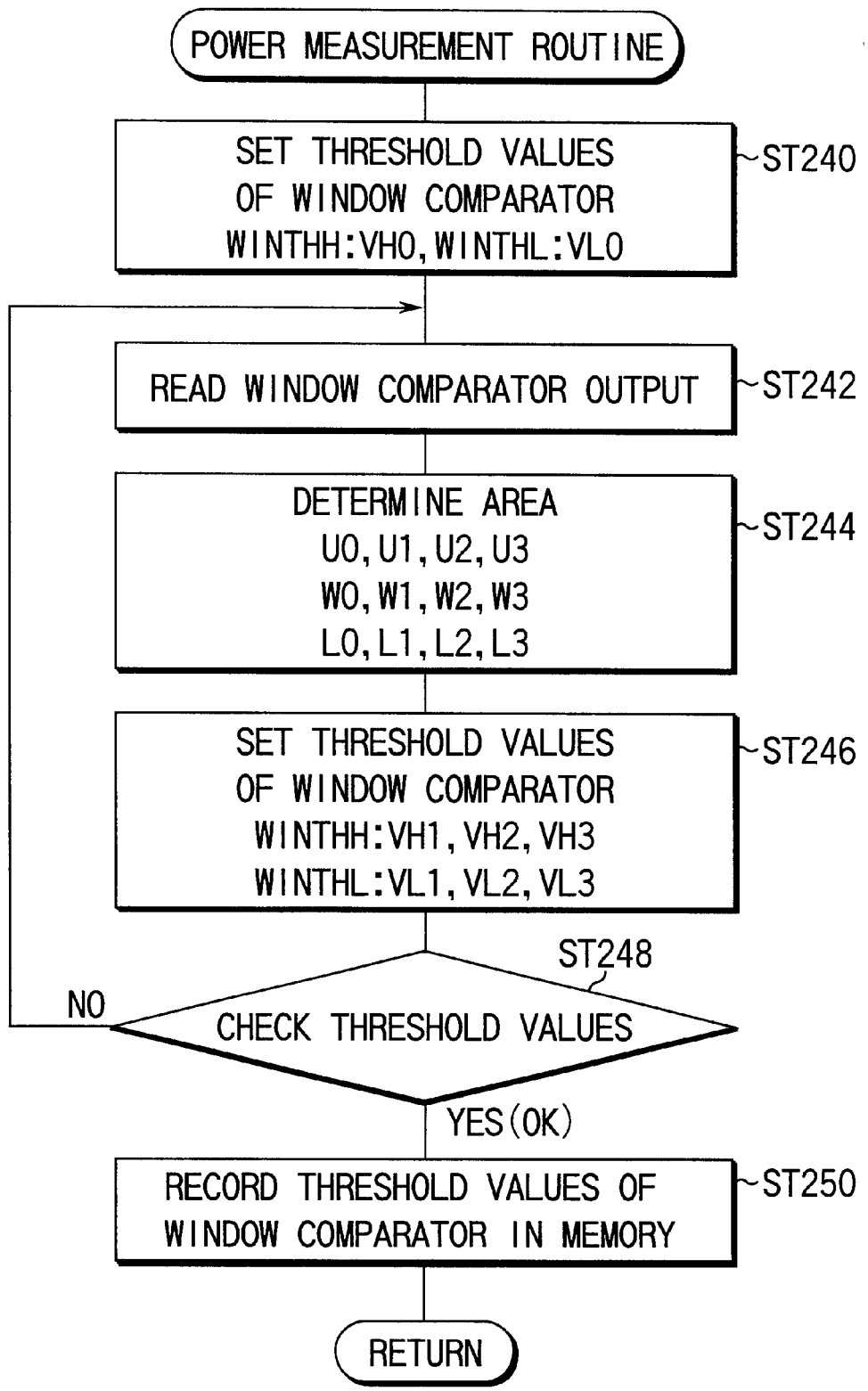
FIG. 47 is a flow chart for explaining the sequence for measuring the beam amount (laser power)

FIG. 47 is a flow chart for explaining the sequence for measuring the light amount (laser power) of the reference laser beam (31a) using window comparator 430*, and recording the measurement result in memory 52.

Figure 48:
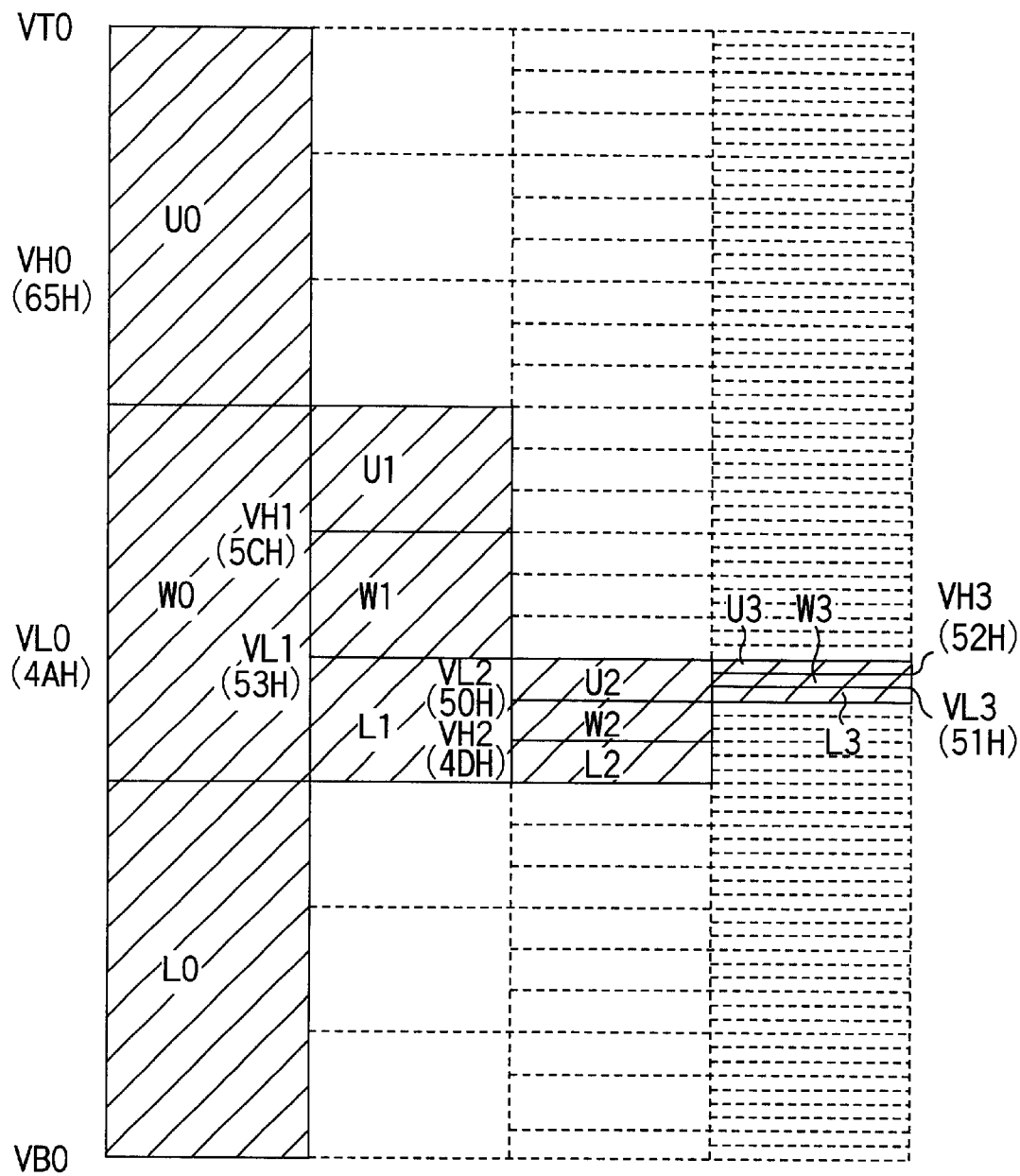
FIG. 48 is a view showing changes in threshold value of the window comparator when the image formation laser power for beam a is controlled to a value (within the range from PL3 $\mu$W to PH3 $\mu$W) corresponding to threshold value VH3/VL3 shown in FIG. 44.

FIG. 48 exemplifies a change in threshold value of window comparator 430* when the laser power for image formation with respect to laser beam 31a is controlled to a value (within the range from PL3 µW to PH3 µW in the example in FIG. 44) corresponding to desired threshold values VH3/VL3. (Note that hexadecimal values of threshold value data exemplified in FIG. 48 are different from those of threshold value data exemplified in FIG. 45. The hexadecimal values themselves of threshold value data are not of importance here but the fact that the window of window comparator 430* is gradually narrowed down upon change in hexadecimal value of threshold value data along with the progress of control is important.)

The sequence shown in FIG. 47 will be explained below with reference to FIG. 48.

The CPU of main controller 51 in FIG. 33 rotates polygonal mirror motor 36, and supplies an instruction value to galvano mirror 33a so that laser beam 31a passes nearly the center of power detection sensor pattern SL of beam detect sensor 380. Note that power detection sensor pattern has a shape having a sufficient margin in the sub-scan direction. For this reason, the beam passage position upon power control does not require precision as high as that required for the beam passage position control.

In the process shown in FIG. 47, the CPU of main controller 51 shown in FIG. 33 sets threshold values WINTHH/WINTHL of window comparator 430* (CMP1 and CMP2) in FIG. 35 at VH0/VL0 using predetermined instruction data (65H and 4AH in the example shown in FIG. 48) (step ST240).

The CPU then reads the comparator output (WUL/WLL) as comparison results of threshold values VH0/VL0 and integration output Vo at that time (step ST242).

Threshold values VH0/VL0 are set to roughly divide the detection characteristics of beam amount detector 38 into three areas (U0, W0, and L0 obtained by dividing the area into three areas in FIG. 48). That is, the CPU determines based on the contents (a combination of logic levels of WUL/WLL) of the comparator output one of the tree-divided areas (U0, W0, and L0 in FIG. 48) to which the beam amount (laser power) of the first laser beam (31*a*) belongs (step ST244).

The correspondence among the threshold value, area, laser power, and comparator output (comparison result) at that time is:

$$WINTHH \rightarrow VH0(V)=65H$$

$$WINTHL \rightarrow VL0(V)=4AH$$

area U0: 315 to 750 μW: [WUL, WLL]=[0, 1]

area W0: 156 to 315 μW: [WUL, WLL]=[1, 1]

area L0: 0 to 156 μW: [WUL, WLL]=[1, 0]

Upon completion of determining based on VH0/VL0 the area (one of U0, W0, and L0) to which the laser power belongs in step ST244, the CPU changes the threshold values of window comparator 430* (step ST246).

Note that the threshold values of window comparator 430* are changed to gradually narrow down the window of the window comparator.

For example, if the area to which current integration output Vo belongs is W0, the CPU changes the threshold values to those which roughly divide the range from VL0 to VH0 into three areas (step ST246). After that, the CPU reads the comparator output again (step ST242).

The correspondence among the threshold value, area, laser power, and comparator output (comparison result) at that time is:

$$WINTHH \rightarrow VH1(V)=5CH$$

$$WINTHL \rightarrow VL1(V)=53H$$

area U1: 262 to 315 μW: [WUL, WLL]=[0, 1]

area W1: 209 to 262 μW: [WUL, WLL]=[1, 1]

area L1: 156 to 209 μW: [WUL, WLL]=[1, 0]

At this time, since the threshold values set in step ST246 do not correspond to the narrowest window of window comparator 430* (not VH3/VL3) (NO in step ST248), the processes in steps ST242 to ST248 repeat themselves.

That is, the CPU reads the output from window comparator 430* as the comparison result using new threshold values (step ST242), determines an area (step ST244), and changes the threshold values of window comparator 430* (step ST246). If the area determined in this loop is L1, the CPU sets threshold values that divide the range from VL0 to VL1 into three areas.

The correspondence among the threshold value, area, laser power, and comparator output (comparison result) at that time is:

$$WINTHH \rightarrow VH2(V)=50H$$

$$WINTHL \rightarrow VL2(V)=4DH$$

area U2: 191 to 209 μW: [WUL, WLL]=[0, 1]

area W2: 174 to 191 μW: [WUL, WLL]=[1, 1]

area L2: 156 to 174 μW: [WUL, WLL]=[1, 0]

At this time, since the threshold values set in step ST246 do not correspond to the narrowest window of window comparator 430* (not VH3/VL3) (NO in step ST248), the processes in steps ST242 to ST248 repeat themselves again.

That is, the CPU reads the output from window comparator 430* as the comparison result using new threshold values (step ST242), determines an area (step ST244), and changes the threshold values of window comparator 430* (step ST246). If the area determined in this loop is U2, the CPU sets threshold values that divide the range from VL2 to VL1 into three areas.

The correspondence among the threshold value, area, laser power, and comparator output (comparison result) at that time is:

$$WINTHH \rightarrow VH3(V)=52H$$

$$WINTHL \rightarrow VL3(V)=51H$$

area U3: 203 to 209 μW: [WUL, WLL]=[0, 1]

area W3: 197 to 203 μW: [WUL, WLL]=[1, 1]

area L3: 191 to 197 μW: [WUL, WLL]=[1, 0]

Subsequently, window comparator 430* executes comparison of integration output Vo using the narrowest window (VH3/VL3). As a result of comparison, if the window comparator output is [WUL, WLL]=[1, 1], it is determined that integration output Vo falls within area W3 in FIG. 45 (the narrowest window of window comparator 430*) (step ST244).

Since the threshold values at that time correspond to the narrowest window (VH3/VL3) of window comparator 430* (YES/OK in step ST248), the threshold values (52H/51H) at that time are recorded in memory 52 as data that represents the beam power of first laser 31*a* (step ST250).

Upon completion of power measurement of first laser 31*a*, the laser power levels of the remaining lasers (31*b* to 31*d*) are adjusted with reference to the recorded threshold values and the output from window comparator 430* so as to match the reference value.

In this example, area W3 when threshold values VH3=52H and VL3=51H is used as reference upon adjusting the laser power levels of the remaining lasers.

Figure 49:
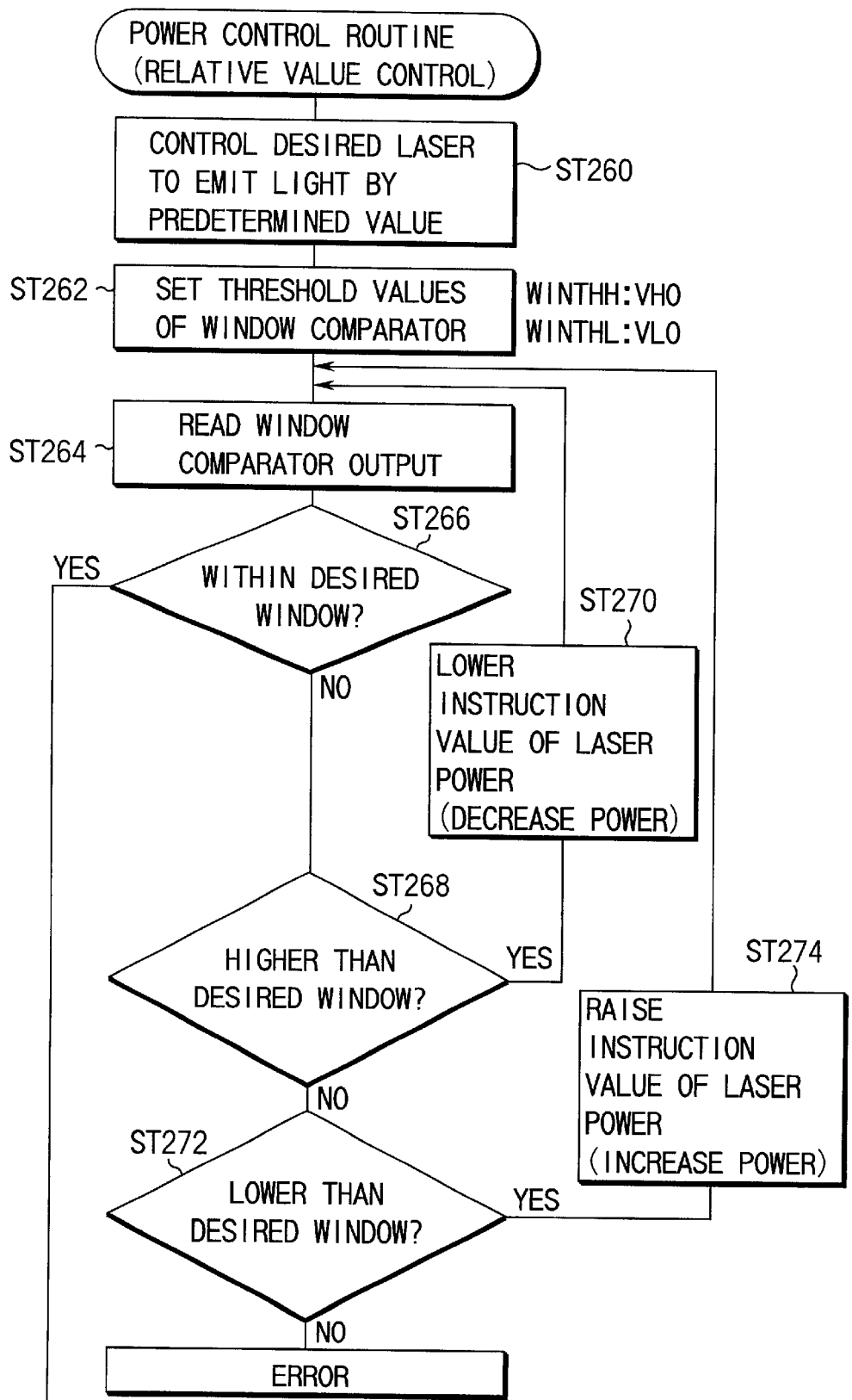
FIG. 49 is a flow chart for explaining a case wherein the laser power relative value control is implemented using the arrangement shown in FIGS. 33 and 35 (using the window comparator)
Figure 50:
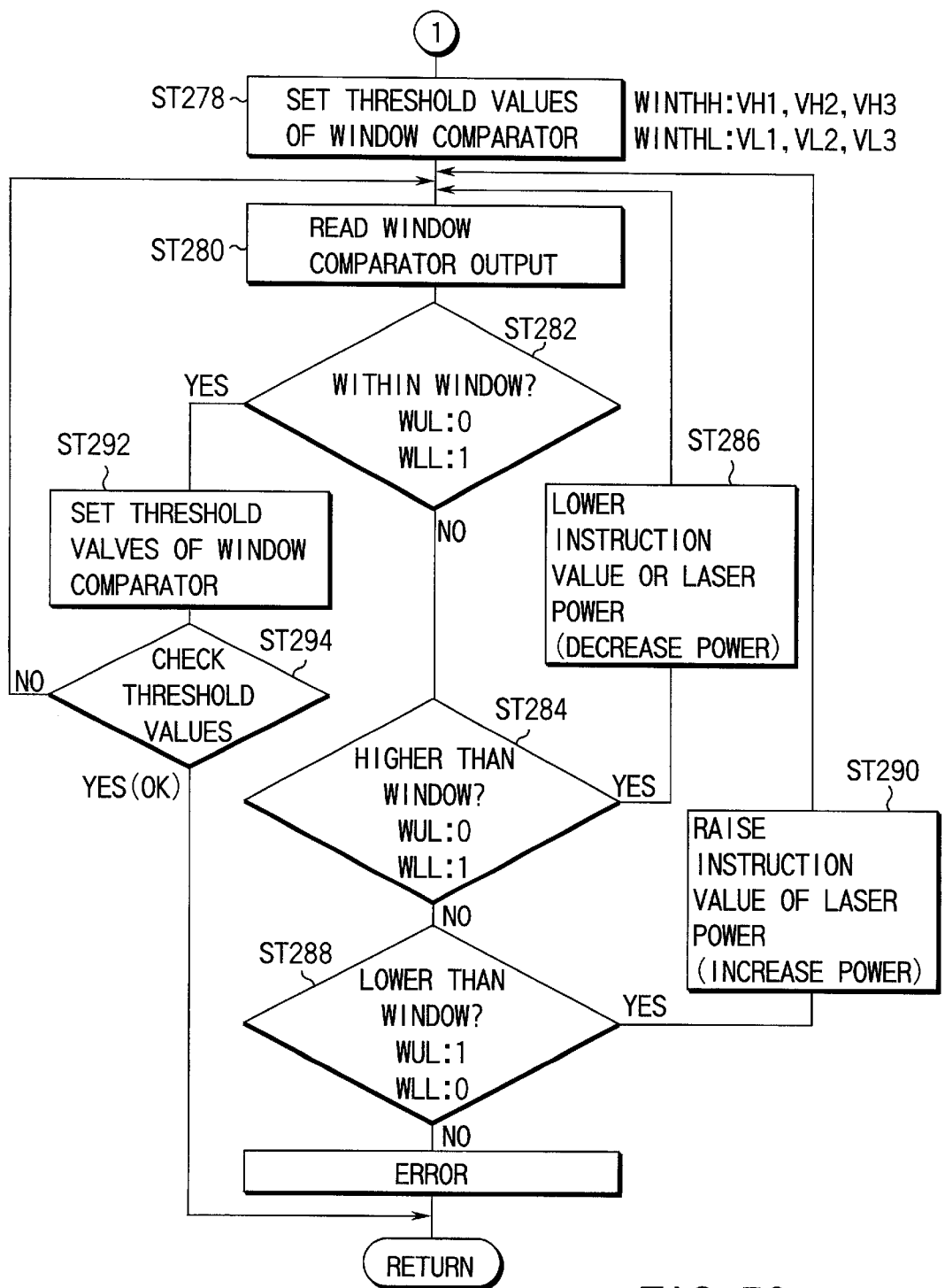
FIG. 50 is a flow chart for explaining the laser power relative value control continued from FIG. 49.

FIGS. 49 and 50 are flow charts for explaining the laser power relative value control using the arrangement shown in FIGS. 33 and 35 (using window comparator 430*).

This control aims at adjusting the laser light amount so that the laser power levels of lasers 31*b* to 31*d* equal that (e.g., 300 μW) of reference laser 31*a* on the sensor surface.

More specifically, the CPU changes the laser instruction values to make the window comparator output [WUL, WLL]=[1, 1] upon setting threshold values VH3 and VL3 of window comparator 430*, thus adjusting the laser power.

Note that the aim of this control cannot be achieved by applying the data recorded in memory 52 to the remaining lasers (31*b* to 31*d*) even when the light amount of laser 31*a* is adjusted based on the data recorded in memory 52 to 300 μW on the sensor surface.

Using the data recorded in memory 52, the power levels of the remaining lasers (31*b* to 31*d*) on the sensor surface are highly likely to be adjusted to values close to 300 μW. However, in consideration of variations of the lasers due to aging resulting from long-term operations after delivery from a factory, and the like, the laser power levels of multi-beams may vary if the data recorded in memory 52 is directly used. For this reason, if high image quality is required, individual laser power control for adjusting each of the remaining lasers (31*b* to 31*d*) to the reference laser (laser relative value control of the remaining lasers with respect to the reference laser) is required after the data of the reference laser is recorded.

The laser power control (relative value control) using the measurement data of the reference laser (31*a*) recorded in the memory 52 in FIG. 33 will be explained below with reference to FIGS. 48 to 50.

The CPU controls a required laser to emit light by a predetermined value (instruction value) (step ST260). For example, the CPU sets a predetermined instruction value in laser driver 32b of second laser 31b and controls it to emit light of around 300 µW on the sensor surface.

The CPU sets the threshold values of window comparator 430* as follows (step ST262). The set threshold values are compared with integration output Vo at that time, and the CPU reads the output from window comparator 430* as the comparison results (step ST264).

$$WINTHH \rightarrow VH0(V)=65H$$

$$WINTHL \rightarrow VL0(V)=4AH$$

At this time, the relationship among the area in FIG. 48, power, and the comparison results of window comparator 430* is one of:

area U0: 315 to 750 µW: [WUL, WLL]=[0, 1]
area W0: 156 to 315 µW: [WUL, WLL]=[1, 1]
area L0: 0 to 156 µW: [WUL, WLL]=[1, 0]

If the output from window comparator 430* is not [1, 1], this means that integration output Vo at that time falls outside the window (NO in step ST266).

If the output from the window comparator is [0, 1] (YES in step ST268; higher than the window), since the laser power is too large, the CPU lowers the instruction value of the laser driver to decrease the laser power (step ST270), and checks the threshold values again (step ST264, ST266).

If the output from the window comparator is [1, 0] (NO in step ST268, YES in step ST272; lower than the required window), since the laser power is too small, the CPU raises the instruction value of the laser driver to increase the laser power (step ST274), and checks the threshold values again (step ST264, ST266).

If integration output Vo falls outside the window (NO in step ST266), and is neither higher nor lower than the window (NO in step ST268, NO in step ST272), since there is no area to which integration output Vo belongs, an error is detected, thus interrupting or ending the control routine shown in FIG. 49.

The increment/decrement of laser power in the above process (step ST270, ST274) is, for example, around 80 µW.

The aforementioned process (ST264 to ST274) repeats itself until window comparator 430* outputs [1, 1], i.e., integration output Vo falls within the window range (W0 in FIG. 48) of window comparator 430* at that time.

When the output from window comparator 430* becomes [1, 1] (YES in step ST266; i.e., integration output Vo falls within the window), the control enters the process in FIG. 50, and the CPU newly sets the following threshold values (step ST278).

The new threshold values are compared with integration output Vo at that time, and the CPU reads the output from window comparator 430* as the comparison results (step ST280).

$$WINTHH \rightarrow VH1(V)=5CH$$

$$WINTHL \rightarrow VL1(V)=53H$$

At this time, the relationship between the areas and power is:

area U1: 262 to 315 µW: [WUL, WLL]=[0, 1]
area W1: 209 to 262 µW: [WUL, WLL]=[1, 1]
area L1: 156 to 209 µW: [WUL, WLL]=[1, 0]

If the output from window comparator 430* is not [1, 1], this means that integration output Vo at that time falls outside the window (NO in step ST282).

If the output from the window comparator is [0, 1] (YES in step ST284; higher than the window), since the laser power is too large, the CPU lowers the instruction value of the laser driver to decrease the laser power (step ST286), and checks the threshold values again (step ST280, ST282).

If the output from the window comparator is [1, 0] (NO in step ST284, YES in step ST288; lower than the required window), since the laser power is too small, the CPU raises the instruction value of the laser driver to increase the laser power (step ST290), and checks the threshold values again (step ST280, ST282).

If integration output Vo falls outside the window (NO in step ST282), and is neither higher nor lower than the window (NO in step ST284, NO in step ST288), since there is no area to which integration output Vo belongs, an error is detected, thus interrupting or ending the control routine shown in FIG. 50.

The increment/decrement of laser power in the above process (step ST286, ST290) is, for example, around 25 µW.

The aforementioned process (ST280 to ST290) repeats itself until window comparator 430* outputs [1, 1], i.e., integration output Vo falls within the window range (W0 in FIG. 48) of window comparator 430* at that time.

If integration output Vo falls within the window of window comparator 430* (YES in step ST282), the CPU sets new threshold values (step ST292):

$$WINTHH \rightarrow VH2(V)=50H$$

$$WINTHL \rightarrow VL2(V)=4DH$$

The relationship between the areas and power is:

area U2: 191 to 209 µW: [WUL, WLL]=[0, 1]
area W2: 174 to 191 µW: [WUL, WLL]=[1, 1]
area L2: 156 to 174 µW: [WUL,WLL]=[1, 0]

Subsequently, the CPU checks if the threshold values currently used in comparison in window comparator 430* correspond to the narrowest window (step ST294).

If the current threshold values do not correspond to the narrowest window (NO in step ST294; threshold values are not VH3/VL3 in FIG. 48), the aforementioned process (ST280 to ST290) repeats itself until integration output Vo falls within the desired window (W1 in FIG. 48) (YES in step ST282), thus adjusting the laser power. The increment/decrement of laser power in the above process (step ST286, ST290) is, for example, around 9 µW.

The aforementioned operations (ST280 to ST294) repeat themselves by changing the threshold values until integration output Vo falls within the target threshold value range (narrowest window), while checking if the threshold values currently used in comparison in window comparator 430* correspond to the narrowest window (step ST294).

That is, if integration output Vo falls within the window of window comparator 430* (YES in step ST282), the CPU sets new threshold values (step ST292):

$$WINTHH \rightarrow VH3(V)=52H$$

$$WINTHL \rightarrow VL3(V)=51H$$

The relationship between the areas and power is:

area U3: 203 to 209 µW: [WUL, WLL]=[0, 1]
area W3: 197 to 203 µW: [WUL, WLL]=[1, 1]
area L3: 191 to 197 µW: [WUL, WLL]=[1, 0]

The increment/decrement of power in this process is, e.g., around 2 µW.

If integration output Vo falls within the window of window comparator 430* at that time by the laser power control using threshold values VH3/VL3 (YES in step ST282), the CPU starts a threshold value re-setting process (step ST292). However, since the current threshold values are VH3/VL3, and no threshold values that can set a narrower window are available, the threshold values stay at VH3/VL3 (step ST292).

In this state, the CPU checks if the threshold values currently used in comparison in window comparator 430* correspond to the narrowest window (step ST294).

In this case, since the current threshold values (VH3/VL3) correspond to the narrowest window (area W3 in FIG. 48) (YES/OK in step ST294), the process in FIG. 50 ends.

Since memory 52 in FIG. 33 stores the power measurement data of the reference laser, the threshold values to be set in window comparator 430* in step ST278 in FIG. 50 may start from VH2/VL2 while skipping VH1/VL1.

If variations among the multi-beam lasers are minimal, the threshold values to be set in window comparator 430* in step ST278 in FIG. 50 may start from VH3/VL3 while skipping VH1/VL1 and VH2/VL2.

When the aforementioned laser power control is executed for the respective laser beam, an image forming apparatus using the multi-beam optical system can obtain a high-quality image which suffers less density nonuniformity.

Offset detection (measurement of an offset voltage) of the beam position detector will be explained below.

The influences of an offset voltage on beam detection have already been explained early with reference to FIGS. 7A and 7B, but will be briefly restated.

That is, even when the actual passage position of a beam on the sensor surface in FIG. 3 is an ideal one, if an offset voltage is produced in a circuit (an amplifier circuit using an analog operational amplifier) that detects the beam passage position, beam passage position detector output processing circuit 40 outputs wrong information "the beam position has deviated". This is the influence of the offset voltage on the beam detection.

In an actual image forming apparatus using multibeams, when an offset with a certain magnitude (slight but cannot be ignored) is produced in a beam position detection circuit, control for accurately adjusting the beam pitch to a required value is disabled. For this reason, in an apparatus in which an offset that cannot be ignored is highly likely to be produced, offset detection and offset correction based on the detection result are indispensable.

Offset detection and correction will be briefly explained below.

The beam passage position detection control computes the difference between the sensor pattern outputs obtained when a beam passes beam position detector 38, integrates the computation result, and converts the integration output into a digital signal by window comparator 430*, thus detecting the beam passage position.

The integration start/end timing of integrator 42 in FIG. 35 is defined by the output timing of signals from sensor pattern SE/SK of detector 38 in FIG. 33 (or sensor 380 in FIG. 3). That is, when a beam is scanned by polygonal mirror 35, and passes sensor pattern SE, integrator 42 is reset, and integration starts simultaneously with the resetting. Furthermore, when the beam passes sensor pattern SK, integration ends, and at the same time, the output (WUL/WLL) from window comparator 430* is held by flip-flop circuit 432*.

An offset value of beam passage position detector output processing circuit 40 is steadily produced as long as this circuit 40 is powered. This offset value causes errors of beam position information in the beam passage position detection control during the integration time from the beginning to end of integration of integrator 42. Therefore, if any offset value within the integration time can be measured, beam passage position control that considers the offset value (i.e., that can correct any offset) can be achieved.

Therefore, in the offset detection and correction to be described below, the output signals from sensor patterns SE and SK are used to make the integration start/end timing of integrator 42 equivalent to the beam passage position control. However, if a beam is detected by sensor patterns SJ, SI, SG, and SF, beam information which is not required for offset detection is superposed on integration output Vo, and an offset value cannot be accurately detected. Therefore, offset value detection uses integration output Vo obtained when sensor patterns SJ to SF are not irradiated with any beam.

For example, in sensor 380 in FIG. 3, an instruction value is supplied to the galvano mirror (33*a*) so that a laser beam (31*a*) for offset detection passes a position still higher than sensor pattern SJ, so that sensor pattern SJ does not detect any laser beam at all. In this state, integration output corresponding to a laser beam that passes the sensor surface is detected.

In this case, if no offset is produced, integration output Vo should be zero (or a predetermined constant value). However, if any offset is produced, integration output Vo becomes zero (or a predetermined constant value) $+\alpha$ (this $+\alpha$ is a relatively small analog voltage which can assume either a positive or negative value).

When this integration output $Vo=+\alpha$ is detected using the threshold values (WINTHH/WINTHL) corresponding to the minimum window of window comparator 430*, digital data (hexadecimal data) corresponding to the analog offset value $+\alpha$ can be obtained.

Since the offset causes errors in the beam passage position detection control during the integration time from the beginning to end of integration (a period from when SE is output until SK is output), the offset value during this integration time is measured to correct the offset.

In this case, integration is made using the outputs from SK and SM, while inhibiting sensors SF to SJ from being irradiated with any beam, by setting spacing Lkm between sensors SK and SM in sensor 380 in FIG. 3 to be equal to spacing Lek between sensors SE and SK, thereby detecting the offset.

In this way, integration output Vo integrated for the same period (corresponding to spacing Lkm) as the offset detection period (corresponding to spacing Lek) can be used in offset-corrected laser beam control. That is, integration output Vo which is integrated under the same time condition as that in offset detection can be used in offset correction.

Figure 51:
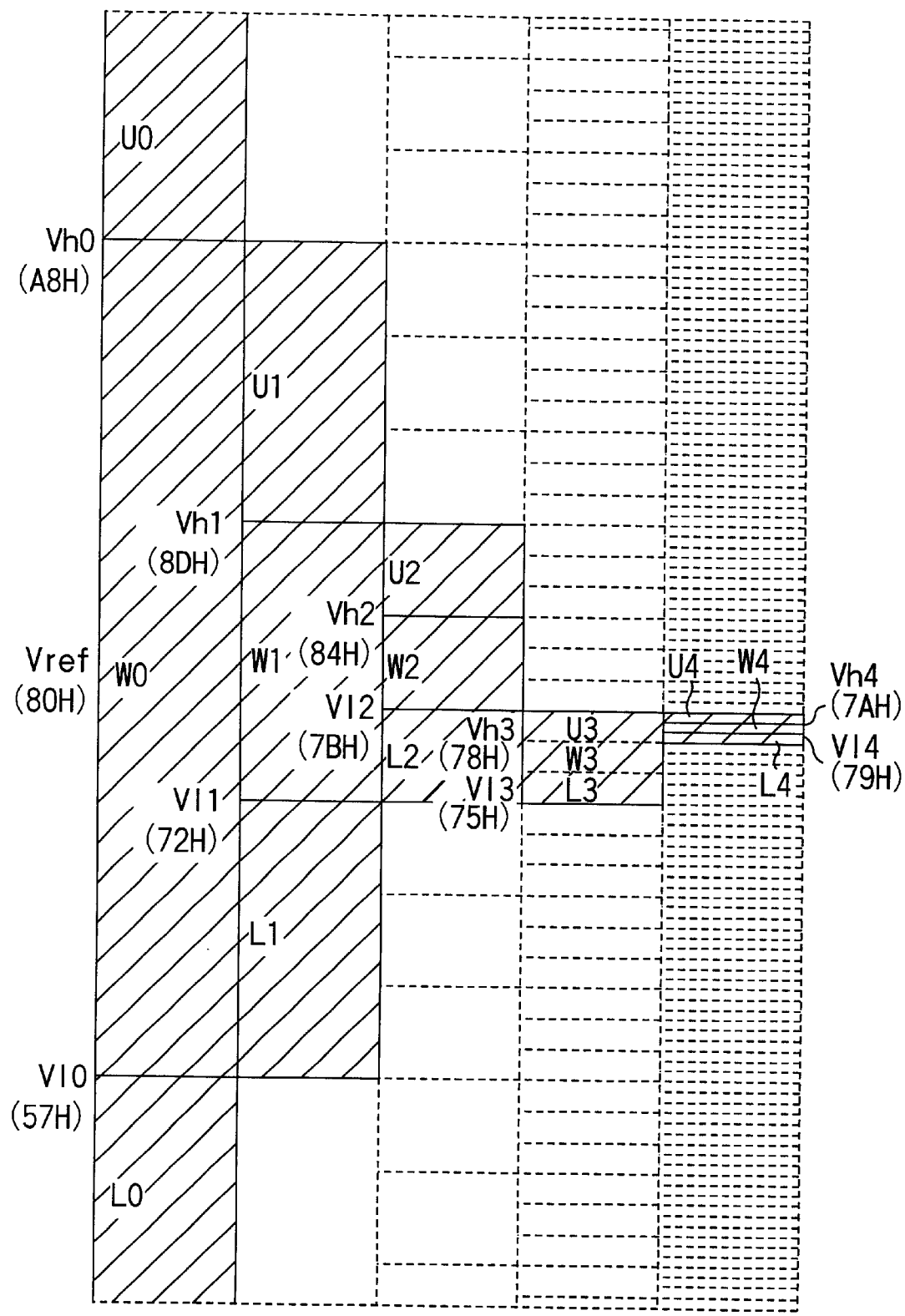
FIG. 51 is a view showing changes in threshold value of the window comparator when an offset of an operational amplifier circuit used in detection of the beam passage position is detected using the arrangement shown in FIGS. 33 and 35 (using the window comparator)

FIG. 51 shows a change in threshold value of window comparator 430* upon detecting (measuring) any offset of an operational amplifier circuit used in beam passage position detection using the arrangement shown in FIGS. 33 and 35.

Figure 52:
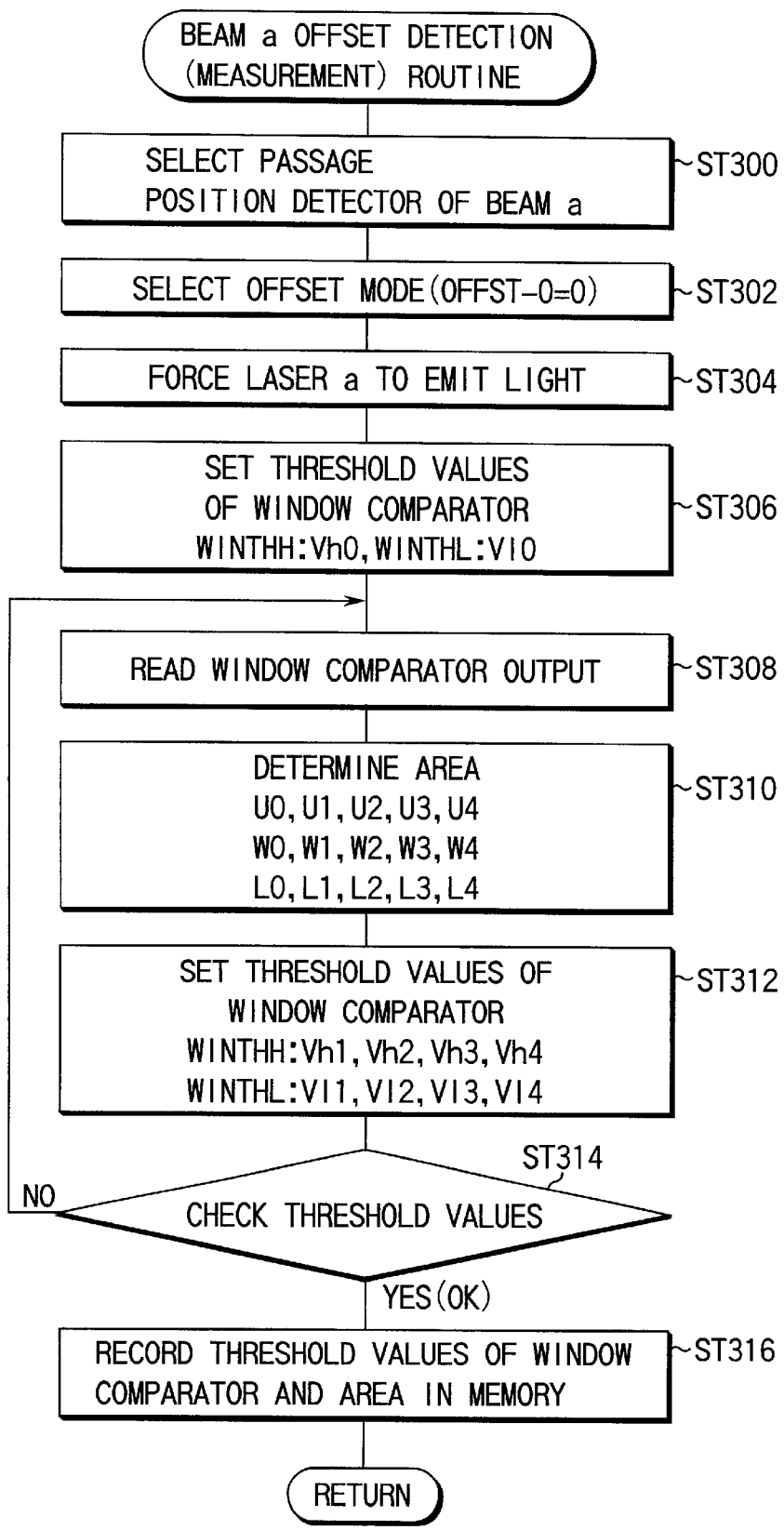
FIG. 52 is a flow chart for explaining the sequence for measuring an offset of an operational amplifier used in detection of beam a of multi-beams.

FIG. 52 is a flow chart for explaining the sequence for measuring any offset of an operational amplifier circuit used in detection of first beam a (laser 31*a* in FIG. 33) of the multi-beams.

Offset detection of beam a (first laser 31*a*) will be described with reference to FIGS. 51 and 52.

The CPU of main controller 51 in FIG. 33 supplies a sensor select command to selection circuit 41 to select passage position detection (output from differential amplifier 63) of beam a(step ST300).

The CPU then issues a command to selection circuits A and B in FIG. 33 to select an offset detect mode (step 3T302).

With this mode selection, SA and SK are selected as reset sensors for integrator 42, and SM is selected as an A/D process sensor (i.e., integration is made between SK and SM).

The CPU forces laser oscillator (32a) for beam a (first laser 31a) to emit light with predetermined power (step ST304).

The CPU sets threshold values of window comparator 430* at predetermined values (step ST306). That is, since an offset voltage (Vos) is produced in±directions to have a reference voltage (Vref) as the center, the threshold values are set to include the reference voltage within the window:

$$WINTHH \rightarrow Vh0(V)=A8H$$

$$WINTHL \rightarrow Vl0(V)=57H$$

After that, the CPU reads the output (comparison results between integration output Vo and the threshold values of the window comparator) of window comparator 430* at the output timing of a signal from sensor SM in FIG. 3 (step ST308), and determines an area in FIG. 51 to which output Vo from integrator 42 at that time belongs (step ST310).

If the comparison results of window comparator 430* are [WUL, WLL]=[1, 1], it is determined that integration output Vo belongs to area W0 in FIG. 51.

In this case, the CPU sets new threshold values that nearly equally divide area W0 into three areas (step ST312):

$$WINTHH \rightarrow Vh1(V)=8DH$$

$$WINTHL \rightarrow Vl1(V)=72H$$

The CPU then checks if the threshold values corresponding to the area determined in step ST310 correspond to the narrowest window of window comparator 430* (step ST314).

Since determined area W0 is not the narrowest window (NO in step ST314), the CPU again determines an area to which integration output Vo at that time belongs, using the new threshold values set in step ST312 (step ST308, ST310).

The CPU then changes the threshold values of window comparator 430* as follows to narrow down the window of the window comparator:

$$WINTHH \rightarrow Vh2(V)=84H$$

$$WINTHL \rightarrow Vl2(V)=7BH$$

(Vh2/Vl2 are values that divide area W1 in FIG. 51 into three areas)

$$WINTHH \rightarrow Vh3(V)=78H$$

$$WINTHL \rightarrow Vl3(V)=75H$$

(Vh3/V13 are values that divide area L2 in FIG. 51 into three areas)

$$WINTHH \rightarrow Vh4(V)=7AH$$

$$WINTHL \rightarrow Vl4(V)=79H$$

(Vh4/V14 are values that divide area U3 in FIG. 51 into three areas)

As a result of repetition of the aforementioned process, if the area determined in step ST310 corresponds to the narrowest window of window comparator 430* (YES/OK in step ST314), the threshold values (Vh4/V14) at that time are recorded in memory 52 in FIG. 33 together with the detected area (W4) at that time (step ST316).

In the example shown in FIG. 51, if the final threshold values (Vh4/Vl4) include Vref=80H, it is determined that substantially no offset is produced. However, since the final threshold values (Vh4/V14) define the range from 79H to 7AH, it is determined that an offset for 06H to 07H is produced (in the minus direction from Vref).

Note that the difference (the width of the window of the window comparator) between WINTHH and WINTHL specifies the resolution of threshold values that can be set in the arrangement of this embodiment (for example, if a D/A converter with an 8-bit resolution is used and the maximum level is 5 V, the resolution, i.e., the minimum unit level is 5/255 V ($\approx$20 mV).

The process for changing and checking the threshold values repeats itself in the loop of steps ST308 to ST314 in FIG. 52 until integration output Vo upon offset detection converges within the window with the width corresponding to this minimum unit level.

Then, WINTHH and WINTHL (WINTHH=7AH and WINTHL=79H) of finally obtained area W4 are recorded in memory 52 as an offset value of beam a (first laser 31a) in the detection circuit.

The same operation is executed for detection circuits of the remaining beams (31b to 31d) to measure offset values of the respective circuits, and the measured values are recorded in memory 52.

Offset detection/correction control using offset data recorded in memory 52 by the process shown in FIG. 52 will be explained below.

Figure 53:
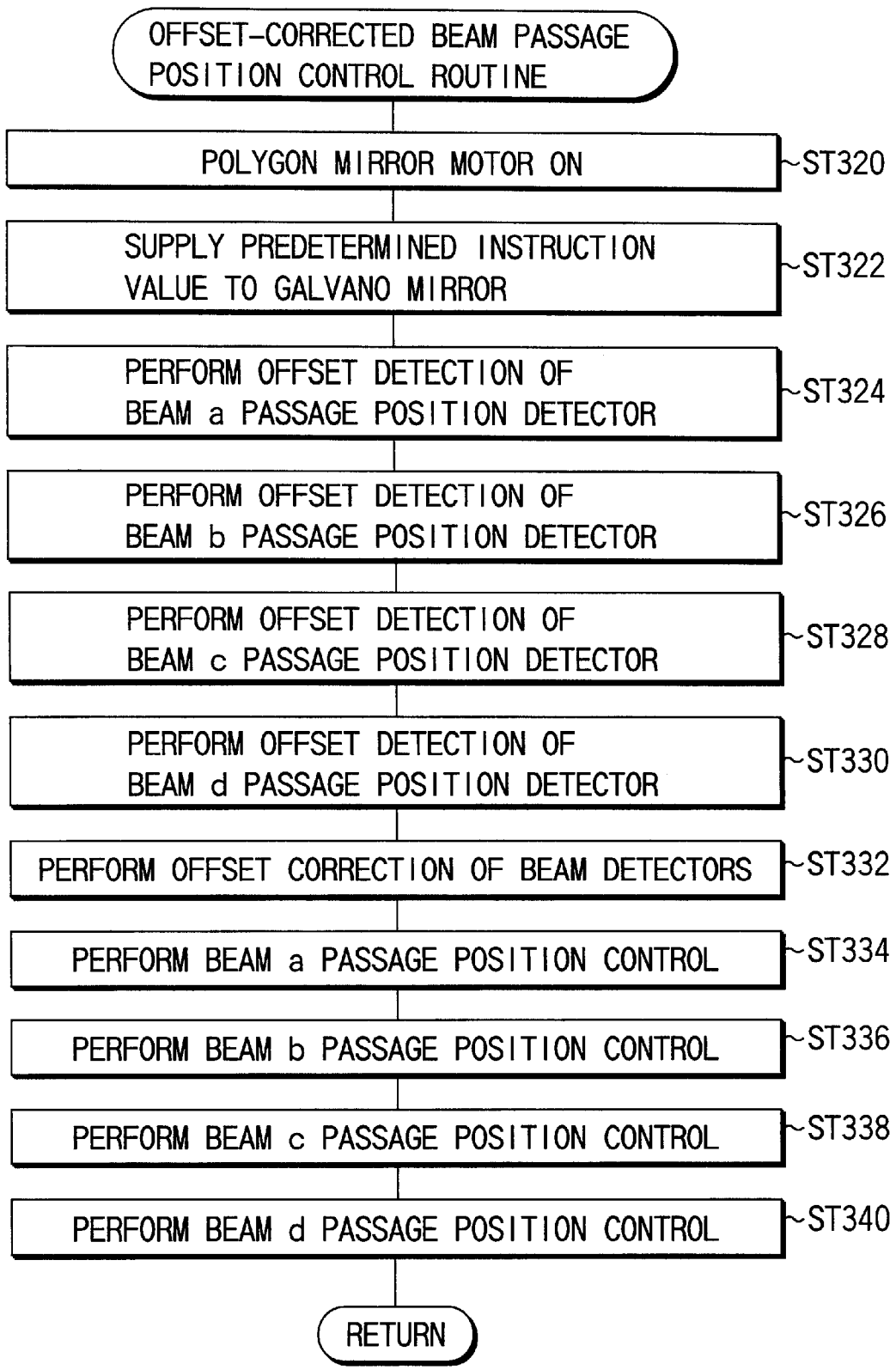
FIG. 53 is a flow chart for explaining the sequence for controlling the passage position of each offset-corrected beam.

FIG. 53 is a flow chart for explaining the sequence for controlling the passage position of each offset-corrected beam.

The CPU of main controller 51 shown in FIG. 33 supplies an instruction to polygonal mirror motor driver 37 to rotate polygonal mirror motor 36 at a predetermined rotational speed (step ST320).

Subsequently, the CPU supplies a predetermined instruction value to galvano mirror driving circuits 39a to 39d to designate scan routes of the four multi-laser beams (step ST322).

The CPU then performs offset detection of beam a (first laser 31a) in accordance with the offset detection sequence that has bee explained above with reference to FIG. 52 (step ST324). The CPU records the detection result in memory 52 in FIG. 33.

Likewise, the CPU performs offset detection of beam b (second laser 31b) (step ST326) and records the detection result in memory 52; performs offset detection of beam c (third laser 31c) (step ST328) and records the detection result in memory 52; and performs offset detection of beam d (fourth laser 31d) (step ST330) and records the detection result in memory 52.

The CPU makes offset correction with respect to detectors of beams a to d (circuits comprised of operational amplifiers) on the basis of the data recorded in memory 52 (step ST332).

Note that the control target (threshold values of window comparator 430*) in normal beam position control is WINTHH=VH4 and WINTHL=VL4. Offset correction is attained by adding an offset value (offset data recorded in memory 52) to this control target.

In the beam passage position control after offset correction (in consideration of offsets), the offset value is located at nearly the center of the beam passage position control target. An example of threshold values of the beam passage position control after correction is as follows (where Vref is 80H in the example in FIG. 51).

WHNTHH→VH0+(Vh4−Vref)

WHNTHH→VL0+(Vl4−Vref)

(the broadest window of window comparator 430*)

WHNTHH→VH1+(Vh4−Vref)

WHNTHH→VL1+(Vl4−Vref)

(the second broadest window of window comparator 430*)

WHNTHH→VH2+(Vh4−Vref)

WHNTHH→VL2+(Vl4−Vref)

(the third broadest window of window comparator 430*)

WHNTHH→VH3+(Vh4−Vref)

WHNTHH→VL3+(Vl4−Vref)

(the fourth broadest window of window comparator 430*)

WHNTHH→VH4+(Vh4−Vref)

WHNTHH→VL4+(Vl4−Vref)

(the narrowest window of window comparator 430*)

In this manner, beam a (first laser 31a) undergoes the passage position control while applying threshold values (WINTHH/WINTHL) that gradually narrow down the window of window comparator 430* (step ST334).

The aim of this control is to, e.g., control galvano mirror 33a so that beam a accurately passes between sensor patterns SJ and SI on the sensor surface in FIG. 3 even when the aforementioned offset has been produced.

Likewise, beam b (second laser 31b) undergoes the passage position control (step ST336) to control galvano mirror 33b so that beam b accurately passes between sensor patterns SI and SH.

Subsequently, beam c (third laser 31c) undergoes the passage position control (step ST338) to control galvano mirror 33c so that beam c accurately passes between sensor patterns SH and SG.

Finally, beam d (fourth laser 31d) undergoes the passage position control (step ST340) to control galvano mirror 33d so that beam d accurately passes between sensor patterns SG and SF.

As described above, according to this embodiment, since any offset value of the beam passage position detector is detected, and a correction process is done in accordance with the detected offset value, beam passage position control which suffers little control errors can be implemented.

Since the offset-corrected beam passage position control can always accurately control the position of each beam on photosensitive drum 15 in FIG. 2 to an appropriate position, a high image quality of an output (printout) image can be maintained.

The beam detector (multi-beam position detection or beam power detection) of the image forming apparatus according to the embodiment of the present invention adopts an arrangement for converting analog data (integration output) into digital data using a single comparator or window comparator in place of a conventional A/D converter.

According to this arrangement, a performance equivalent to that of a high-speed type multi-bit A/D converter can be obtained with low cost by appropriately combining a comparator and versatile logic ICs (flip-flops, inverters, and the like).

Also, the comparator and versatile logic ICs can assure high operation speed.

According to the present invention, even when a high-speed, high-resolution type A/D converter is not used in the multi-beam detector, a function (digital data conversion of the integration output) equivalent to such converter can be implemented. The "high-speed, high-resolution" A/D conversion function can be implemented by combining a comparator (single comparator and/or window comparator) which is inexpensive and has high operation speed with versatile logic ICs (flip-flops, inverters, and the like).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a light source configured produce a plurality of light beams;
   a scanner configured to scan the plurality of light beams so the light beams pass a predetermined object;
   a passage position detector configured to detect a passage position of each light beam scanned by said scanner;
   a convertor configured to convert an analog amount corresponding to each light beam passage position detected by said passage position detector into a corresponding digital bit on the basis of a predetermined threshold value;
   an arithmetic device configured to calculate an amount of change in a path of each of the light beams scanned by said scanner on the basis of said threshold value and said digital bit;
   a light path changer configured to change the passage position of each of the light beams scanned by said scanner so that the passage position of each of the light beams matches a prescribed position; and
   a threshold value changer configured to change the threshold value on the basis of said digital bit.

2. An apparatus according to claim 1, further comprising an integrator configured to generate the analog amount by integrating a detection result of said passage position detector, and
   wherein said passage position detector has sensor patterns on a passage position of each light beam scanned by said scanner in the order that the light beam passes them,
   said integrator integrating on the basis of a generation timing of a light beam detect signal from one of the sensor patterns.

3. An image forming apparatus comprising:
   a light source configured to produce a plurality of light beams;
   a scanner configured to scan the plurality of light beams so the light beams pass a predetermined object;

a light amount detector configured to detect a light amount of each light beam scanned by said scanner;

a converter configured to convert an analog amount corresponding to each light beam light amount detected by said light amount detector into a corresponding digital bit on the basis of a predetermined threshold value;

a light amount changer configured to change the light amount of each of the light beams scanned by said scanner so that the light amount of each of the light beams matches a prescribed value;

a threshold value changer configured to change the threshold value on the basis of the digital bit; and an integrator configured to generate the analog amount by integrating a detection result of said light amount detector, wherein said light amount detector has sensor patterns on a passage position of each light beam scanned by said scanner in the order that the light beam passes them, said integrator integrating on the basis of a generation timing of a light beam detect signal from one of the sensor patterns.

4. An image forming apparatus comprising:

a light source configured to produce a plurality of light beams;

a scanner configured to scan the plurality of light beams so the light beams pass a predetermined object;

a first detector configured to detect a passage position of each light beam scanned by said scanner;

a first converter configured to convert an analog amount corresponding to each light beam passage position detected by said first detector into a corresponding first digital bit on the basis of a predetermined first threshold value;

an arithmetic device configured to calculate an amount of change in a path of each of the light beams scanned by said scanner on the basis of said first threshold value and said first digital bit;

a light path changer configured to change the passage position of each of the light beams scanned by said scanner so that the passage position of each of the light beams matches a prescribed position;

a first changer configured to change the first threshold value on the basis of the first digital bit;

a second detector configured to detect a light amount of each light beam scanned by said scanner;

a second converter configured to convert an analog amount corresponding to each beam light amount detected by said second detector into a corresponding second digital bit on the basis of a predetermined second threshold value;

a light amount changer configured to change the light amount of each of the light beams scanned by said scanner so that the light amount of each of the light beams matches a prescribed value; and a second changer configured to change the second threshold value on the basis of the second digital bit.

5. An apparatus according to claim 4, further comprising an integrator configured to generate the analog amount by integrating a detection result of said first or second detector, and wherein said first or second detector has sensor patterns on a passage position of each light beam scanned by said scanner in the order that the light beam passes them, said integrator integrating on the basis of a generation timing of a light beam detect signal from one of the sensor patterns.

6. An image forming apparatus comprising:

a light source for producing a plurality of light beams;

scan means for scanning the plurality of light beams so the light beams pass a predetermined object;

detection means for detecting a circuit state when a light amount of each light beam scanned by said scan means is substantially zero;

offset detection means for detecting an offset amount corresponding to the circuit state detected by said detection means;

conversion means for converting an analog amount corresponding to the offset amount detected by said offset detection means into a corresponding digital bit on the basis of a predetermined threshold value; and change means for changing the threshold value on the basis of the digital bit.

7. An apparatus according to claim 6, further comprising an integrator for generating the analog amount by integrating a detection result of said detection means, and wherein said detection means has first, second, and third sensor patterns on a passage position of each light beam scanned by said scan means in the order that the light beam passes them, said integrator makes integration on the basis of a generation timing of a light beam detect signal from one of the first and second sensor patterns, and a spacing between the first and second sensor patterns is designed to match with a spacing between the second and third sensor patterns.

8. An image forming method comprising:

producing a light beam used in image formation;

detecting a passage position of the light beam by scanning the light beam;

converting an analog amount corresponding to the detected passage position of the light beam into a corresponding digital bit on the basis of a predetermined threshold value;

calculating an amount of change in a path of the light beam on the basis of said threshold value and said digital bit;

changing the passage position of the light beam so that the passage position of the light beam matches a prescribed position; and changing the threshold value on the basis of the digital bit.

9. An image forming method comprising:

producing a light beam used in image formation;

detecting a light amount of the light beam;

converting an analog amount corresponding to the detected light amount of the light beam into a corresponding digital bit on the basis of a predetermined threshold value;

changing the light amount of the light beam so that the light amount matches a prescribed value; and changing the threshold value on the basis of the digital bit.

10. An image forming method comprising:

producing a light beam used in image formation;

detecting a circuit state when a light amount of the light beam is substantially zero;

detecting an offset amount corresponding to the circuit state;

converting an analog amount corresponding to the detected offset amount into a corresponding digital bit on the basis of a predetermined threshold value;

changing the threshold value on the basis of the digital bit; and recording a final value of the changed threshold value as data indicating the offset amount.

11. An image forming apparatus comprising:

a light source configured to produce a predetermined light beam;

a scanner configured to scan the light beam so the light beam passes a predetermined object;

a passage position detector configured to a passage position of the light beam scanned by said scanner;

a converter configured to convert an analog amount corresponding to the light beam passage position detected by said passage position detector into a corresponding digital bit on the basis of a predetermined threshold value;

an arithmetic device configured to calculate an amount of change in a path of the light beam scanned by said scanner on the basis of said threshold value and said digital bit;

a light path changer configured to change the passage position of the light beam scanned by said scanner so that the passage position of the light beam matches a prescribed position; and a threshold value changer configured to change the threshold value on the basis of the digital bit.

12. An image forming apparatus comprising:

a light source configured to produce a predetermined light beam;

a scanner configured to scan the light beam so the light beam passes a predetermined object;

a light amount detector configured to detect a light amount of the light beam scanned by said scanner;

a converter configured to convert an analog amount corresponding to the light beam amount detected by said light amount detector into a corresponding digital bit on the basis of a predetermined threshold value;

a light amount changer configured to change the light amount of the light beam scanned by said scanner so that the light amount of the light beam matches a prescribed value; and a threshold value changer configured to change the threshold value on the basis of the digital bit; and an integrator configured to generate the analog amount by integrating a detection result of said light amount detector, wherein said light amount detector has sensor patterns on a passage position of said light beam scanned by said scanner in the order that the light beam passes them, said integrator on the basis of a generation timing of a light beam detect signal from one of the sensor patterns.

13. An image forming apparatus comprising:

a light source for producing a predetermined light beam;

scan means for scanning the light beam so the light beam passes a predetermined object;

detection means for detecting a circuit state when a light amount of the light beam scanned by said scan means is substantially zero;

offset detection means for detecting an offset amount corresponding to the circuit state detected by said detection means;

conversion means for converting an analog amount corresponding to the offset amount detected by said offset detection means into a corresponding digital bit on the basis of a predetermined threshold value; and change means for changing the threshold value on the basis of the digital bit.

14. An image forming apparatus comprising:

a light source configured to produce a plurality of light beams;

a scanner configured to scan the plurality of light beams so the light beams pass a predetermined object;

a circuit state detector configured to detect a circuit state when a light amount of each light beam scanned by said scanner is substantially zero;

an offset detector configured to detect an offset amount corresponding to the circuit state detected by said circuit state detector;

a converter configured to convert an analog amount corresponding to the offset amount detected by said offset detector into a corresponding digital bit on the basis of a predetermined threshold value; and a threshold value changer configured to change the threshold value on the basis of the digital bit.

15. An apparatus according to claim 14, further comprising:

an integrator configured to generate the analog amount by integrating a detection result of said circuit state detector, and wherein said circuit state detector has sensor patterns on a passage position of each light beam scanned by said scanner in the order that the light beam passes them, said integrator makes integration on the basis of a generation timing of a light beam detect signal from one of the sensor patterns.

16. An image forming apparatus comprising:

a light source configured to produce a predetermined light beam;

a scanner configured to scan the light beam so the light beam passes a predetermined object;

a circuit state detector configured to detect a circuit state when a light amount of the light beam scanned by said scanner is substantially zero;

an offset detector configured to an offset amount corresponding to the circuit state detected by said circuit state detector;

a converter configured to convert an analog amount corresponding to the offset amount detected by said offset detector into a corresponding digital bit on the basis of a predetermined threshold value; and a threshold value changer configured to change the threshold value on the basis of the digital bit.

* * * * *